United States Patent
Gao et al.

(10) Patent No.: US 12,010,054 B2
(45) Date of Patent: Jun. 11, 2024

(54) DMRS TRANSMISSION

(71) Applicant: NEC CORPORATION, Tokyo (JP)

(72) Inventors: Yukai Gao, Beijing (CN); Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 17/419,988

(22) PCT Filed: Jan. 9, 2019

(86) PCT No.: PCT/CN2019/071012
§ 371 (c)(1),
(2) Date: Jun. 30, 2021

(87) PCT Pub. No.: WO2020/142937
PCT Pub. Date: Jul. 16, 2020

(65) Prior Publication Data
US 2022/0085937 A1    Mar. 17, 2022

(51) Int. Cl.
*H04L 5/00* (2006.01)
*H04L 27/26* (2006.01)
*H04L 27/34* (2006.01)

(52) U.S. Cl.
CPC ........ *H04L 5/0048* (2013.01); *H04L 27/2614* (2013.01); *H04L 27/3488* (2013.01)

(58) Field of Classification Search
CPC ............... H04L 5/0048; H04L 27/2614; H04L 27/3488; H04L 5/0051; H04L 25/0226;
(Continued)

(56) References Cited

U.S. PATENT DOCUMENTS

2017/0201989 A1    7/2017   Fakoorian et al.
2018/0212728 A1    7/2018   Wang et al.

FOREIGN PATENT DOCUMENTS

CN          101902301 A       12/2010
WO     WO-2017044420 A1 *     3/2017  ........... H04B 7/0413
WO        2017/123352 A1      7/2017

OTHER PUBLICATIONS

3GPP TSG RAN WG1 Meeting #95; Inter Corporation; Low PAPR Reference Signals R1-1813892 (Year: 2018).*

(Continued)

*Primary Examiner* — Hardikkumar D Patel
(74) *Attorney, Agent, or Firm* — Sughrue Mion, PLLC

(57) ABSTRACT

Embodiments of the present disclosure relate to methods, devices and computer readable media for DMRS transmission. A method implemented at a terminal device comprises selecting, from a plurality of computer generated (CG) sequences, a CG sequence for an uplink channel modulated with a predetermined modulation technique. The method further comprises generating, based on the selected CG sequence, a DMRS sequence for the uplink channel. In addition, the method further comprises transmitting, over the uplink channel, the DMRS sequence to a network device. The embodiments of the present disclosure can provide a set of candidate CG sequences with low PAPR, good autocorrelation performance and good cross-correlation performance for generating DMRS sequences for $\pi/2$-BPSK modulated PUSCH or PUCCH.

12 Claims, 11 Drawing Sheets

(58) Field of Classification Search
CPC .. H04L 27/206; H04L 27/262; H04L 27/2613
See application file for complete search history.

(56) References Cited

OTHER PUBLICATIONS

Qualcomm Incorporated, "Lower PAPR reference signals", R1-1813445, Nov. 12-16, 2018, pp. 1-24, 3GPP TSG RAN WG1 Meeting #95, Spokane, WA, USA.
Iith, Cewit et al., "Low PAPR Reference Signals", R1-1813086, Nov. 12-16, 2018, pp. 1-20, 3GPP TSG RAN WG1 Meeting #95, Spokane, USA.
Ericsson, "Feature lead summary #4 of low Papr RS", R1-1814203, Nov. 12-16, 2018, pp. 1-8, 3GPP TSG RAN WG1 Meeting #95, Spokane, USA.
ZTE, "Discussion on Low PAPR RS", R1-1812259, Nov. 12-16, 2018, pp. 1-12, 3GPP TSG RAN WG1 Meeting #95, Spokane, USA.
Huawei et al., "Long PUCCH for up to 2 bits UCI", R1-1712192, Aug. 21-25, 2017, pp. 1-7, 3GPP TSG RAN WG1 Meeting #90, Prague, Czech Republic.
International Search Report of PCT/CN2019/071012 dated Oct. 10, 2019 [PCT/ISA210].
Written Opinion of PCT/CN2019/071012 dated Oct. 10, 2019 [PCT/ISA237].
Office Action dated Aug. 23, 2022 in Japanese Application No. 2021-539942.
Intel Corporation, "Low PAPR Reference Signals" 3GPP TSG RAN WG1 Meeting #95, R1-1813892, Spokane, USA, Nov. 12-16, 2018 (14 pages total).

* cited by examiner

DMRS TRANSMISSION

CROSS REFERENCE TO RELATED APPLICATIONS

This application is a National Stage of International Application No. PCT/CN2019/071012, filed Jan. 9, 2019.

TECHNICAL FIELD

Embodiments of the present disclosure generally relate to the field of telecommunication, and in particular, to methods, devices and computer storage media for Demodulation Reference Signal (DMRS) transmission.

BACKGROUND

Typically, prior to transmission of data (including control signaling), a transmitting device may modulate the data to be transmitted. In new radio access (NR), various modulation techniques are supported, such as Binary Phase Shift Keying (BPSK), $\pi/2$-BPSK, Quadrature Phase Shift Keying (QPSK), 16 Quadrature Amplitude Modulation (16QAM), 64QAM and 256QAM. In the latest 3GPP discussion (that is, Release 16), it has been agreed that for $\pi/2$-BPSK modulated Physical Uplink Shared Channel (PUSCH), if the allocated length for a DMRS sequence is 30 or longer, a DMRS sequence for PUSCH will be generated based on a Pseudo-random sequence, and the modulation technique for the DMRS sequence is $\pi/2$-BPSK. For $\pi/2$-BPSK modulated Physical Uplink Control Channel (PUCCH), if the allocated length for a DMRS sequence is 30 or longer, a DMRS sequence for PUCCH will be also generated based on the Pseudo-random sequence, and the modulation technique for the DMRS sequence is $\pi/2$-BPSK. For $\pi/2$-BPSK modulated PUSCH or PUCCH, if the allocated length for a DMRS sequence is lower than 30, such as, the length is 6, 12, 18 or 24, a DMRS sequence for PUSCH or PUCCH will be generated based on a Computer Generated (CG) sequence and the modulation technique for the DMRS sequence is $\pi/2$-BPSK.

However, the detailed CG sequences used for generating DMRS sequences have not been specified yet.

SUMMARY

In general, example embodiments of the present disclosure provide methods, devices and computer storage media for DMRS transmission.

In a first aspect, there is provided a method implemented at a terminal device. The method comprises: selecting, from a plurality of computer generated (CG) sequences, a CG sequence for an uplink channel modulated with a predetermined modulation technique; generating, based on the selected CG sequence, a DMRS sequence for the uplink channel; and transmitting, over the uplink channel, the DMRS sequence to a network device.

In a second aspect, there is provided a method implemented at a network device. The method comprises: selecting, from a plurality of computer generated (CG) sequences, a CG sequence for an uplink channel modulated with a predetermined modulation technique; determining, based on the selected CG sequence, a DMRS sequence for the uplink channel; and receiving, over the uplink channel, the DMRS sequence from a terminal device.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first or second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Figure 1:
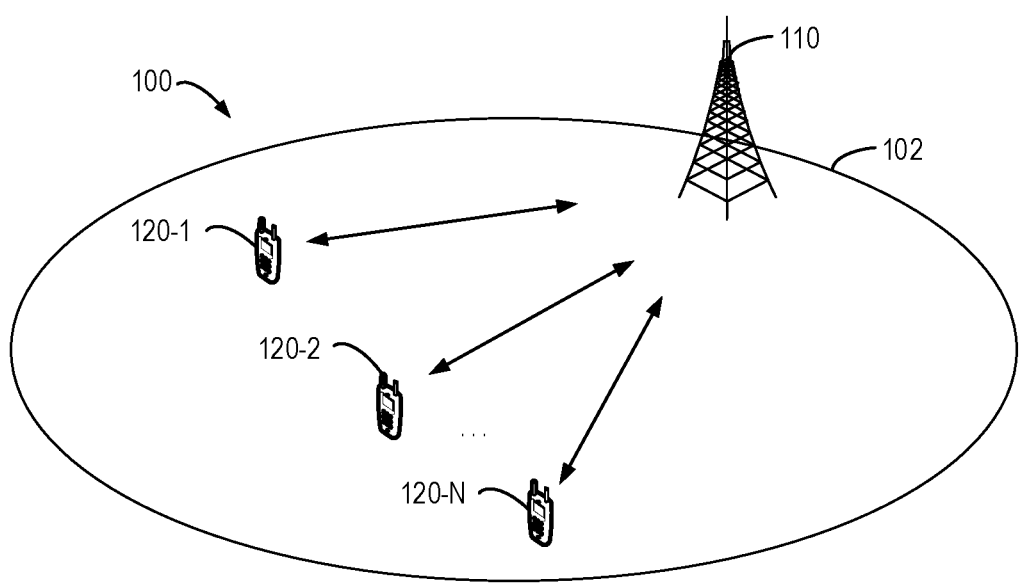
FIG. 1 illustrates an example communication network in which implementations of the present disclosure can be implemented.

FIG. 1 shows an example communication network 100 in which implementations of the present disclosure can be implemented. The communication network 100 includes a network device 110 and terminal devices 120-1, 120-2 . . . and 120-N (where N is a natural number), which can be collectively referred to as "terminal devices" 120 or individually referred to as "terminal device" 120. The network 100 can provide one or more cells 102 to serve the terminal device 120. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

As used herein, the term 'terminal device' refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In the communication network 100 as shown in FIG. 1, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS in a broadcast, multi-cast, and/or unicast manners to one or more of the terminal devices 120 in a downlink. Similarly, one or more of the terminal devices 120 may transmit RSs to the network device 110 in an uplink. As used herein, a "downlink (DL)" refers to a link from a network device to a terminal device, while an "uplink (UL)" refers to a link from the terminal device to the network device. Examples of the RS may include but are not limited to Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on.

For example, in the case of DL DMRS transmission, a DMRS may be used by the terminal devices 120 for DL channel demodulation. Generally speaking, the DMRS is a signal sequence (also referred to as "DMRS sequence") that is known by both the network device 110 and the terminal device 120. For example, in DL DMRS transmission, a DMRS sequence may be generated and transmitted by the network device 110 based on a certain rule and the terminal device 120 may deduce the DMRS sequence based on the same rule. Similarly, in the case of UL DMRS transmission, the DMRS may be used by the network device 110 for UL channel demodulation. For example, in UL DMRS transmission, a DMRS sequence may be generated and transmitted by the terminal device 120 based on a certain rule and the network device 110 may deduce the DMRS sequence based on the same rule.

Typically, prior to transmission of a DMRS sequence, a transmitting device (such as, the terminal device 120 in UL DMRS transmission or the network device 110 in DL DMRS transmission) may modulate the DMRS sequence to be transmitted. In 3GPP specifications, it has been specified that, in case of π/2-BPSK modulation, value b(i) is mapped to complex-valued modulation symbol d(i) according to:

$$d(i) = \frac{e^{j\frac{\pi}{2}(i \bmod 2)}}{\sqrt{2}}[(1 - 2b(i)) + j(1 - 2b(i))] \quad (1\text{-}1)$$

In 3GPP discussion (that is, Release 16), it has also been agreed that for π/2-BPSK modulated Physical Uplink Shared Channel (PUSCH), if the allocated length for a DMRS sequence is 30 or longer, a DMRS sequence for PUSCH may be generated based on a Pseudo-random sequence, and the modulation technique for the DMRS sequence is π/2-BPSK. For π/2-BPSK modulated Physical Uplink Control Channel (PUCCH), if the allocated length for a DMRS sequence is 30 or longer, if the length of a DMRS sequence is configured to 30 or longer, a DMRS sequence for PUCCH may also be generated based on the Pseudo-random sequence, and the modulation technique for the DMRS sequence is π/2-BPSK. For π/2-BPSK modulated PUSCH or PUCCH, if the allocated length for a DMRS sequence is lower than 30, such as, 6, 12, 18 or 24, a DMRS sequence for PUSCH or PUCCH may be generated based on a Computer Generated (CG) sequence, and the modulation technique for the DMRS sequence is π/2-BPSK. However, the detailed CG sequences used for generating DMRS sequences have not been specified yet.

Example embodiments of the present disclosure provide a solution for DMRS transmission. This solution can provide a set of candidate CG sequences for generating DMRS sequences for π/2-BPSK modulated PUSCH or PUCCH. The set of candidate CG sequences in accordance with embodiments of the present disclosure can achieve low PAPR, good autocorrelation performance and good cross-correlation performance.

Figure 2:
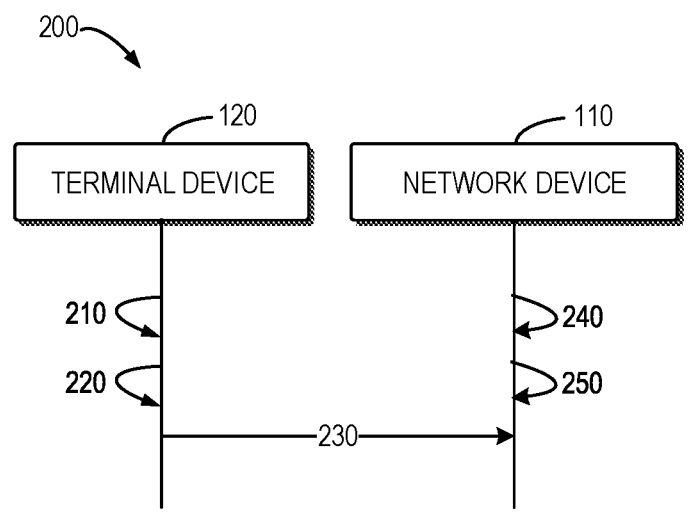
FIG. 2 illustrates a schematic diagram of a process for DMRS transmission in accordance with some embodiments of the present disclosure.

FIG. 2 illustrates a process 200 for DMRS transmission in accordance with some embodiments of the present disclosure. For the purpose of discussion, the process 200 will be described with reference to FIG. 1. The process 200 may involve the network device 110 and the terminal device 120 served by the network device 110.

In some embodiments, a plurality of CG sequence tables may be configured to both the network device 110 and the terminal device 120 for generating DMRS sequences for π/2-BPSK modulated PUSCH and/or PUCCH. One of the plurality of CG sequence tables may include a plurality of CG sequences, each of the plurality of CG sequences having a corresponding sequence length (such as, 6, 12, 18 or 24).

As shown in FIG. 2, in response to π/2-BPSK modulation and a sequence length being configured to the terminal device 120, the terminal device 120 may select 210, from a corresponding CG sequence table including a plurality of CG sequences (each of which has the configured sequence length), a CG sequence for an uplink channel (PUSCH or PUCCH) modulated with π/2-BPSK. In some embodiments, information on the selection of the CG sequence may be configured to both the network device 110 and the terminal device 120 in advance. For example, the information may indicate which CG sequence in the corresponding CG sequence table will be used in a specific slot. As such, for a specific slot, the terminal device 120 can determine which CG sequence is to be used. The terminal device 120 may generate 220, based on the selected CG sequence, a DMRS sequence for the uplink channel, and transmit 230 the generated DMRS sequence over the uplink channel to the network device 110 in the specific slot.

The network device 110 may deduce the DMRS sequence based on the same rule. As shown in FIG. 2, in response to π/2-BPSK modulation and the sequence length being configured, the network device 110 may select 240, from a corresponding CG sequence table including a plurality of CG sequences (each of which has the configured sequence length), a CG sequence for the uplink channel (PUSCH or PUCCH) modulated with π/2-BPSK in the same way as the terminal device 120. In some embodiments, information on the selection of the CG sequence may be configured to both the network device 110 and the terminal device 120 in advance. For example, the information may indicate which CG sequence in the corresponding CG sequence table will be used in a specific slot. As such, the network device 110 may determine, based on the configuration information, which CG sequence is to be used by the terminal device 120 in a specific slot. The network device 110 may determine 250, based on the selected CG sequence, a DMRS sequence to be transmitted from the terminal device 120. Then, the network device 110 may receive 230, from the terminal device 120, the DMRS sequence transmitted over the uplink channel in the specific slot.

In some embodiments, a CG sequence table including a plurality of CG sequences for generating DMRS sequences for π/2-BPSK modulated PUSCH and/or PUCCH can be determined based on at least one of the following: a predetermined length of a CG sequence, a PAPR of a CG sequence, autocorrelation of a CG sequence and cross-correlation of two CG sequences.

Figure 3:
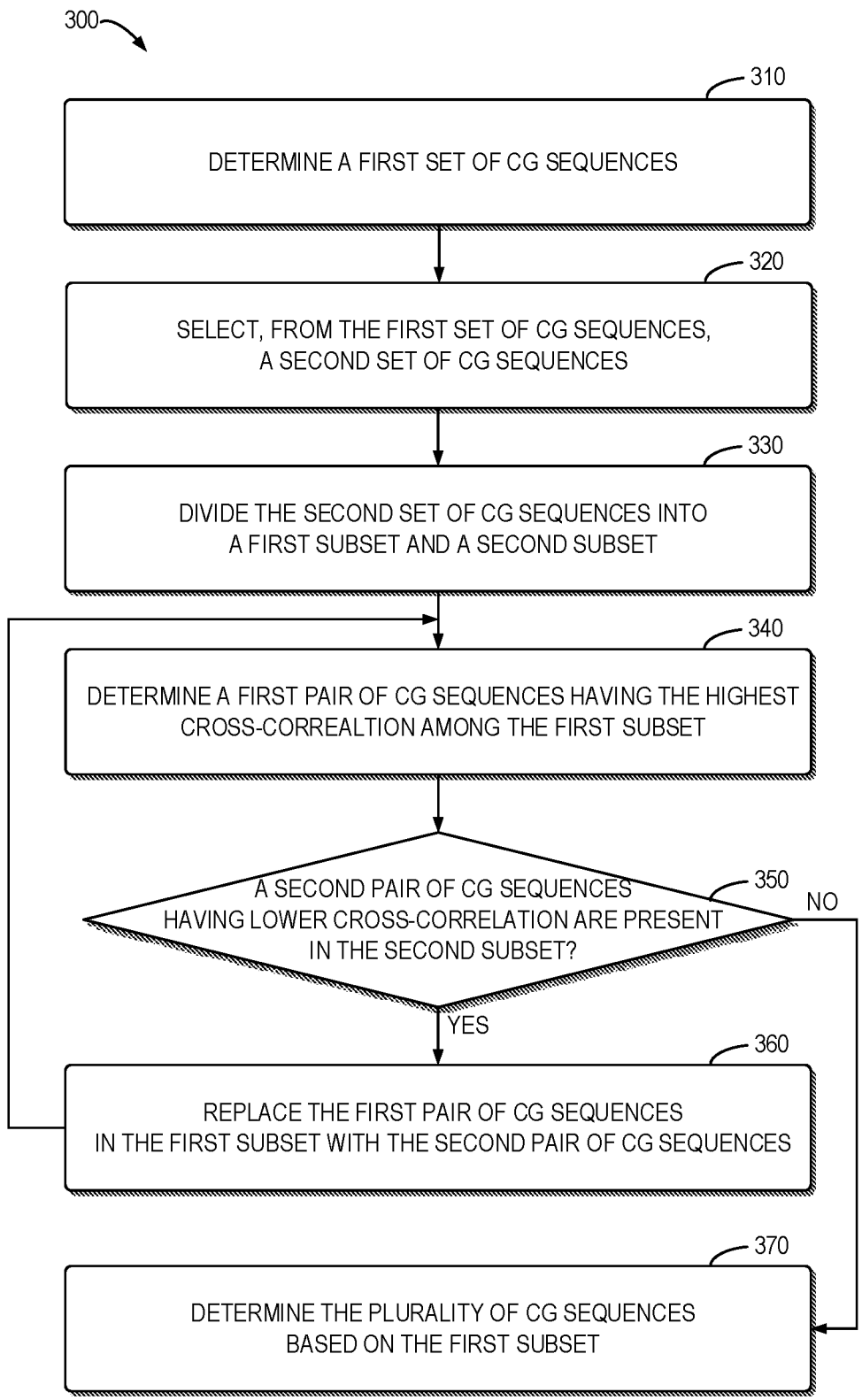
FIG. 3 illustrates a flowchart of an example method for determining a plurality of CG sequences of a certain sequence length in accordance with some embodiments of the present disclosure.

FIG. 3 shows a flowchart of an example method 300 for determining a CG sequence table including a plurality of CG sequences of a certain sequence length (such as, less than 30) in accordance with some embodiments of the present disclosure. In some embodiments, the method 300 can be performed at the terminal device 120 and/or the network device 110 as shown in FIG. 1. Alternatively, in other embodiments, the method 300 can be performed at another device not shown in FIG. 1, and the determined CG sequence table can be configured to both the network device 110 and the terminal device in advance. It is to be understood that the method 300 may include additional blocks not shown and/or may omit some blocks as shown, and the scope of the present disclosure is not limited in this regard.

At block 310, a first set of CG sequences may be determined based on a predetermine sequence length.

In some embodiments, the predetermined sequence length may be less than 30. For example, the predetermined sequence length may be any of 6, 12, 18 or 24. If the predetermined sequence length is N (where 0<N<30), a binary CG sequence having a length of N can be represented as 'b(0), b(1), ... b(N−1)', where b(m)=0 or 1, and m∈[0, N−1]. In some embodiments, if the predetermined sequence length is N (where 0<N<30), the first set of CG sequences may include $2^N$ sequences. For example, if N equals to 6, the first set of CG sequences may include '000000', '000001', ... '111111'. If N equals to 12, the first set of CG sequences may include '000000000000', '000000000001', ... '111111111111'. If N equals to 18, the first set of CG sequences may include '000000000000000000', '000000000000000001', ... '111111111111111111'. If N equals to 24, the first set of CG sequences may include '000000000000000000000000', '000000000000000000000001', ... '111111111111111111111111'.

At block 320, a second set of CG sequences are selected from the first set of CG sequences, such that the PAPR of each of the second set of CG sequences is below a first threshold and the autocorrelation of each of the second set of CG sequences is below a second threshold.

It is assumed that a binary CG sequence having a length of N is represented as 'b(0), b(1), ... b(N−1)'. According to the above equation (1-1), in case of π/2-BPSK modulation, the above binary CG sequence will be mapped to a sequence $Si = \{d(0), d(1), \ldots d(N-1)\}$, where $d(m) = \dfrac{e^{j\frac{\pi}{2}(m \bmod 2)}}{\sqrt{2}}[(1-2b(m)) + j(1-2b(m))]$ and -continued $$m \in [0, N-1].$$

In some embodiments, the sequence Si may be transformed into a sequence Fi by the following processes: transform precoding, mapping to resources in frequency domain and OFDM baseband signal generation. The PAPR of the sequence Si can be derived from dividing the maximum power in the sequence Fi by the mean power in the sequence Fi.

In some embodiments, the autocorrelation of the sequence Si can be calculated as following:

$$Si*Qi^H = \sum_{i=0}^{N-1} d(i)*d((i+\alpha) \bmod N)^* \quad (2)$$

In the above equation (2), if N equals to 12, then $\alpha \in [-2, -1, 1, 2]$; if N equals to 18, then $\alpha \in [-3, -2, -1, 1, 2, 3]$; if N equals to 24, then $\alpha \in [-5, -4, -3, -2, -1, 1, 2, 3, 4, 5]$; and if N equals to 6, then $\alpha \in [-2, -1, 1, 2]$ or $\alpha \in [4,1]$. $d((i+\alpha) \bmod N)^*$ may represent the conjugate of the value $d((i+\alpha) \bmod N)$. H may represent the conjugate transpose of a sequence. Qi may represent the sequence obtained by cyclically shifting the sequence Si by $\alpha$. $Qi^H$ may represent the conjugate transpose of the sequence obtained by cyclically shifting the sequence Si by $\alpha$.

In some embodiments, if the predetermined sequence length is 6, the first threshold may be equal to or less than 1.54. Alternatively, if the predetermined sequence length is 6, the first threshold may be equal to or less than 2.2. In some embodiments, if the predetermined sequence length is 6, the second threshold may be equal to or less than 0.67. Alternatively, if the predetermined sequence length is 6, the second threshold may be equal to or less than 0.24.

In some embodiments, if the predetermined sequence length is 12, the first threshold may be equal to or less than 1.5. Alternatively, if the predetermined sequence length is 12, the first threshold may be equal to or less than 1.47. In some embodiments, if the predetermined sequence length is 12, the second threshold may be equal to or less than 0.34.

In some embodiments, if the predetermined sequence length is 18, the first threshold may be equal to or less than 1.4. Alternatively, if the predetermined sequence length is 18, the first threshold may be equal to or less than 1.35. In some embodiments, if the predetermined sequence length is 18, the second threshold may be equal to or less than 0.23.

In some embodiments, if the predetermined sequence length is 24, the first threshold may be equal to or less than 1. Alternatively, if the predetermined sequence length is 24, the first threshold may be equal to or less than 1.32. In some embodiments, if the predetermined sequence length is 24, the second threshold may be equal to or less than 0.17. Alternatively, if the predetermined sequence length is 24, the second threshold may be equal to or less than 0.34.

At block 330, the second set of CG sequences are divided into a first subset and a second subset. In some embodiments, the first subset may include a predetermined number (for example, 30 or 60) of CG sequences selected from the second set of CG sequences randomly. The second subset may include the rest of CG sequences in the second set of CG sequences.

At block 340, a first pair of CG sequences associated with the highest cross-correlation among the first subset are determined. In some embodiments, in case of $\pi/2$-BPSK modulation, two binary CG sequences may be mapped to two sequences the cross-correlation of two sequences according to the above equation (1-1), represented as, Si and Sj. The cross-correlation of the two sequences Si and Sj may be calculated as: $Si*Sj^H$. As such, the first pair of CG sequence associated with the highest cross-correlation among the first subset can be determined.

At block 350, whether a second pair of CG sequences associated with lower cross-correlation than the first pair of CG sequences are present in the second subset is determined.

In response to determining that the second pair of CG sequences are present in the second subset, at block 360, the first pair of CG sequences in the first subset are replaced with the second pair of CG sequences. Then, the method 300 returns to block 340.

In response to determining that the second pair of CG sequences are absent in the second subset, at block 370, the CG sequences included in the first subset are determined as the plurality of CG sequences in the CG sequence table.

In this way, the determined plurality of CG sequences may be associated with low PAPR, good autocorrelation performance and good cross-correlation performance. For example, only for the purpose of illustration, different CG sequence tables associated with different sequence lengths are shown as below.

In some embodiments, for PUSCH or PUCCH, if the allocated length for a DMRS sequence is lower than 30 (such as, the length is 6, 12, 18 or 24), a predetermined sequence table T may be used for the DMRS sequence generation. For example, the PUSCH or PUCCH may be modulated with $\pi/2$-BPSK. As another example, the PUSCH or PUCCH may be modulated with QPSK. As another example, the PUSCH or PUCCH may be modulated with 16-QAM. As another example, the PUSCH or PUCCH may be modulated with 64-QAM. As another example, the PUSCH or PUCCH may be modulated with 256-QAM.

In some embodiments, for PUCCH, if the allocated length for a DMRS sequence is lower than 36, such as, the length is 12 or 24, a predetermined sequence table T may be used for the DMRS sequence generation. For example, the PUCCH may be modulated with $\pi/2$-BPSK. As another example, the PUCCH may be modulated with QPSK. As another example, the PUCCH may be modulated with 16-QAM.

In some embodiments, a sequence B from the predetermined sequence table T may be composed of a number of values b(i) and each b(i) is a binary number, where i is an integer and $0 \le i \le N-1$, and where N is the sequence length. That is, in the sequence B, each b(i) may be 0 or 1. The sequence B may be modulated with $\pi/2$-BPSK to be a sequence D. That is, the values b(i) may be mapped to complex-valued modulation symbols d(i) according to the above equation (1-1). In addition, the modulated sequence D may be transformed with transform precoding to a sequence Y. That is, the modulation symbols d(i) may be transformed to be a sequence y(k) according to:

$$y(k) = \frac{1}{\sqrt{N}} * \sum_{i=0}^{N-1} d(i) * e^{-j*2\pi ik/N} \quad (1-2)$$

where k is an integer and $0 \le k \le N-1$. Further, the sequence y(k) may be pre-coded with a precoding matrix, mapped to physical resources and then generated based on OFDM baseband signal generation according to the current 3GPP specification 38.211.

In some embodiments, in the predetermined sequence table T, a sequence B should not be included, for example, the sequence B being composed of values b(i). In the sequence B, b(i)=0 and i is an integer, where 0≤i≤N−1 and N is the sequence length. In some embodiments, in the predetermined sequence table T, a sequence B should not be included, for example, the sequence B being composed of values b(i). In the sequence B, b(i)=1 and i is an integer, where 0≤i≤N−1 and N is the sequence length. In some embodiments, in the predetermined sequence table T, a sequence B should not be included, for example, the sequence B being composed of values b(i). In the sequence B, $$b(i) = \begin{cases} 0, & \text{when } i \text{ is an odd integer} \\ 1, & \text{when } i \text{ is an even integer} \end{cases} \text{ and}$$
$$0 \le i \le N - 1,$$

where N is the sequence length. In some embodiments, in the predetermined sequence table T, a sequence B should not be included, for example, the sequence B being composed of values b(i). In the sequence B, $$b(i) = \begin{cases} 1, & \text{when } i \text{ is an odd integer} \\ 0, & \text{when } i \text{ is an even integer} \end{cases}$$
$$\text{and } 0 \le i \le N - 1,$$

where N is the sequence length. In some embodiments, N can be any of {6, 12, 18, 24, 30}.

In some embodiments, in the predetermined sequence table T, a sequence B should not be included, for example, the sequence B being composed of values b(i), where i is an integer and 0≤i≤N−1 and where N is the sequence length. In the sequence B, for all values of i, the values of b(i) may be the same. That is, for all values of i, there is only one value for b(i). In some embodiments, in the predetermined sequence table T, a sequence B should not be included, for example, the sequence B being composed of values b(i), where i is an integer and 0≤i≤N−1 and where N is the sequence length. In the sequence B, when i=2*m+1, and 0≤m≤N/2−1, all the values of b(i) are the same. That is, for all values of i=2*m+1, and 0≤m≤N/2−1, there is only one value for b(i). In the sequence B, when i=2*m, and 0≤m≤N/2−1, all the values of b(i) are the same. That is, for all values of i=2*m, and 0≤m≤N/2−1, there is only one value for b(i). In some embodiments, in the predetermined sequence table T, a sequence B should not be included, for example, the sequence B being composed of values b(i), where i is an integer and 0≤i≤N−1, and where N is the sequence length. In the sequence B, when i=3*m, and 0≤m≤N/3−1, all the values of b(i) are the same. That is, for all values of i=3*m, and 0≤m≤N/3−1, there is only one value for b(i). In the sequence B, when i=3*m+1, and 0≤m≤N/3−1, all the values of b(i) are the same. That is, for all values of i=3*m+1, and 0≤m≤N/3−1, there is only one value for b(i). In the sequence B, when i=3*m+2, and 0≤m≤N/3−1, all the values of b(i) are the same. That is, for all values of i=3*m+2, and 0≤m≤N/3−1, there is only one value for b(i). In some embodiments, in the predetermined sequence table T, a sequence B should not be included, for example, the sequence B being composed of values b(i), where i is an integer and 0≤i≤N−1, and where N is the sequence length. In the sequence B, when i=4*m, and 0≤m≤N/4−1, all the values of b(i) are the same. That is, for all values of i=4*m, and 0≤m≤N/4−1, there is only one value for b(i). In the sequence B, when i=4*m+1, and 0≤m≤N/4−1, all the values of b(i) are the same. That is, for all values of i=4*m+1, and 0≤m≤N/4−1, there is only one value for b(i). In the sequence B, when i=4*m+2, and 0≤m≤N/4−1, all the values of b(i) are the same. That is, for all values of i=4*m+2, and 0≤m≤N/4−1, there is only one value for b(i). In the sequence B, when i=4*m+3, and 0≤m≤N/4−1, all the values of b(i) are the same. That is, for all values of i=4*m+3, and 0≤m≤N/4−1, there is only one value for b(i). In some embodiments, N can be any of {6, 12, 18, 24, 30}.

In some embodiments, in the predetermined sequence table T, if one sequence $B_p$ is included (for example, the sequence $B_p$ is composed of values $b_p(i)$), another sequence $B_q$ cannot be included in the predetermined sequence table T, where the sequence $B_q$ is a sequence obtained by cyclically shifting the sequence $B_p$ by a. For example, the sequence $B_q$ is composed of value $b_q(i)$. In the sequence $B_q$, $=b_p((i+\alpha) \mod N)$, where i is an integer and 0≤i≤N−1, and where N is the sequence length. For example, N can be any of {12, 18, 24, 30}. In some embodiments, a may be any of {−5, −4, −3, −2, −1, 1, 2, 3, 4, 5}. In some embodiments, for different values of N, the possible values of α may be different. For example, if N equals to 12, then α may be any of {−2, −1, 1, 2}. As another example, if N equals to 18, then α may be any of {−3, −2, −1, 1, 2, 3}. As another example, if N equals to 18, then α may be any of {−3, −1, 1, 3}. As another example, if N equals to 24, then α may be any of {−5, −4, −3, −2, −1, 1, 2, 3, 4, 5}.

In some embodiments, in the predetermined sequence table T, if one sequence $B_p$ is included (for example, the sequence $B_p$ is composed of values $b_p(i)$, where each $b_p(i)$ may be 0 or 1), another sequence $B_q$ cannot be included in the predetermined sequence table T, where the sequence $B_q$ has some relationship with sequence $B_p$. For example, the sequence $B_q$ is composed of values $b_q(i)$. In the sequence $B_q$, $b_q(i)=(b_p(i)+1) \mod 2$, where i is an integer and 0≤i≤N−1, and where N is the sequence length. For example, N can be any of {6, 12, 18, 24, 30}.

In some embodiments, in the predetermined sequence table T, if one sequence $B_p$ is included (for example, the sequence $B_p$ is composed of values $b_p(i)$, where each $b_p(i)$ may be 0 or 1), another sequence $B_q$ cannot be included in the predetermined sequence table T, where the sequence $B_q$ has some relationship with sequence $B_p$. For example, the sequence $B_q$ is composed of values $b_q(i)$. In the sequence $B_q$, $$b_q(i) = \begin{cases} (b_p(i)+1) \mod 2, & \text{when } i \text{ is an odd integer} \\ b_p(i), & \text{when } i \text{ is an even integer} \end{cases},$$

where 0≤i≤N−1 and N is the sequence length. Alternatively, in some embodiments, in the sequence $B_q$, $$b_q(i) = \begin{cases} (b_p(i)+1) \mod 2, & \text{when } i = 2*m+1 \\ b_p(i), & \text{when } i = 2*m \end{cases},$$

where 0≤m≤N/2−1 and 0≤i≤N−1, and where N is the sequence length. For example, N cannot be 6. As another example, N can be any of {12, 18, 24, 30}.

In some embodiments, in the predetermined sequence table T, if one sequence $B_p$ is included (for example, the sequence $B_p$ is composed of values $b_p(i)$, where each $b_p(i)$ may be 0 or 1), another sequence $B_q$ cannot be included in the predetermined sequence table T, where the sequence $B_q$ has some relationship with sequence $B_p$. For example, the sequence $B_q$ is composed of values $b_q(i)$. In the sequence $B_q$, $$b_q(i) = \begin{cases} (b_p(i)+1) \bmod 2, & \text{when } i \text{ is an even integer} \\ b_p(i), & \text{when } i \text{ is an odd integer} \end{cases} \text{ and } 0 \le i \le N-1,$$

and where N is the sequence length. Alternatively, in the sequence $B_q$, $$b_q(i) = \begin{cases} (b_p(i)+1) \bmod 2, & \text{when } i = 2*m \\ b_p(i), & \text{when } i = 2*m+1 \end{cases},$$

where $0 \le m \le N/2-1$ and $0 \le i \le N-1$, and where N is the sequence length. For example, N cannot be 6. As another example, N can be any of {12, 18, 24, 30}.

In some embodiments, in the predetermined sequence table T, if one sequence $B_p$ is included (for example, the sequence $B_p$ is composed of values $b_p(i)$, where each $b_p(i)$ may be 0 or 1), another sequence $B_q$ cannot be included in the predetermined sequence table T, where the sequence $B_q$ has some relationship with sequence $B_p$. For example, the sequence $B_q$ is composed of values $b_q(i)$. In the sequence $B_q$, $$b_q(i) = \begin{cases} (b_p(i)+1) \bmod 2, & \text{when } N/2 \le i \le N-1 \\ b_p(i), & \text{when } 0 \le i \le N/2-1 \end{cases},$$

where N is the sequence length. For example, N cannot be 6. As another example, N can be any of {12, 18, 24, 30}.

In some embodiments, in the predetermined sequence table T, if one sequence $B_p$ is included (for example, the sequence $B_p$ is composed of values $b_p(i)$, where each $b_p(i)$ may be 0 or 1), another sequence $B_q$ cannot be included in the predetermined sequence table T, where the sequence $B_q$ has some relationship with sequence $B_p$. For example, the sequence $B_q$ is composed of values $b_q(i)$. In the sequence $B_q$, $$b_q(i) = \begin{cases} (b_p(i)+1) \bmod 2, & \text{when } 0 \le i \le N/2-1 \\ b_p(i), & \text{when } N/2 \le i \le N-1 \end{cases},$$

where N is the sequence length. For example, N cannot be 6. As another example, N can be any of {12, 18, 24, 30}.

In some embodiments, in the predetermined sequence table T, if one sequence $B_p$ is included (for example, the sequence $B_p$ is composed of values $b_p(i)$, where each $b_p(i)$ may be 0 or 1), other sequences $B_{q1}$ and $B_{q2}$ and $B_{q3}$ cannot be included in the predetermined sequence table T, where the sequences $B_{q1}$, $B_{q2}$ and $B_{q3}$ each has some relationship with sequence $B_p$. For example, the sequence $B_{q1}$ is composed of values $b_{q1}(i)$. In the sequence $B_{q1}$, $$b_{q1}(i) = \begin{cases} (b_p(i)+1) \bmod 2, & \text{when } N/4 \le i \le N/2-1 \text{ and} \\ & 3*N/4 \le i \le N-1 \\ b_p(i), & \text{when } 0 \le i \le N/4-1 \text{ and} \\ & N/2 \le i \le 3*N/4-1 \end{cases},$$

where N is the sequence length. Additionally, in the sequence $B_{q2}$, $$b_{q2}(i) = \begin{cases} (b_p(i)+1) \bmod 2, & \text{when } N/2 \le i \le N-1 \\ b_p(i), & \text{when } 0 \le i \le N/2-1 \end{cases},$$

where N is the sequence length. Additionally, in the sequence $B_{q3}$, $$b_{q3}(i) = \begin{cases} (b_p(i)+1) \bmod 2, & \text{when } N/4 \le i \le 3*N/4-1 \\ b_p(i), & \text{when } 0 \le i \le N/4-1 \text{ and }, \\ & 3*N/4 \le i \le N-1 \end{cases}$$

where N is the sequence length. For example, N can only be 12. As another example, N can be any one of {12, 24}. As another example, N cannot be any one of {6, 18, 30}. As another example, this predetermined sequence table T can only be used for DMRS of PUCCH format 4.

In some embodiments, in the predetermined sequence table T, if one sequence $B_p$ is included (for example, the sequence $B_p$ is composed of values $b_p(i)$, where each $b_p(i)$ may be 0 or 1), other sequences $B_{q1}$ and $B_{q2}$ and $B_{q3}$ cannot be included in the predetermined sequence table T, where the sequences $B_{q1}$, $B_{q2}$ and $B_{q3}$ each has some relationship with sequence $B_p$. For example, the sequence $B_{q1}$ is composed of values $b_{q1}(i)$. In the sequence $B_{q1}$, $$b_{q1}(i) = \begin{cases} b_p(i), & \text{when } N/4 \le i \le N/2-1 \text{ and} \\ & 3*N/4 \le i \le N-1 \\ (b_p(i)+1) \bmod 2, & \text{when } 0 \le i \le N/4-1 \text{ and} \\ & N/2 \le i \le 3*N/4-1 \end{cases},$$

where N is the sequence length. Additionally, in the sequence $B_{q2}$, $$b_{q2}(i) = \begin{cases} (b_p(i)+1) \bmod 2, & \text{when } 0 \le i \le N/2-1 \\ b_p(i), & \text{when } N/2 \le i \le N-1 \end{cases},$$

where N is the sequence length. Additionally, in the sequence $B_{q3}$, $$b_{q3}(i) = \begin{cases} (b_p(i)+1) \bmod 2, & \text{when } 0 \le i \le N/4-1 \text{ and } 3*N/4 \le i \le N-1 \\ b_p(i), & \text{when } N/4 \le i \le 3*N/4-1 \end{cases},$$

where N is the sequence length. For example, N can only be 12. As another example, N can be any one of {12, 24}. As another example, N cannot be any one of {6, 18, 30}. As another example, this predetermined sequence table T can only be used for DMRS of PUCCH format 4.

In some embodiments, in the predetermined sequence table T, if one sequence $B_p$ is included (for example, the sequence $B_p$ is composed of values $b_p(i)$, where each $b_p(i)$ may be 0 or 1), other sequences $B_{q1}$ and $B_{q2}$ and $B_{q3}$ cannot be included in the predetermined sequence table T, where the sequences $B_{q1}$, $B_{q2}$ and $B_{q3}$ each has some relationship with sequence $B_p$. For example, the sequence $B_{q1}$ is composed of values $b_{q1}(i)$. In the sequence $B_{q1}$, $$b_{q1}(i) = \begin{cases} (b_p(i)+1)\bmod 2, & \text{when } i=4*m+1 \text{ and } i=4*m+3 \\ b_p(i), & \text{when } i=4*m \text{ and } i=4*m+2 \end{cases},$$

where $0 \leq m \leq N/4-1$ and $0 \leq i \leq N-1$, and where N is the sequence length. Additionally, in the sequence $B_{q2}$, $$b_{q2}(i) = \begin{cases} (b_p(i)+1)\bmod 2, & \text{when } i=4*m+2 \text{ and } i=4*m+3 \\ b_p(i), & \text{when } i=4*m \text{ and } i=4*m+1 \end{cases},$$

where $0 \leq m \leq N/4-1$ and $0 \leq i \leq N-1$, and where N is the sequence length. Additionally, in the sequence $B_{q3}$, $$b_{q2}(i) = \begin{cases} (b_p(i)+1)\bmod 2, & \text{when } i=4*m+1 \text{ and } i=4*m+2 \\ b_p(i), & \text{when } i=4*m \text{ and } i=4*m+3 \end{cases},$$

where $0 \leq m \leq N/4-1$ and $0 \leq i \leq N-1$, and where N is the sequence length. For example, N can only be 12. As another example, N can be any one of $\{12, 24\}$. As another example, N cannot be any one of $\{6, 18, 30\}$. As another example, this predetermined sequence table T can only be used for DMRS of PUCCH format 4.

In some embodiments, in the predetermined sequence table T, if one sequence $B_p$ is included (for example, the sequence $B_p$ is composed of values $b_p(i)$, where each $b_p(i)$ may be 0 or 1), other sequences $B_{q1}$ and $B_{q2}$ and $B_{q3}$ cannot be included in the predetermined sequence table T, where the sequences $B_{q1}$, $B_{q2}$ and $B_{q3}$ each has some relationship with sequence $B_p$. For example, the sequence $B_{q1}$ is composed of values $b_{q1}(i)$. In the sequence $B_{q1}$, $$b_{q1}(i) = \begin{cases} (b_p(i)+1)\bmod 2, & \text{when } i=4*m \text{ and } i=4*m+2 \\ b_p(i), & \text{when } i=4*m+1 \text{ and } i=4*m+3 \end{cases},$$

where $0 \leq m \leq N/4-1$ and $0 \leq i \leq N-1$, and where N is the sequence length. Additionally, in the sequence $B_{q2}$, $$b_{q2}(i) = \begin{cases} (b_p(i)+1)\bmod 2, & \text{when } i=4*m \text{ and } i=4*m+1 \\ b_p(i), & \text{when } i=4*m+2 \text{ and } i=4*m+3 \end{cases},$$

where $0 \leq m \leq N/4-1$ and $0 \leq i \leq N-1$, and where N is the sequence length.
Additionally, in the sequence $B_{q3}$, $$b_{q2}(i) = \begin{cases} (b_p(i)+1)\bmod 2, & \text{when } i=4*m \text{ and } i=4*m+3 \\ b_p(i), & \text{when } i=4*m+1 \text{ and } i=4*m+2 \end{cases},$$

where $0 \leq m \leq N/4-1$ and $0 \leq i \leq N-1$, and where N is the sequence length. For example, N can only be 12. As another example, N can be any one of $\{12, 24\}$. As another example, N cannot be any one of $\{6, 18, 30\}$. As another example, this predetermined sequence table T can only be used for DMRS of PUCCH format 4.

In some embodiments, a sequence B from the predetermined sequence table T may be composed of a number of values b(i) and each b(i) may be any one of $\{-3, -1, 1, 3\}$, where i is an integer and $0 \leq i \leq N-1$, and where N is the sequence length. The sequence B may be modulated (for example, with QPSK) to be a sequence D. That is, the values b(i) may be mapped to complex-valued modulation symbols d(i) according to:

$$d(i) = e^{j*b(i)\pi/4} \quad (1\text{-}3)$$

In addition, the modulated sequence D may be transformed with transform precoding to a sequence Y. That is, the modulation symbols d(i) may be transformed to be a sequence y(k) according to the above equation (1-2). Further, the sequence y(k) may be precoded with a precoding matrix, mapped to physical resources and then generated based on OFDM baseband signal generation according to the current 3GPP specification 38.211.

In some embodiments, in the predetermined sequence table T, if one sequence $B_p$ is included (for example, the sequence $B_p$ is composed of values $b_p(i)$, where $b_p(i)$ may be any one of $\{-3, -1, 1, 3\}$), another sequence $B_q$ cannot be included in the predetermined sequence table T. For example, the sequence $B_q$ may be composed of values $b_q(i)$ and $$b_q(i) = \begin{cases} -3, & \text{if } b_p(i)=1 \\ -1, & \text{if } b_p(i)=3 \\ 1, & \text{if } b_p(i)=-3 \\ 3, & \text{if } b_p(i)=-1 \end{cases},$$

where i is an integer and $0 \leq i \leq N-1$, and where N is the sequence length. For example, N can be only 6. As another example, N can be any one of $\{6, 12, 18, 24, 30\}$. As another example, this predetermined sequence table T cannot be used for DMRS of PUCCH.

In some embodiments, in the predetermined sequence table T, if one sequence $B_p$ is included (for example, the sequence $B_p$ is composed of values $b_p(i)$, where $b_p(i)$ may be any one of $\{-3, -1, 1, 3\}$), another sequence $B_q$ cannot be included in the predetermined sequence table T. For example, the sequence $B_q$ may be composed of values $b_q(i)$, where $$b_q(i) = \begin{cases} -3, & \text{if } b_p(i)=1 \\ -1, & \text{if } b_p(i)=3 \\ 1, & \text{if } b_p(i)=-3 \\ 3, & \text{if } b_p(i)=-1 \end{cases},$$

if $i = 2*m+1$, and $b_q(i) = b_p(i)$, if $i = 2*m$.

In addition, $0 \leq m \leq N/2-1$ and $0 \leq i \leq N-1$, where N is the sequence length. For example, N can be only 6. As another example, N can be any one of $\{6, 12, 18, 24, 30\}$. As another example, this predetermined sequence table T cannot be used for DMRS of PUCCH.

In some embodiments, in the predetermined sequence table T, if one sequence $B_p$ is included (for example, the sequence $B_p$ is composed of values $b_p(i)$, where $b_p(i)$ may be any one of $\{-3, -1, 1, 3\}$), another sequence $B_q$ cannot be included in the predetermined sequence table T. For example, the sequence $B_q$ may be composed of values $b_q(i)$, where $$b_q(i) = \begin{cases} -3, & \text{if } b_p(i) = 1 \\ -1, & \text{if } b_p(i) = 3 \\ 1, & \text{if } b_p(i) = -3 \\ 3, & \text{if } b_p(i) = -1 \end{cases},$$

if $i = 2*m$, and $b_q(i) = b_p(i)$, if $i = 2*m+1$.

In addition, $0 \leq m \leq N/2-1$ and $0 \leq i \leq N-1$, where N is the sequence length. For example, N can be only 6. As another example, N can be any one of $\{6, 12, 18, 24, 30\}$. As another example, this predetermined sequence table T cannot be used for DMRS of PUCCH.

In some embodiments, a sequence B from the predetermined sequence table T may be composed of a number of values b(i) and each b(i) may be any one of $\{-7, -5, -3, -1, 1, 3, 5, 7\}$, where i is an integer and $0 \leq i \leq N-1$, and where N is the sequence length. The sequence B may be modulated (for example, with QPSK) to be a sequence D. That is, the values b(i) may be mapped to complex-valued modulation symbols d(i) according to:

$$d(i) = e^{j*b(i)\pi/8} \quad (1\text{-}4)$$

In addition, the modulated sequence D may be transformed with transform precoding to a sequence Y. That is, the modulation symbols d(i) may be transformed to be a sequence y(k) according to the above equation (1-2). Further, the sequence y(k) may be precoded with a precoding matrix, mapped to physical resources and then generated based on OFDM baseband signal generation according to the current 3GPP specification 38.211.

In some embodiments, in the predetermined sequence table T, if one sequence $B_p$ is included (for example, the sequence $B_p$ is composed of values $b_p(i)$, where $b_p(i)$ may be any one of $\{-7, -5, -3, -1, 1, 3, 5, 7\}$), another sequence $B_q$ cannot be included in the predetermined sequence table T. For example, the sequence $B_q$ may be composed of values $$b_q(t) \text{ and } b_q(i) = \begin{cases} -7, & \text{if } b_p(i) = 1 \\ -5, & \text{if } b_p(i) = 3 \\ -3, & \text{if } b_p(i) = 5 \\ -1, & \text{if } b_p(i) = 7 \\ 7, & \text{if } b_p(i) = -1 \\ 5, & \text{if } b_p(i) = -3 \\ 3, & \text{if } b_p(i) = -5 \\ 1, & \text{if } b_p(i) = -7 \end{cases},$$

where i is an integer and $0 \leq i \leq N-1$, and where N is the sequence length. For example, N can be only 6. As another example, N can be any one of $\{6, 12, 18, 24, 30\}$. As another example, this predetermined sequence table T cannot be used for DMRS of PUCCH.

In some embodiments, in the predetermined sequence table T, if one sequence $B_p$ is included (for example, the sequence $B_p$ is composed of values $b_p(i)$, where $b_p(i)$ may be any one of $\{-7, -5, -3, -1, 1, 3, 5, 7\}$), another sequence $B_q$ cannot be included in the predetermined sequence table T. For example, the sequence $B_q$ may be composed of values $$b_q(t) \text{ and } b_q(i) = \begin{cases} -7, & \text{if } b_p(i) = 1 \\ -5, & \text{if } b_p(i) = 3 \\ -3, & \text{if } b_p(i) = 5 \\ -1, & \text{if } b_p(i) = 7 \\ 7, & \text{if } b_p(i) = -1 \\ 5, & \text{if } b_p(i) = -3 \\ 3, & \text{if } b_p(i) = -5 \\ 1, & \text{if } b_p(i) = -7 \end{cases},$$

if $i = 2*m+1$, and $b_q(i) = b_p(i)$, if $i = 2*m$.

In addition, $0 \leq m \leq N/2-1$ and $0 \leq i \leq N-1$, where N is the sequence length. For example, N can be only 6. As another example, N can be any one of $\{6, 12, 18, 24, 30\}$. As another example, this predetermined sequence table T cannot be used for DMRS of PUCCH.

In some embodiments, in the predetermined sequence table T, if one sequence $B_p$ is included (for example, the sequence $B_p$ is composed of values $b_p(i)$, where $b_p(i)$ may be any one of $\{-7, -5, -3, -1, 1, 3, 5, 7\}$), another sequence $B_q$ cannot be included in the predetermined sequence table T. For example, the sequence $B_q$ may be composed of values $$b_q(t) \text{ and } b_q(i) = \begin{cases} -7, & \text{if } b_p(i) = 1 \\ -5, & \text{if } b_p(i) = 3 \\ -3, & \text{if } b_p(i) = 5 \\ -1, & \text{if } b_p(i) = 7 \\ 7, & \text{if } b_p(i) = -1 \\ 5, & \text{if } b_p(i) = -3 \\ 3, & \text{if } b_p(i) = -5 \\ 1, & \text{if } b_p(i) = -7 \end{cases},$$

if $i = 2*m$, and $b_q(i) = b_p(i)$, if $i = 2*m+1$.

In addition, $0 \leq m \leq N/2-1$, and $0 \leq i \leq N-1$, where N is the sequence length. For example, N can be only 6. As another example, N can be any one of $\{6, 12, 18, 24, 30\}$. As another example, this predetermined sequence table T cannot be used for DMRS of PUCCH.

In some embodiments, for the DMRS sequence for PUSCH, there may be up to 4 DMRS ports (for example, respective port indices may be 0, 1, 2 and 3) with the number of frontloaded DMRS symbol equaling to one. Alternative, for the DMRS sequence for PUSCH, there may be up to 8 DMRS ports (for example, respective port indices may be 0, 1, 2, 3, 4, 5, 6 and 7) with the number of frontloaded DMRS symbol equaling to two. In some embodiments, the DMRS sequence for PUSCH before transformation (for example, based on the above equation (1-2)) may be $r^{\tilde{p}}(n) = w_{\tilde{p}}(n) * d(n)$, where $w_{\tilde{p}}(n) =$ $$\begin{cases} 1, & \text{when } \tilde{p} = 0, 2, 4, 6 \\ (-1)^n, & \text{when } \tilde{p} = 1.3.5.7 \end{cases}$$

and $\tilde{p}$ represents the port index.

In some embodiments, for DMRS sequence for PUSCH modulated with pi/2 BPSK, according to the Table 6.4.1.1.3-1 in 3GPP TS 38.211 ("NR; Physical channels and modulation"), for all of the values of $\tilde{p}$ (such as, $\tilde{p} \in [0, 7]$), the value of $w_f(k')=+1$, where $k' \in [0, 1]$.

In some embodiments, the DMRS sequence for PUSCH or PUCCH may be modulated according to the above equation (1-1) (for example, modulated with $\pi/2$-BPSK). In some embodiments, the DMRS sequence for PUSCH or PUCCH may be modulated according to the above equation (1-3) (for example, modulated with QPSK). In some embodiments, the DMRS sequence for PUSCH or PUCCH may be modulated according to the above equation (1-4) (for example, modulated with 8PSK).

In some cases, for a given sequence length N, the predetermined sequence table for the DMRS sequence of PUSCH may be represented as $T_1$, while the predetermined sequence table for the DMRS sequence of PUCCH may be represented as $T_2$. In some embodiments, in this case, there may be at least one sequence from table $T_1$ which is different from all of the sequences in table $T_2$. For example, the sequence length N can be any one of $\{12, 24\}$.

In some cases, for a given sequence length N, the predetermined sequence table for the DMRS of PUCCH format 3 may be represented as $T_1$, while the predetermined sequence table for the DMRS of PUCCH format 4 may be represented as $T_2$. In some embodiments, in this case, there may be at least one sequence from table $T_1$ which is different from all of the sequences in table $T_2$. For example, the sequence length N can be any one of $\{12, 24\}$. As another example, the sequence length N can only be 12.

In some cases, for a given sequence length $N_1$, the predetermined sequence table for the DMRS of PUSCH may be represented as $T_1$. In some embodiments, for example, $N_1$ can be any one of $\{6, 12, 18, 24, 30\}$. In some cases, for a given sequence length $N_2$, the predetermined sequence table for the DMRS of PUCCH format 3 may be represented as $T_2$. In some embodiments, for example, $N_2$ can be either 12 or 24. In some cases, for a given sequence length $N_3$, the predetermined sequence table for the DMRS of PUCCH format 4 may be represented as $T_3$. In some embodiments, for example, $N_3$ can only be 12.

In some embodiments, if the number of allocated Resource Blocks (RBs) for PUSCH is M (where M is an integer and M>0), the length of the DMRS sequence for the PUSCH is N=12*M/2. In some embodiments, if the number of allocated RBs for PUSCH is M (where M≥5 or M>5) or if the length of the DMRS sequence for the PUSCH is N (where N≥30 or N>30), the DMRS sequence for the PUSCH may be generated based on a pseudo-random sequence. In some embodiments, if the number of allocated RBs for PUSCH is M (where M≥5 or M>5) or if the length of the DMRS sequence for the PUSCH is N (where N≥30 or N>30), there may be no sequence hopping and/or group hopping. In some embodiments, if the number of allocated RBs for PUSCH is M (where M≥5 or M>5) or if the length of the DMRS sequence for the PUSCH is N (where N≥30 or N>30), the higher-layer parameter groupHoppingEnabledTransformPrecoding and/or sequenceGroupHopping and/or sequenceHopping may be ignored.

In some embodiments, if the number of allocated Resource Blocks (RBs) for PUCCH is M (where M is an integer and M>0), the length of the DMRS sequence for the PUCCH is N=12*M. In some embodiments, if the number of allocated RBs for PUCCH is M (where M≥3 or M>3) or if the length of the DMRS sequence for the PUCCH is N (where N≥36 or N>36), the DMRS sequence for the PUCCH may be generated based on a pseudo-random sequence. In some embodiments, if the number of allocated RBs for PUCCH is M (where M≥3 or M>3) or if the length of the DMRS sequence for the PUCCH is N (where N≥36 or N>36), there may be no sequence hopping and/or group hopping. In some embodiments, if the number of allocated RBs for PUCCH is M (where M≥3 or M>3) or if the length of the DMRS sequence for the PUCCH is N (where N≥36 or N>36), the higher-layer parameter pucch-GroupHopping may be ignored. In some embodiments, if the number of allocated RBs for PUCCH is M (where M≥3 or M>3) or if the length of the DMRS sequence for the PUCCH is N (where N≥36 or N>36), the higher-layer parameter pucch-GroupHopping may be only configured as 'neither'. In some embodiments, if the number of allocated RBs for PUCCH is M (where M≥3 or M>3) or if the length of the DMRS sequence for the PUCCH is N (where N≥36 or N>36), the higher-layer parameter pucch-GroupHopping may only be configured as 'neither' or 'enabled'. In some embodiments, if the number of allocated RBs for PUCCH is M (where M≥3 or M>3) or if the length of the DMRS sequence for the PUCCH is N (where N≥36 or N>36), the value of sequence hopping (such as, 'v' in the 3GPP specification 38.211) may be fixed as 0.

In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), the DMRS sequence for PUSCH may be generated based on a Computer Generated (CG) sequence, and there may be 30 sequences in the predetermined sequence table. In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), there may be sequence hopping and/or group hopping within the sequence table. In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), there may be only group hopping. In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), the higher-layer parameter sequenceHopping may be ignored. In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), there may be only sequence hopping. In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), the higher-layer parameter sequenceGroupHopping and/or groupHoppingEnabledTransformPrecoding may be ignored. In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), the value of sequence hopping (such as, 'v' in the 3GPP specification 38.211) may be fixed as 0.

In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), the DMRS sequence for PUSCH may be generated based on a Computer Generated (CG) sequence, and there may be 30 sequences in the predetermined sequence table. In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), there may be sequence hopping and/or group hopping within the sequence table. In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), there may be only group hopping. In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), the higher-layer parameter sequenceHopping may be ignored. In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), there may be only sequence hopping. In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), the higher-layer parameter pucch-GroupHopping may be only configured as 'neither'. In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), the higher-layer parameter pucch-GroupHopping may only be configured as 'neither' or 'enabled'. In some embodiments, if the number of allocated RBs for PUCCH is M (where M<3, for example, M∈{1, 2}; or M≤3, for example, M∈{1, 2, 3}) or if the length of the DMRS sequence for the PUSCH is N (where N<36, for example N∈{12, 24}; or N≤36, for example, N∈{12, 24, 36}), the value of sequence hopping (such as, 'v' in the 3GPP specification 38.211) may be fixed as 0.

In some embodiments, if the number of allocated RBs for PUSCH is M (where M≥5 or M>5), the length of the DMRS sequence for the PUSCH is N=12*M/2, and the DMRS sequence for the PUSCH may be generated based on a pseudo-random sequence. In some embodiments, if the number of allocated RBs for PUCCH is M (where M≥3 or M>3), the length of the DMRS sequence for the PUCCH is N=12*M, and the DMRS sequence for the PUCCH may be generated based on a pseudo-random sequence. In some embodiments, the pseudo-random sequence generator may be initialized with:

$$c_{init}=(2^X(N_{symb}^{slot}n_{s,f}^{\mu}+l+1)(Y \cdot n_{ID}^{RS}+1)+Z \cdot n_{ID}^{RS}) \mod P$$

or $$c_{init}=2^X(N_{symb}^{slot}n_{s,f}^{\mu}+l+1)(Y \cdot n_{ID}^{RS}+1)+Z \cdot n_{ID}^{RS}$$

where l represents the OFDM symbol number within a slot, and $n_{s,f}^{\mu}$ represents the slot number within a frame. If $n_{ID}^{PUSCH}$ is configured by the higher-layer parameter nPUSCH-Identity in the DMRS-Uplink IE and the PUSCH is not a msg3 PUSCH, then $n_{ID}^{RS}=n_{ID}^{PUSCH}$, otherwise $n_{ID}^{RS}=N_{ID}^{cell}$, where $N_{ID}^{cell}$ is the physical layer cell identity. In addition, X may be any one of {10, 11, 12, 16, 17}, Y may be any one of {1, 2}, and Z may be any one of {1, 2}. P may be $2^{31}$ or 30 or 60, if P is present in the formula. $N_{symb}^{slot}$ represents the number of consecutive OFDM symbols in a slot, where $N_{symb}^{slot}$ depends on the cyclic prefix. For example, for normal cyclic prefix, $N_{symb}^{slot}=14$. As another example, for extended cyclic prefix, $N_{symb}^{slot}=12$.

In some embodiments, if the number of allocated RBs for PUSCH is M (where M≥5 or M>5), the length of the DMRS sequence for the PUSCH is N=12*M/2, and the DMRS sequence for the PUSCH may be generated based on a pseudo-random sequence. In some embodiments, if the number of allocated RBs for PUCCH is M (where M≥3 or M>3), the length of the DMRS sequence for the PUCCH is N=12*M, and the DMRS sequence for the PUCCH may be generated based on a pseudo-random sequence. In some embodiments, the pseudo-random sequence generator may be initialized with:

$$c_{init}=(2^X(N_{symb}^{slot}n_{s,f}^{\mu}+l+1)(Y \cdot n_{ID}+1)+Z \cdot n_{ID}) \mod P$$

or $$c_{init}=2^X(N_{symb}^{slot}n_{s,f}^{\mu}+l+1)(Y \cdot n_{ID}+1)+Z \cdot n_{ID}$$

where l represents the OFDM symbol number within a slot, and $n_{s,f}^{\mu}$ represents the slot number within a frame. In addition, X may be any one of {5, 6, 7, 10, 11, 12, 16, 17}, Y may be any one of {1, 2} and Z may be any one of {1, 2}. P may be $2^{31}$ or 30 or 60, if P is present in the formula. $N_{symb}^{slot}$ represents the number of consecutive OFDM symbols in a slot, where $N_{symb}^{slot}$ depends on the cyclic prefix. For example, for normal cyclic prefix, $N_{symb}^{slot}=14$. As another example, for extended cyclic prefix, $N_{symb}^{slot}=12$. In some embodiments, for PUSCH, if $n_{ID}^{PUSCH}$ is configured by the higher-layer parameter nPUSCH-Identity in the DMRS-Uplink IE and the PUSCH is not a msg3 PUSCH, then $n_{ID}=n_{ID}^{PUSCH}$ mod 30 or $n_{ID}=\lfloor n_{ID}^{PUSCH}/30 \rfloor$ or $n_{ID}=n_{ID}^{PUSCH}$, otherwise $n_{ID}=N_{ID}^{cell}$ mod 30 or $n_{ID}=\lfloor N_{ID}^{PUSCH}/30 \rfloor$ or $n_{ID}=N_{ID}^{cell}$, where $N_{ID}^{cell}$ is the physical layer cell identity. In some embodiments, for PUCCH, if the higher-layer parameter hoppingID is configured, the value of $n_{ID}$ is given by hoppingID or $n_{ID}$=hoppingID mod 30 or $n_{ID}=\lfloor$hoppingID/30$\rfloor$, otherwise (for example, if the higher-layer parameter hoppingID is not configured), $n_{ID}=N_{ID}^{cell}$ mod 30 or $n_{ID}=\lfloor N_{ID}^{cell}/30 \rfloor$ or $n_{ID}=N_{ID}^{cell}$, where $N_{ID}^{cell}$ is the physical layer cell identity.

In some embodiments, if the number of allocated RBs for PUSCH is M (where M≥5 or M>5), the length of the DMRS sequence for the PUSCH is N=12*M/2, and the DMRS sequence for the PUSCH may be generated based on a pseudo-random sequence. In some embodiments, if the number of allocated RBs for PUCCH is M (where M≥3 or M>3), the length of the DMRS sequence for the PUCCH is N=12*M, and the DMRS sequence for the PUCCH may be generated based on a pseudo-random sequence. In some embodiments, the pseudo-random sequence generator may be initialized with:

$$c_{init}=(f_{gh}+n_{ID}^{RS}) \bmod 30$$

where if group hopping is enabled, $f_{gh}=(\Sigma_{m=0}^{7} 2^m \cdot c(8(N_{symb}^{slot} n_{s,f}^{\mu}+l)+m))\bmod 30$; and if group hopping is disabled, $f_{gh}=0$. $c(i)$ represents a pseudo-random sequence, which is initialized with $c_{init}=\lfloor n_{ID}^{RS}/30 \rfloor$ or $c_{init}=n_{ID}^{RS}$ or $c_{init}=n_{ID}^{RS}$, mod 30. l represents the OFDM symbol number within a slot, and $n_{s,f}^{\mu}$ represents the slot number within a frame. $N_{symb}^{slot}$ represents the number of consecutive OFDM symbols in a slot, where $N_{symb}^{slot}$ depends on the cyclic prefix. For example, for normal cyclic prefix, $N_{symb}^{slot}=14$. As another example, for extended cyclic prefix, $N_{symb}^{slot}=12$. In some embodiments, for PUSCH, if $n_{ID}^{PUSCH}$ is configured by the higher-layer parameter nPUSCH-Identity in the DMRS-Uplink IE and the PUSCH is not a msg3 PUSCH, then $n_{ID}^{RS}=n_{ID}^{PUSCH}$, otherwise $n_{ID}^{RS}=N_{ID}^{cell}$, where $N_{ID}^{cell}$ is the physical layer cell identity. In some embodiments, for PUCCH, if the higher-layer parameter hoppingID is configured, the value of $n_{ID}$ is given by hoppingID, otherwise (for example, if the higher-layer parameter hoppingID is not configured), $n_{ID}=N_{ID}^{cell}$, where $N_{ID}^{cell}$ is the physical layer cell identity.

In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), the DMRS sequence for PUSCH may be generated based on a Computer Generated (CG) sequence, and there may be 30 or 60 sequences in the predetermined sequence table. In some embodiments, if the number of allocated RBs for PUCCH is M (where M<3, for example, M∈{1, 2}; or M≤3, for example, M∈{1, 2, 3}) or if the length of the DMRS sequence for the PUCCH is N (where N<36, for example, N∈{12, 24}; or N≤36, for example, N∈{12, 24, 36}), the DMRS sequence for the PUCCH may be generated based on a pseudo-random sequence, and there may be 30 or 60 sequences in the predetermined sequence table. In some embodiments, an index μ of a sequence within the predetermined sequence table may be:

$$\mu=(f_{gh}+n_{ID}^{RS}) \bmod 30$$

where if group hopping is enabled, $f_{gh}=(\Sigma_{m=0}^{7} 2^m \cdot c(8(N_{symb}^{slot} n_{s,f}^{\mu}+l)+m))\bmod 30$; and if group hopping is disabled, $f_{gh}=0$. $c(i)$ represents a pseudo-random sequence, which is initialized with $c_{init}=\lfloor n_{ID}^{RS}/30 \rfloor$ or $c_{init}=n_{ID}^{RS}$. l represents the OFDM symbol number within a slot, and $n_{s,f}^{\mu}$ represents the slot number within a frame. $N_{symb}^{slot}$ represents the number of consecutive OFDM symbols in a slot, where $N_{symb}^{slot}$ depends on the cyclic prefix. For example, for normal cyclic prefix, $N_{symb}^{slot}=14$. As another example, for extended cyclic prefix, $N_{symb}^{slot}=12$. In some embodiments, for PUSCH, if $n_{ID}^{PUSCH}$ is configured by the higher-layer parameter nPUSCH-Identity in the DMRS-Uplink IE and the PUSCH is not a msg3 PUSCH, then $n_{ID}^{RS}=n_{ID}^{PUSCH}$, otherwise $n_{ID}^{RS}=N_{ID}^{cell}$, where $N_{ID}^{cell}$ is the physical layer cell identity. In some embodiments, for PUCCH, if the higher-layer parameter hoppingID is configured, the value of $n_{ID}$ is given by hoppingID, otherwise (for example, if the higher-layer parameter hoppingID is not configured), $n_{ID}=N_{ID}^{cell}$, where $N_{ID}^{cell}$ is the physical layer cell identity.

In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), the DMRS sequence for PUSCH may be generated based on a Computer Generated (CG) sequence, and there may be 30 or 60 sequences in the predetermined sequence table. In some embodiments, if the number of allocated RBs for PUCCH is M (where M<3, for example, M∈{1, 2, 3}; or M≤3, for example, M∈{1, 2}), or if the length of the DMRS sequence for PUCCH is N (where N<36, for example N∈{12, 24}; or N≤36, for example, N∈{12, 24, 36}), the DMRS sequence for the PUCCH may be generated based on a pseudo-random sequence, and there may be 30 or 60 sequences in the predetermined sequence table. In some embodiments, an index μ of a sequence within the predetermined sequence table may be:

$$\mu=(f_{gh}+f_{ss}) \bmod 30$$

where if group hopping is enabled, $f_{gh}=(\Sigma_{m=0}^{7} 2^m \cdot c(8(2n_{s,f}^{\mu}+n_{hop})+m))\bmod 30$; and if group hopping is disabled, $f_{gh}=0$. In addition, $f_{ss}=n_{ID}$ mod 30. $c(i)$ represents a pseudo-random sequence, which is initialized with $c_{init}=\lfloor n_{ID}/30 \rfloor$ or $c_{init}=n_{ID}$. $n_{s,f}^{\mu}$ represents the slot number within a frame. $n_{hop}$ represents a frequency hopping index, where if intra-slot frequency hopping is disabled by the higher-layer parameter intraSlotFrequencyHopping, $n_{hop}=0$; and if intra-slot frequency hopping is enabled by the higher-layer parameter intraSlotFrequencyHopping, $n_{hop}=0$ for the first hop, and $n_{hop}=1$ for the second hop. $N_{symb}^{slot}$ represents the number of consecutive OFDM symbols in a slot, where $N_{symb}^{slot}$ depends on the cyclic prefix. For example, for normal cyclic prefix, $N_{symb}^{slot}=14$. As another example, for extended cyclic prefix, $N_{symb}^{slot}=12$. In some embodiments, for PUCCH, if the higher-layer parameter hoppingID is configured, the value of $n_{ID}$ is given by hoppingID, otherwise (for example, if the higher-layer parameter hoppingID is not configured), $n_{ID}=N_{ID}^{cell}$, where $N_{ID}^{cell}$ is the physical layer cell identity.

In some embodiments, if the number of allocated RBs for PUSCH is M (where M<5, for example, M∈{1, 2, 3, 4}; or M≤5, for example, M∈{1, 2, 3, 4, 5}) or if the length of the DMRS sequence for the PUSCH is N (where N<30, for example, N∈{6, 12, 18, 24}; or N≤30, for example, N∈{6, 12, 18, 24, 30}), the DMRS sequence for PUSCH may be generated based on a Computer Generated (CG) sequence. In some embodiments, if the number of allocated RBs for PUCCH is M (where M<3, for example, M∈{1, 2, 3}; or M≤3, for example, M∈{1, 2}), or if the length of the DMRS sequence for the PUCCH is N (where N<36, for example, N∈{12, 24}; or N≤36, for example, N∈{12, 24, 36}), the DMRS sequence for the PUCCH may be generated based on a pseudo-random sequence. In some embodiments, for a given value of M and/or a given value of N, there may be one predetermined sequence table, and there may be Q sequences in the predetermined sequence table. For example, Q=30 or Q=60. The Q sequences may be divided into E groups, and within each group, there may be F sequences. In some embodiments, the sequences in each group may be orthogonal to each other. That is, for any two different sequences $Q_i$ and $Q_j$ in one group, $Q_i*Q_j^H=0$, where H may represent the conjugate transpose of a sequence. In some embodiments, the sequences in different groups may be orthogonal to each other. That is, for any two different sequences $Q_i$ and $Q_j$ from different groups, $Q_i*Q_j^H=0$, where H may represent the conjugate transpose of a sequence. In some embodiments, if group hopping is enabled, sequences for generating the DMRS sequences may be selected across different groups. If sequence hopping is enabled, sequences for generating the DMRS sequences may be selected within one group.

In some embodiments, a sequence $B_j$ from the predetermined sequence table T may be composed of values $b_j(i)$, in which j represents a sequence index within the predetermined sequence table T, j is an integer and $0 \leq j \leq Q-1$, and Q represents the number of sequences within the predetermined sequence table T. For example, T may be any 30 or 60. In addition, i may represent the index of value within the sequence $B_j$, where i is an integer and $0 \leq i \leq N-1$, and where N is the sequence length. For example, N may be any one of {6, 12, 18, 24, 30}. The sequence $B_j$ may be mapped to complex-valued modulation symbols d(i) according to the above equation (1-1) or equation (1-3) or equation (1-4). In some embodiments, each $b_j(i)$ in the sequence $B_j$ from the predetermined sequence table T may be multiplied with an orthogonal sequences $w_k(i)$ before transformation according to the above equation (1-2), where k is an index of a sequence within a predetermined orthogonal sequence table, and k may be any one of {0, 1, 2, 3} or k may be any one of {0,1}. That is, the sequence for transformation according to the above equation (1-2) may be according to: $b_j'(i)=b_j(i)*w_k(i)$, where i is an integer, and $0 \leq i \leq N-1$, and where N is the sequence length.

In some embodiments, if the predetermined sequence length (that is, N) is 6, the predetermined plurality of orthogonal sequences may include one or more of CG sequences in Table 1-A-1, Table 1-A-2, Table 1-A-3 or Table 1-A-4:

TABLE 1-A-1

| k | Orthogonal sequences $w_k(0), w_k(1), \ldots w_k(5)$ |
|---|---|
| $k_0$ | [+1, +1, +1, +1, +1, +1] |
| $k_1$ | [+1, −1, +1, −1, +1, −1] |

TABLE 1-A-2

| k | Orthogonal sequences $w_k(0), w_k(1), \ldots w_k(5)$ |
|---|---|
| $k_0$ | [+1, +1, +1, +1, +1, +1] |
| $k_1$ | [+1, +1, +1, −1, −1, −1] |

TABLE 1-A-3

| k | Orthogonal sequences $w_k(0), w_k(1), \ldots w_k(5)$ |
|---|---|
| $k_0$ | [+1, +1, +1, +1, +1, +1] |
| $k_1$ | [−1, +1, −1, +1, −1, +1] |

TABLE 1-A-4

| k | Orthogonal sequences $w_k(0), w_k(1), \ldots w_k(5)$ |
|---|---|
| $k_0$ | [+1, +1, +1, +1, +1, +1] |
| $k_1$ | [−1, −1, −1, +1, +1, +1] |

In some embodiments, if the predetermined sequence length (that is, N) is 12, the predetermined plurality of orthogonal sequences may include one or more of CG sequences in Table 1-B-1, Table 1-B-2, Table 1-B-3, Table 1-B-4, Table 1-B-5, Table 1-B-6, Table 1-B-7 or Table 1-B-8:

TABLE 1-B-1

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [+1, −1, +1, −1, +1, −1, +1, −1, +1, −1, +1, −1] |

TABLE 1-B-2

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [+1, +1, +1, +1, +1, +1, −1, −1, −1, −1, −1, −1] |

TABLE 1-B-3

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [−1, +1, −1, +1, −1, +1, −1, +1, −1, +1, −1, +1] |

TABLE 1-B-4

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [−1, −1, −1, −1, −1, −1, +1, +1, +1, +1, +1, +1] |

TABLE 1-B-5

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [+1, −1, +1, −1, +1, −1, +1, −1, +1, −1, +1, −1] |
| $k_2$ | [+1, +1, −1, −1, +1, +1, −1, −1, +1, +1, −1, −1] |
| $k_3$ | [+1, −1, −1, +1, +1, −1, −1, +1, +1, −1, −1, +1] |

TABLE 1-B-6

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [+1, +1, +1, +1, +1, +1, −1, −1, −1, −1, −1, −1] |
| $k_2$ | [+1, +1, +1, −1, −1, −1, +1, +1, +1, −1, −1, −1] |
| $k_3$ | [+1, +1, +1, −1, −1, −1, −1, −1, −1, +1, +1, +1] |

TABLE 1-B-7

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [−1, +1, −1, +1, −1, +1, −1, +1, −1, +1, −1, +1] |
| $k_2$ | [−1, −1, +1, +1, −1, −1, +1, +1, −1, −1, +1, +1] |
| $k_3$ | [−1, +1, +1, −1, −1, +1, +1, −1, −1, +1, +1, −1] |

TABLE 1-B-8

| k | Orthogonal sequences $w_k(0), w_k(1), \ldots w_k(11)$ |
|---|---|
| $k_0$ | [+1, +1, +1, +1, +1, +1, +1, +1, +1, +1, +1, +1] |
| $k_1$ | [−1, −1, −1, −1, −1, −1, +1, +1, +1, +1, +1, +1] |
| $k_2$ | [−1, −1, −1, +1, +1, +1, −1, −1, −1, +1, +1, +1] |
| $k_3$ | [−1, −1, −1, +1, +1, +1, +1, +1, +1, −1, −1, −1] |

In some embodiments, if the predetermined sequence length (that is, N) is 18, the predetermined plurality of orthogonal sequences may include one or more of CG sequences in Table 1-C-1, Table 1-C-2, Table 1-C-3 or 1-C-4:

TABLE 1-C-1

| k | Orthogonal sequences $w_k(0), w_k(1), \ldots w_k(17)$ |
|---|---|
| $k_0$ | [+1, +1, +1, +1, +1, +1, +1, +1, +1, +1, +1, +1, +1, +1, +1, +1, +1, +1] |
| $k_1$ | [+1, −1, +1, −1, +1, −1, +1, −1, +1, −1, +1, −1, +1, −1, +1, −1, +1, −1] |

TABLE 1-C-2

| k | Orthogonal sequences $w_k(0), w_k(1), \ldots w_k(17)$ |
|---|---|
| $k_0$ | [+1, +1, +1, +1, +1, +1, +1, +1, +1, +1, +1, +1, +1, +1, +1, +1, +1, +1] |
| $k_1$ | [+1, +1, +1, +1, +1, +1, +1, +1, +1, −1, −1, −1, −1, −1, −1, −1, −1, −1] |

TABLE 1-C-3

| k | Orthogonal sequences $w_k(0), w_k(1), \ldots w_k(17)$ |
|---|---|
| $k_0$ | [+1, +1, +1, +1, +1, +1, +1, +1, +1, +1, +1, +1, +1, +1, +1, +1, +1, +1] |
| $k_1$ | [−1, +1, −1, +1, −1, +1, −1, +1, −1, +1, −1, +1, −1, +1, −1, +1, −1, +1] |

TABLE 1-C-4

| k | Orthogonal sequences $w_k(0), w_k(1), \ldots w_k(17)$ |
|---|---|
| $k_0$ | [+1, +1, +1, +1, +1, +1, +1, +1, +1, +1, +1, +1, +1, +1, +1, +1, +1, +1] |
| $k_1$ | [−1, −1, −1, −1, −1, −1, −1, −1, −1, +1, +1, +1, +1, +1, +1, +1, +1, +1] |

In some embodiments, if the predetermined sequence length (that is, N) is 24, the predetermined plurality of orthogonal sequences may include one or more of CG sequences in Table 1-D-1, Table 1-D-2, Table 1-D-3, Table 1-D-4, Table 1-D-5, Table 1-D-6, Table 1-D-7 or Table 1-D-8:

TABLE 1-D-1

| k | Orthogonal sequences $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [+1, −1, +1, −1, +1, −1, +1, −1, +1, −1, +1, −1, +1, −1, +1, −1, +1, −1, +1, −1, +1, −1, +1, −1] |

TABLE 1-D-2

| k | Orthogonal sequences $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [+1, +1, +1, +1, +1, +1, +1, +1, +1, +1, +1, +1, −1, −1, −1, −1, −1, −1, −1, −1, −1, −1, −1, −1] |

TABLE 1-D-3

| k | Orthogonal sequences $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [−1, +1, −1, +1, −1, +1, −1, +1, −1, +1, −1, +1, −1, +1, −1, +1, −1, +1, −1, +1, −1, +1, −1, +1] |

TABLE 1-D-4

| k | Orthogonal sequences $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [−1, −1, −1, −1, −1, −1, −1, −1, −1, −1, −1, −1, +1, +1, +1, +1, +1, +1, +1, +1, +1, +1, +1, +1] |

TABLE 1-D-5

| k | $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [+1, −1, +1, −1, +1, −1, +1, −1, +1, −1, +1, −1, +1, −1, +1, −1, +1, −1, +1, −1, +1, −1, +1, −1] |
| $k_2$ | [+1, +1, −1, −1, +1, +1, −1, −1, +1, +1, −1, −1, +1, +1, −1, −1, +1, +1, −1, −1, +1, +1, −1, −1] |
| $k_3$ | [+1, −1, −1, +1, +1, −1, −1, +1, +1, −1, −1, +1, +1, −1, −1, +1, +1, −1, −1, +1, +1, −1, −1, +1] |

TABLE 1-D-6

| k | $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [+1, +1, +1, +1, +1, +1, +1, +1, +1, +1, +1, +1, −1, −1, −1, −1, −1, −1, −1, −1, −1, −1, −1, −1] |
| $k_2$ | [+1, +1, +1, +1, +1, +1, −1, −1, −1, −1, −1, −1, +1, +1, +1, +1, +1, +1, −1, −1, −1, −1, −1, −1] |
| $k_3$ | [+1, +1, +1, +1, +1, +1, −1, −1, −1, −1, −1, −1, −1, −1, −1, −1, −1, −1, +1, +1, +1, +1, +1, +1] |

TABLE 1-D-7

| k | $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [−1, +1, −1, +1, −1, +1, −1, +1, −1, +1, −1, +1, −1, +1, −1, +1, −1, +1, −1, +1, −1, +1, −1, +1] |
| $k_2$ | [−1, −1, +1, +1, −1, −1, +1, +1, −1, −1, +1, +1, −1, −1, +1, +1, −1, −1, +1, +1, −1, −1, +1, +1] |
| $k_3$ | [−1, +1, +1, −1, −1, +1, +1, −1, −1, +1, +1, −1, −1, +1, +1, −1, −1, +1, +1, −1, −1, +1, +1, −1] |

TABLE 1-D-8

| k | $w_k(0), w_k(1), \ldots w_k(23)$ |
|---|---|
| $k_0$ | [+1, +1, +1, +1, +1, +1, +1, +1, +1, +1, +1, +1, +1, +1, +1, +1, +1, +1, +1, +1, +1, +1, +1, +1] |
| $k_1$ | [−1, −1, −1, −1, −1, −1, −1, −1, −1, −1, −1, −1, +1, +1, +1, +1, +1, +1, +1, +1, +1, +1, +1, +1] |
| $k_2$ | [−1, −1, −1, −1, −1, −1, +1, +1, +1, +1, +1, +1, −1, −1, −1, −1, −1, −1, +1, +1, +1, +1, +1, +1] |
| $k_3$ | [−1, −1, −1, −1, −1, −1, +1, +1, +1, +1, +1, +1, +1, +1, +1, +1, +1, +1, −1, −1, −1, −1, −1, −1] |

In some embodiments, if the predetermined sequence length (that is, N) equals to or greater than 30, the predetermined plurality of orthogonal sequences may include one or more of CG sequences in Table 1-E-1, Table 1-E-2, Table 1-E-3 or Table 1-E-4:

TABLE 1-E-1

| k | $w_k(i), 0 \leq i \leq N-1$ |
|---|---|
| $k_0$ | $w_0(i) = +1$ |

TABLE 1-E-1-continued

| k | $w_k(i), 0 \leq i \leq N-1$ |
|---|---|
| $k_1$ | $w_1(i) = (-1)^i$ |

TABLE 1-E-2

| k | $w_k(i), 0 \leq i \leq N-1$ |
|---|---|
| $k_0$ | $w_0(i) = +1$ |
| $k_1$ | $w_1(i) = (-1)^{i+1}$ |

TABLE 1-E-3

| k | $w_k(l), 0 \leq l \leq 3, l = i \bmod 4, 0 \leq i \leq N-1$ |
|---|---|
| $k_0$ | [+1, +1, +1, +1] |
| $k_1$ | [+1, −1, +1, −1] |
| $k_2$ | [+1, +1, −1, −1] |
| $k_3$ | [+1, −1, −1, +1] |

TABLE 1-E-4

| k | $w_k(l), 0 \leq l \leq 3, l = i \bmod 4, 0 \leq i \leq N-1$ |
|---|---|
| $k_0$ | [+1, +1, +1, +1] |
| $k_1$ | [−1, +1, −1, +1] |
| $k_2$ | [−1, −1, +1, +1] |
| $k_3$ | [−1, +1, +1, −1] |

In some embodiments, in a given one of the above Tables 1-A/C/E-1/2/3/4 and Tables 1-B/D-1/2/3/4/5/6/7/8, the value of $k_0$ may be 0 and the value of $k_1$ may be 1. In some embodiments, in a given one of the above tables, the value of $k_0$ may be 1 and the value of $k_1$ may be 0. In some embodiments, in a given one of the above tables, the value of $k_0$ may be any one of {0, 1, 2, 3}, the value of $k_1$ may be any one of {0, 1, 2, 3}, the value of $k_2$ may be any one of {0, 1, 2, 3}, and the value of $k_3$ may be any one of {0, 1, 2, 3}. In addition, the values of $k_0$, $k_1$, $k_2$ and $k_3$ may be different from each other. That is, all of the values of $k_0$, $k_1$, $k_2$ and $k_3$ should be included in a set {0, 1, 2, 3}.

In some embodiments, if the predetermined sequence length is 6, the predetermined sequence table for DMRS with length 6 may include one or more of CG sequences in Table 1-1:

TABLE 1-1

Length-6 CG sequences for π/2-BPSK

| Index | CG Sequence {b(0), . . . , b(5)} |
|---|---|
| $\mu_0$ | {0, 0, 1, 1, 1, 0} or {1, 1, 0, 0, 0, 1} |
| $\mu_1$ | {1, 0, 0, 1, 0, 0} or {0, 1, 1, 0, 0, 1} |
| $\mu_2$ | {1, 1, 1, 0, 0, 0} or {0, 0, 0, 1, 1, 1} |
| $\mu_3$ | {0, 1, 0, 0, 1, 0} |

TABLE 1-1-continued

Length-6 CG sequences for π/2-BPSK

| Index | CG Sequence {b(0), ..., b(5)} |
|---|---|
| $\mu_4$ | or {1, 0, 1, 1, 0, 1} |
| | {0, 1, 1, 1, 0, 0} |
| $\mu_5$ | or {1, 0, 0, 0, 1, 1} |
| | {1, 1, 0, 1, 1, 0} |
| $\mu_6$ | or {0, 0, 1, 0, 0, 1} |
| | {0, 1, 1, 1, 1, 0} |
| $\mu_7$ | or {1, 0, 0, 0, 0, 1} |
| | {0, 1, 1, 0, 0, 0} |
| $\mu_8$ | or {1, 0, 0, 1, 1, 1} |
| | {0, 1, 0, 1, 1, 0} |
| $\mu_9$ | or {1, 0, 1, 0, 0, 1} |
| | {1, 0, 0, 1, 1, 0} |
| $\mu_{10}$ | or {0, 1, 1, 0, 0, 1} |
| | {0, 1, 1, 0, 1, 0} |
| $\mu_{11}$ | or {1, 0, 0, 1, 0, 1} |
| | {0, 0, 0, 1, 1, 0} |
| $\mu_{12}$ | or {1, 1, 1, 0, 0, 1} |
| | {1, 1, 0, 0, 0, 0} |
| $\mu_{13}$ | or {0, 0, 1, 1, 1, 1} |
| | {1, 0, 1, 1, 0, 0} |
| $\mu_{14}$ | or {0, 1, 0, 0, 1, 1} |
| | {0, 0, 1, 1, 0, 0} |
| $\mu_{15}$ | or {1, 1, 0, 0, 1, 1} |
| | {1, 1, 0, 0, 1, 0} |
| $\mu_{16}$ | or {0, 0, 1, 1, 0, 1} |
| | {1, 1, 0, 1, 0, 0} |
| $\mu_{17}$ | or {0, 0, 1, 0, 1, 1} |
| | {1, 1, 1, 1, 0, 0} |
| $\mu_{18}$ | or {0, 0, 0, 0, 1, 1} |
| | {1, 1, 1, 0, 1, 0} |
| $\mu_{19}$ | or {0, 0, 0, 1, 0, 1} |
| | {0, 0, 0, 0, 1, 0} |
| $\mu_{20}$ | or {1, 1, 1, 1, 0, 1} |
| | {0, 0, 1, 0, 1, 0} |
| $\mu_{21}$ | or {1, 1, 0, 1, 0, 1} |
| | {0, 0, 0, 1, 0, 0} |
| $\mu_{22}$ | or {1, 1, 1, 0, 1, 1} |
| | {0, 1, 0, 0, 0, 0} |
| $\mu_{23}$ | or {1, 0, 1, 1, 1, 1} |
| | {1, 0, 0, 0, 0, 0} |
| $\mu_{24}$ | or {0, 1, 1, 1, 1, 1} |
| | {1, 0, 1, 0, 0, 0} |
| $\mu_{25}$ | or {0, 1, 0, 1, 1, 1} |
| | {1, 0, 1, 1, 1, 0} |
| $\mu_{26}$ | or {0, 1, 0, 0, 0, 1} |
| | {0, 1, 0, 1, 0, 0} |
| $\mu_{27}$ | or {1, 0, 1, 0, 1, 1} |
| | {0, 0, 1, 0, 0, 0} |
| $\mu_{28}$ | or {1, 1, 0, 1, 1, 1} |
| | {1, 0, 0, 0, 1, 0} |
| $\mu_{29}$ | or {0, 1, 1, 1, 0, 1} |
| | {1, 1, 1, 1, 1, 0} |
| | or {0, 0, 0, 0, 0, 1} |

Figure 4A:
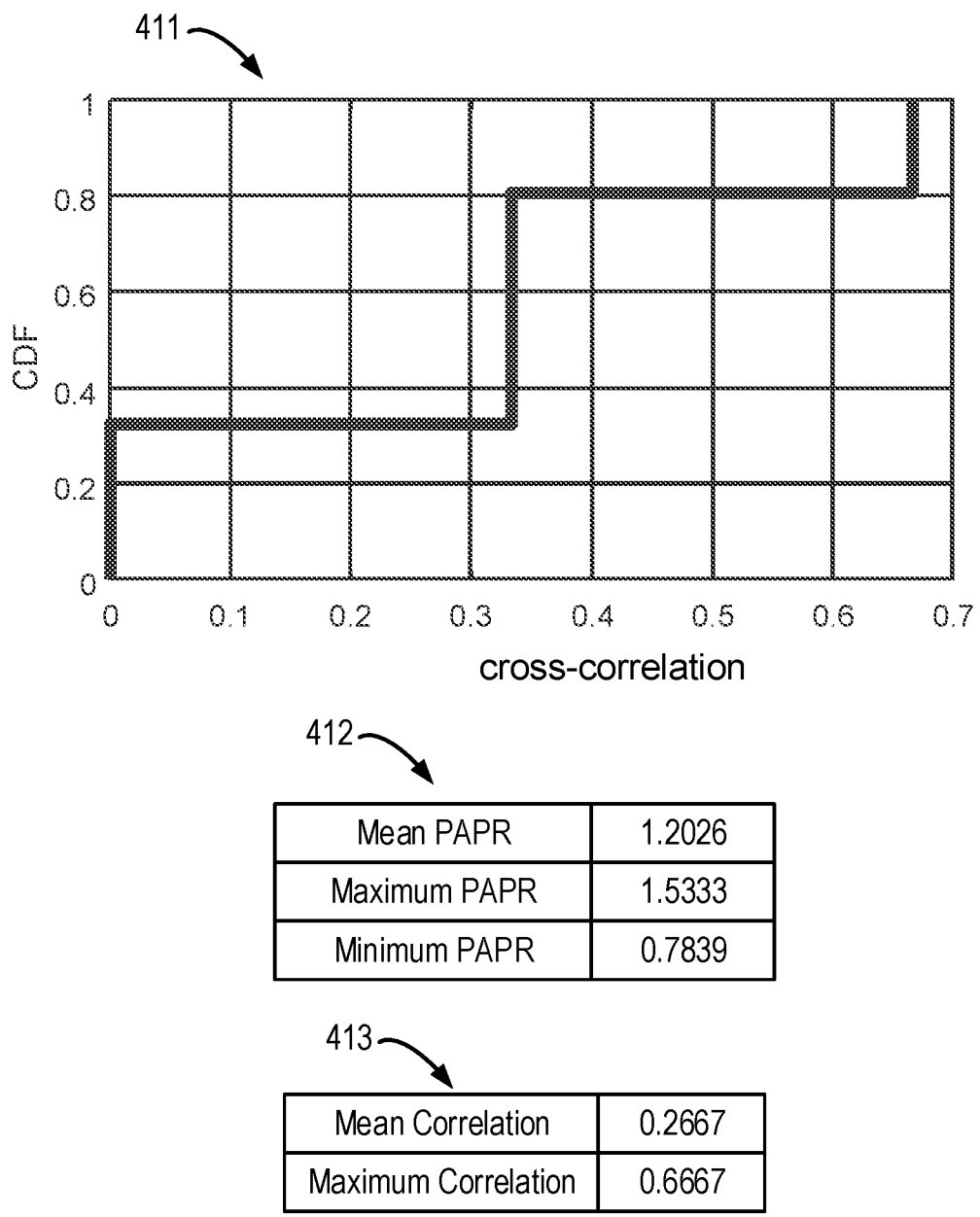
FIG. 4A shows the performance of Length-6 CG sequences for $\pi/2$-BPSK in accordance with some embodiments of the present disclosure.

FIG. 4A shows the performance of the CG sequences in Table 1-1. For example, the cross-correlation performance of the CG sequences in Table 1-1 is shown in a cumulative distribution function (CDF) curve 411 in FIG. 4A, in which the horizontal axis may represent autocorrelation values and the vertical axis may represent cumulative distribution probabilities. The PAPR performance (including the mean PAPR, the maximum PAPR and the minimum PAPR) of the CG sequences in Table 1-1 is shown in Table 412 in FIG. 4A. The cross-correlation performance (including the mean cross-correlation and the maximum cross-correlation) of the CG sequences in Table 1-1 is shown in Table 413 in FIG. 4A.

In some embodiments, any sequence from Table 1-1 may be mapped to complex-valued modulation symbols d(i) according to the above equation (1-1).

In some embodiments, in the above Table 1-1, L (where L is an integer and 1≤L<30) CG sequences each with an index $\mu_s$ (where s is an integer and 0≤s≤29) may be included in the predetermined sequence table for DMRS with length 6. For example, $\mu_s \in [0, 29]$. For two sequences with a same index $\mu_s$ in the above Table 1-1, either one of the two sequences can be included in the predetermined sequence table for DMRS with length 6. In some embodiments, if there are more than one sequence from the above Table 1-1 included in the predetermined sequence table for DMRS with length 6, the indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2.

In some embodiments, in the above Table 1-1, all of the 30 CG sequences may be included in the predetermined sequence table for DMRS with length 6, and $\mu_s$ may represent an index of sequence, where s is an integer and 0≤s≤29. For example, $\mu_s \in [0, 29]$. For each index $\mu_s$, either one of the two sequences can be included in the predetermined sequence table for DMRS with length 6. The indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, the sequences in the above Table 1-1 cannot be used for DMRS of PUCCH.

In some embodiments, if the predetermined sequence length is 6, the predetermined sequence table for DMRS with length 6 may include L (where L is an integer and 1≤L≤30) CG sequences in Table 1-2:

TABLE 1-2

Length-6 CG sequences

| Index | CG Sequence {b(0), ..., b(5)} |
|---|---|
| $\mu_0$ | {-3, 1, -3, 1, 1, 1} or |
| | {1, -3, 1, -3, -3, -3} |
| $\mu_1$ | {3, -3, 1, 3, 1, 1} or |
| | {-1, 1, -3, -1, -3, -3} |
| $\mu_2$ | {-3, 1, 1, -3, 1, 1} or |
| | {1, -3, -3, 1, -3, -3} |
| $\mu_3$ | {1, -3, 1, -3, 1, 1} or |
| | {-3, 1, -3, 1, -3, -3} |
| $\mu_4$ | {3, -1, 1, -3, 1, 1} or |
| | {-1, 3, -3, 1, -3, -3} |
| $\mu_5$ | {3, 1, 3, -3, 1, 1} or |
| | {-1, -3, -1, 1, -3, -3} |
| $\mu_6$ | {3, -3, 3, -3, 1, 1} or |
| | {-1, 1, -1, 1, -3, -3} |
| $\mu_7$ | {-3, -1, -3, -1, 1, 1} or |
| | {1, 3, 1, 3, -3, -3} |
| $\mu_8$ | {3, -3, 1, 1, 3, 1} or |
| | {-1, 1, -3, -3, -1, -3} |
| $\mu_9$ | {3, -1, 1, 1, 3, 1} or |
| | {-1, 3, -3, -3, -1, -3} |
| $\mu_{10}$ | {-1, 1, 3, 1, 3, 1} or |
| | {3, -3, -1, -3, -1, -3} |
| $\mu_{11}$ | {3, -3, 3, 1, 3, 1} or |
| | {-1, 1, -1, -3, -1, -3} |
| $\mu_{12}$ | {-1, -3, 3, 3, 3, 1} or |
| | {3, 1, -1, -3, -1, -3} |
| $\mu_{13}$ | {-3, -1, 3, 1, 3, 1} or |
| | {1, 3, -1, -3, -1, -3} |
| $\mu_{14}$ | {3, 3, -3, 1, 3, 1} or |
| | {-1, -1, 1, -3, -1, -3} |
| $\mu_{15}$ | {-1, 3, -3, 1, 3, 1} or |
| | {3, -1, 1, -3, -1, -3} |
| $\mu_{16}$ | {3, -3, -3, 1, 3, 1} or |
| | {-1, 1, 1, -3, -1, -3} |

TABLE 1-2-continued

Length-6 CG sequences

| Index | CG Sequence {b(0), ..., b(5)} |
|---|---|
| $\mu_{17}$ | {3, −1, −3, 1, 3, 1} or {−1, 3, 1, −3, −1, −3} |
| $\mu_{18}$ | {−3, −1, −3, 1, 3, 1} or {1, 3, 1, −3, −1, −3} |
| $\mu_{19}$ | {3, 1, −1, 1, 3, 1} or {−1, −3, 3, −3, −1, −3} |
| $\mu_{20}$ | {3, −3, −1, −3, 3, 1} or {−1, 1, 3, 1, −1, −3} |
| $\mu_{21}$ | {3, −3, 3, −3, −3, 1} or {−1, 1, −1, 1, 1, −3} |
| $\mu_{22}$ | {3, 1, 3, −1, −3, 1} or {−1, −3, −1, 3, 1, −3} |
| $\mu_{23}$ | {3, −3, 3, 1, −1, 1} or {−1, 1, −1, −3, 3, −3} |
| $\mu_{24}$ | {−3, 3, −1, 1, −1, 1} or {1, −1, 3, −3, 3, −3} |
| $\mu_{25}$ | {3, −1, −1, 1, −1, 1} or {−1, 3, 3, −3, −3, −3} |
| $\mu_{26}$ | {−1, −3, 3, −3, −1, 1} or {3, 1, −1, 1, 3, −3} |
| $\mu_{27}$ | {1, 3, −3, 1, 1, 3} or {−3, −1, 1, −3, −3, −1} |
| $\mu_{28}$ | {1, 1, −3, 3, 1, 3} or {−3, −3, 1, −1, −3, −1} |
| $\mu_{29}$ | {1, 3, −1, −3, 1, 3} or {−3, −1, 3, 1, −3, −1} |
| $\mu_{30}$ | {−1, −1, 1, −1, 1, 3} or {3, 3, −3, 3, −3, −1} |
| $\mu_{31}$ | {1, 1, −3, 1, 3, 3} or {−3, −3, 1, −3, −1, −1} |
| $\mu_{32}$ | {1, 1, 3, −1, 3, 3} or {−3, −3, −1, 3, −1, −1} |
| $\mu_{33}$ | {1, 1, 3, −1, −3, 3} or {−3, −3, −1, 3, 1, −1} |
| $\mu_{34}$ | {1, 1, 3, 3, −1, 3} or {−3, −3, −1, −1, 3, −1} |
| $\mu_{35}$ | {1, 1, 1, −3, 1, 3} or {−3, −3, −3, 1, 3, −1} |
| $\mu_{36}$ | {−3, 3, −3, 1, 1, −3} or {1, −1, 1, −3, −3, 1} |
| $\mu_{37}$ | {−3, −1, −3, 1, 1, −3} or {1, 3, 1, −3, −3, 1} |
| $\mu_{38}$ | {−3, −3, −3, 3, 1, −3} or {1, 1, 1, −1, −1, 1} |
| $\mu_{39}$ | {1, 1, −3, 3, 1, −3} or {−3, −3, 1, 1, −3, 1} |
| $\mu_{40}$ | {−3, −3, 1, −3, 3, −3} or {1, 1, −3, 1, −1, 1} |
| $\mu_{41}$ | {1, 1, 1, −1, 3, −3} or {−3, −3, −3, 3, −1, 1} |
| $\mu_{42}$ | {−3, 3, −1, −1, 3, −3} or {1, −1, 3, 3, −1, 1} |
| $\mu_{43}$ | {−3, 1, 3, 1, −3, −3} or {1, −1, −3, −1, 3, 1} |
| $\mu_{44}$ | {−3, −1, −3, 1, −3, −3} or {1, 3, 1, −3, 1, 1} |
| $\mu_{45}$ | {−3, 1, 3, −3, −3, −3} or {1, −3, −1, 1, 1, 1} |
| $\mu_{46}$ | {−3, 1, −1, −3, −3, −3} or {1, −3, 3, 1, 1, 1} |
| $\mu_{47}$ | {−3, −3, −1, 1, −1, −3} or {1, 1, 3, −3, 3, 1} |
| $\mu_{48}$ | {1, 1, 1, 3, −1, −3} or {−3, −3, −3, −1, 3, 1} |
| $\mu_{49}$ | {−3, −1, 3, 3, −1, −3} or {1, 3, −1, −1, 3, 1} |
| $\mu_{50}$ | {−3, 1, 1, −3, −1, −3} or {1, −3, −3, 1, 3, 1} |
| $\mu_{51}$ | {−3, −1, 1, −3, 1, −1} or {1, 3, −3, 1, −3, 3} |
| $\mu_{52}$ | {1, 1, 1, −3, 3, −1} or {−3, −3, −3, 1, −1, 3} |
| $\mu_{53}$ | {1, 1, −1, −1, 3, −1} or {−3, −3, 3, 3, −1, 3} |
| $\mu_{54}$ | {−3, −1, −1, −1, 3, −1} or {1, 3, 3, 3, −1, 3} |
| $\mu_{55}$ | {−3, −3, −3, 1, −3, −1} or {1, 1, 1, −3, 1, 3} |
| $\mu_{56}$ | {1, 1, −1, 3, −3, −1} or {−3, −3, 3, −1, 1, 3} |
| $\mu_{57}$ | {−3, 1, −3, −3, −3, −1} or {1, −3, 1, 1, 1, 3} |
| $\mu_{58}$ | {1, 1, −3, 1, −1, −1} or {−3, −3, 1, −3, 3, 3} |
| $\mu_{59}$ | {1, 1, −1, 3, −1, −1} or {−3, −3, 3, −1, 3, 3} |

In some embodiments, any sequence from Table 1-2 may be mapped to complex-valued modulation symbols d(i) according the above equation (1-3).

In some embodiments, in the above Table 1-2, L (where L is an integer and 1≤L≤30) CG sequences each with an index $\mu_s$ (where s is an integer and 0≤s≤59) may be included in the predetermined sequence table for DMRS with length 6. For example, $\mu_s \in [0, 29]$. For two sequences with a same index $\mu_s$ in the above Table 1-2, either one of the two sequences can be included in the predetermined sequence table for DMRS with length 6. In some embodiments, if there are more than one sequences from the above Table 1-2 that are included in the predetermined sequence table for DMRS with length 6, the indices $\mu_{s1}$ and $\mu_{s2}$ of any two of the sequences which are included in the predetermined sequence table may be different. For example, s1 is an integer and 0≤s1≤59, s2 is an integer and 0≤s2≤59, and s1≠s2.

In some embodiments, in the above Table 1-2, 30 CG sequences may be included in the predetermined sequence table for DMRS with length 6, and $\mu_s$ may represent an index of a sequence within the predetermined sequence table for DMRS with length 6, where s is an integer and 0≤s≤59. In the above Table 1-2, for example, $\mu_s \in [0, 29]$. For two sequences with a same index $\mu_s$ in the above Table 1-2, either one of the two sequences can be included in the predetermined sequence table for DMRS with length 6. In some embodiments, if there are more than one sequences from the above Table 1-2 that are included in the predetermined sequence table for DMRS with length 6, the indices $\mu_{s1}$ and $\mu_{s2}$ of any two of the sequences which are included in the predetermined sequence table may be different. For example, s1 is an integer and 0≤s1≤59, s2 is an integer and 0≤s2≤59, and s1≠s2. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, in the above Table 1-2, L (where L is an integer and 1≤L≤30) CG sequences from the sequences each with an index $\mu_s$ (where s is an integer and 0≤s≤29) may be included in the predetermined sequence table for DMRS with length 6. For example, $\mu_s \in [0, 29]$. For two sequences with a same index $\mu_s$ in the above Table 1-2, either one of the two sequences can be included in the predetermined sequence table for DMRS with length 6. In some embodiments, if there are more than one sequence within the sequences with the index $\mu_s$ (where s is an integer and 0≤s≤29) from the above Table 1-2 included in the predetermined sequence table for DMRS with length 6, the indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2.

In some embodiments, in the above Table 1-2, all of the 30 CG sequences each with a different index $\mu_s$ (where s is an integer and 0≤s≤29) may be included in the predetermined sequence table for DMRS with length 6. For example, $\mu_s \in [0, 29]$. For each index $\mu_s$, either one of the two sequences can be included in the predetermined sequence table for DMRS with length 6. The indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, in the above Table 1-2, L (where L is an integer and 1≤L≤30) CG sequences from the sequences each with an index $\mu_s$ (where s is an integer and 30≤s≤59) may be included in the predetermined sequence table for DMRS with length 6. For example, $\mu_s \in [0, 29]$. For two sequences with a same index $\mu_s$ in the above Table 1-2, either one of the two sequences can be included in the predetermined sequence table for DMRS with length 6. In some embodiments, if there are more than one sequences within the sequences with index $\mu_s$ (s is an integer and 30≤s≤59) from the above Table 1-2 included in the predetermined sequence table for DMRS with length 6, the indices $\mu_{s1}$ and $\mu_{s2}$ of any two of the sequences which are included in the predetermined sequence table may be different, where s1 is an integer and 30≤s1≤59, s2 is an integer and 30≤s2≤59, and s1≠s2.

In some embodiments, in the above Table 1-2, all of the 30 CG sequences each with a different index $\mu_s$ (where s is an integer and 30≤s≤59) may be included in the predetermined sequence table for DMRS with length 6. For example, $\mu_s \in [0, 29]$. For each index $\mu_s$, either one of the two sequences can be included in the predetermined sequence table for DMRS with length 6. The indices $\mu_{s1}$ and $\mu_{s2}$ of any two of the sequences which are included in the predetermined sequence table may be different, where s1 is an integer and 30≤s1≤59, s2 is an integer and 30≤s2≤59, and s1≠s2. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, if the predetermined sequence length is 6, the predetermined sequence table for DMRS with length 6 may include L (where L is an integer and 1≤L≤30) CG sequences in Table 1-3:

TABLE 1-3

Length-6 CG sequences

| Index | CG Sequence {b(0), . . . , b(5)} |
|---|---|
| $\mu_0$ | {3, −5, −1, −7, 3, 1} or {−5, 3, 7, 1, −5, −7} |
| $\mu_1$ | {−3, 1, −3, −7, 5, 1} or {5, −7, 5, 1, −3, −7} |
| $\mu_2$ | {5, −7, −3, −7, 5, 1} or {−3, 1, 5, 1, −3, −7} |
| $\mu_3$ | {7, −3, 7, −1, 5, 1} or {−1, 5, −1, 7, −3, −7} |
| $\mu_4$ | {−7, −1, −5, 1, 7, 1} or |

TABLE 1-3-continued

Length-6 CG sequences

| Index | CG Sequence {b(0), . . . , b(5)} |
|---|---|
| | {1, 7, 3, −7, −1, −7} |
| $\mu_5$ | {−5, 1, 7, 3, −7, 1} or {3, −7, −1, −5, 1, −7} |
| $\mu_6$ | {−3, 3, −5, 5, −5, 1} or {5, −5, 3, −3, 3, −7} |
| $\mu_7$ | {−3, −7, 5, 1, −3, 1} or {5, 1, −3, −7, 5, −7} |
| $\mu_8$ | {5, −1, −3, 1, −3, 1} or {−3, 7, 5, −7, 5, −7} |
| $\mu_9$ | {5, 1, 5, −7, −3, 1} or {−3, −7, −3, 1, 5, −7} |
| $\mu_{10}$ | {5, 1, −3, −7, −3, 1} or {−3, −7, 5, 1, 5, −7} |
| $\mu_{11}$ | {−7, −1, −7, 1, 7, 3} or {1, 7, 1, −7, −1, −5} |
| $\mu_{12}$ | {−5, 1, −3, 3, −7, 3} or {3, −7, 5, −5, 1, −5} |
| $\mu_{13}$ | {−3, 3, −7, 5, −5, 3} or {5, −5, 1, −3, 3, −5} |
| $\mu_{14}$ | {−1, 5, −3, 7, −3, 3} or {7, −3, 5, −1, 5, −5} |
| $\mu_{15}$ | {1, −5, −1, 3, −1, 3} or {−7, 3, 7, −5, 7, −5} |
| $\mu_{16}$ | {1, −5, −1, −5, −1, 3} or {−7, 3, 7, 3, 7, −5} |
| $\mu_{17}$ | {−5, −1, −5, 5, 1, 5} or {3, 7, 3, −3, −7, −3} |
| $\mu_{18}$ | {−1, 3, 7, −7, 1, 5} or {7, −5, −1, 1, −7, −3} |
| $\mu_{19}$ | {1, −3, −7, −3, 1, 5} or {−7, 5, 1, 5, −7, −3} |
| $\mu_{20}$ | {−5, 1, −5, 3, −7, 5} or {3, −7, 3, −5, 1, −3} |
| $\mu_{21}$ | {−3, 3, −1, 5, −5, 5} or {5, −5, 7, −3, 3, −3} |
| $\mu_{22}$ | {3, 7, 3, 7, −5, 5} or {−5, −1, −5, −1, 3, −3} |
| $\mu_{23}$ | {3, 7, −5, 7, −5, 5} or {−5, −1, 3, −1, 3, −3} |
| $\mu_{24}$ | {−1, 5, −5, 7, −3, 5} or {7, −3, 3, −1, 5, −3} |
| $\mu_{25}$ | {1, 7, −1, −7, −1, 5} or {−7, −1, 7, 1, 7, −3} |
| $\mu_{26}$ | {3, −7, 1, −5, 1, 7} or {−5, 1, −7, 3, −7, −1} |
| $\mu_{27}$ | {−5, −1, 3, 7, 3, 7} or {3, 7, −5, −1, −5, −1} |
| $\mu_{28}$ | {−5, −1, −5, 7, 3, 7} or {3, 7, 3, −1, −5, −1} |
| $\mu_{29}$ | {−5, 7, −5, −7, 3, 7} or {3, −1, 3, 1, −5, −1} |
| $\mu_{30}$ | {3, 7, 5, −1, 3, 7} or {−5, −1, −3, 7, −5, −1} |
| $\mu_{31}$ | {−3, 3, −3, 5, −5, 7} or {5, −5, 5, −3, 3, −1} |
| $\mu_{32}$ | {−5, −1, −7, 7, −5, 7} or {3, 7, 1, −1, 3, −1} |
| $\mu_{33}$ | {−1, 5, 1, 7, −3, 7} or {7, −3, −7, −1, 5, −1} |
| $\mu_{34}$ | {1, 7, −3, −7, −1, 7} or {−7, −1, 5, 1, 7, −1} |
| $\mu_{35}$ | {3, −7, −1, −5, 1, −7} or {−5, 1, 7, 3, −7, 1} |
| $\mu_{36}$ | {−1, 5, −1, 7, −3, −7} or {7, −3, 7, −1, 5, 1} |
| $\mu_{37}$ | {1, 7, 3, −7, −1, −7} or {−7, −1, −5, 1, 7, 1} |
| $\mu_{38}$ | {3, −7, 5, −5, 1, −5} or {−5, 1, −3, 3, −7, 3} |
| $\mu_{39}$ | {5, −5, 1, −3, 3, −5} or {−3, 3, −7, 5, −5, 3} |
| $\mu_{40}$ | {7, −3, 5, −1, 5, −5} or {−1, 5, −3, 7, −3, 3} |
| $\mu_{41}$ | {1, 7, 1, −7, −1, −5} or {−7, −1, −7, 1, 7, 3} |

TABLE 1-3-continued

Length-6 CG sequences

| Index | CG Sequence {b(0), . . . , b(5)} |
|---|---|
| $\mu_{42}$ | {7, 3, 7, −5, −1, −5} or {−1, −5, −1, 3, 7, 3} |
| $\mu_{43}$ | {−7, 5, 1, 5, 1, −3} or {1, −3, −7, −3, −7, 5} |
| $\mu_{44}$ | {−7, −3, 1, 5, 1, −3} or {1, 5, −7, −3, −7, 5} |
| $\mu_{45}$ | {3, −7, 3, −5, 1, −3} or {−5, 1, −5, 3, −7, 5} |
| $\mu_{46}$ | {5, −5, 7, −3, 3, −3} or {−3, 3, −1, 5, −5, 5} |
| $\mu_{47}$ | {7, −3, 3, −1, 5, −3} or {−1, 5, −5, 7, −3, 5} |
| $\mu_{48}$ | {1, 5, −1, 3, −5, −3} or {−7, −3, 7, −5, 3, 5} |
| $\mu_{49}$ | {−7, −5, −3, −7, −5, −3} or {1, 3, 5, 1, 3, 5} |
| $\mu_{50}$ | {1, 3, −1, 1, 3, −1} or {−7, −5, 7, −7, −5, 7} |
| $\mu_{51}$ | {5, −5, 5, −3, 3, −1} or {−3, 3, −3, 5, −5, 7} |
| $\mu_{52}$ | {7, −3, −7, −1, 5, −1} or {−1, 5, 1, 7, −3, 7} |
| $\mu_{53}$ | {−7, −1, 5, 1, 7, −1} or {1, 7, −3, −7, −1, 7} |
| $\mu_{54}$ | {−5, 1, −7, 3, −7, −1} or {3, −7, 1, −5, 1, 7} |

In some embodiments, any sequence from Table 1-3 may be mapped to complex-valued modulation symbols d(i) according the above equation (1-4).

In some embodiments, the sequences in the above Table 1-1, Table 1-2 and/or Table 1-3 cannot be used for DMRS of PUCCH.

In some embodiments, in the above Table 1-3, L (where L is an integer and 1≤L≤30) CG sequences each with an index $\mu_s$ (where s is an integer and 0≤s≤54) may be included in the predetermined sequence table for DMRS with length 6. For example, $\mu_s \in [0, 29]$. For two sequences with a same index $\mu_s$ in the above Table 1-3, either one of the two sequences can be included in the predetermined sequence table for DMRS with length 6. In some embodiments, if there are more than one sequences from the above Table 1-3 that are included in the predetermined sequence table for DMRS with length 6, the indices $\mu_{s1}$ and $\mu_{s2}$ of any two of the sequences which are included in the predetermined sequence table may be different, where s1 is an integer and 0≤s1≤54, s2 is an integer and 0≤s2≤54, and s1≠s2.

In some embodiments, in the above Table 1-3, 30 CG sequences each with an index $\mu_s$ (where s is an integer and 0≤s≤54) may be included in the predetermined sequence table for DMRS with length 6. For example, $\mu_s \in [0, 29]$. For each index $\mu_s$, either one of the two sequences can be included in the predetermined sequence table for DMRS with length 6. The indices $\mu_{s1}$ and $\mu_{s2}$ of any two of the sequences which are included in the predetermined sequence table may be different, where s1 is an integer and 0≤s1≤54, s2 is an integer and 0≤s2≤54, and s1≠s2. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, in the above Table 1-3, L (where L is an integer and 1≤L≤10) CG sequences each with an index $\mu_s$ (where s∈{0, 8, 15, 16, 17, 22, 23, 29, 30, 32}) may be included in the predetermined sequence table for DMRS with length 6. For example, $\mu_s \in [0, 29]$. For two sequences with a same index $\mu_s$ in the above Table 1-3, either one of the two sequences can be included in the predetermined sequence table for DMRS with length 6. In some embodiments, if there are more than one sequences each with an index $\mu_s$ (where s∈{0, 8, 15, 16, 17, 22, 23, 29, 30, 32}) from the above Table 1-3 that are included in the predetermined sequence table for DMRS with length 6, the indices $\mu_{s1}$ and $\mu_{s2}$ of any two of the sequences which are included in the predetermined sequence table may be different, where s1∈{0, 8, 15, 16, 17, 22, 23, 29, 30, 32} and s2∈{0, 8, 15, 16, 17, 22, 23, 29, 30, 32}.

In some embodiments, if the predetermined sequence length is 12, the determined plurality of CG sequences may include one or more of CG sequences in Table 2:

TABLE 2

Length-12 CG sequences for π/2-BPSK

| Index | CG Sequence {b(0), . . . , b(11)} |
|---|---|
| $\mu_0$ | {0, 0, 1, 0, 0, 1, 0, 0, 1, 0, 1, 0} or {1, 1, 0, 1, 1, 0, 1, 1, 0, 1, 0, 1} |
| $\mu_1$ | {1, 1, 1, 1, 1, 0, 0, 0, 1, 1, 1, 0} or {0, 0, 0, 0, 0, 1, 1, 1, 0, 0, 0, 1} |
| $\mu_2$ | {1, 0, 0, 1, 0, 0, 1, 0, 0, 0, 1, 0} or {0, 1, 1, 0, 1, 1, 0, 1, 1, 1, 0, 1} |
| $\mu_3$ | {0, 0, 0, 0, 1, 1, 1, 0, 1, 1, 1, 0} or {1, 1, 1, 1, 0, 0, 0, 1, 0, 0, 0, 1} |
| $\mu_4$ | {0, 1, 0, 0, 1, 1, 1, 1, 1, 0, 1, 0} or {1, 0, 1, 1, 0, 0, 0, 0, 0, 1, 0, 1} |
| $\mu_5$ | {1, 0, 1, 0, 0, 1, 1, 1, 0, 1, 0, 0} or {0, 1, 0, 1, 1, 0, 0, 0, 1, 0, 1, 1} |
| $\mu_6$ | {0, 0, 1, 1, 1, 0, 0, 1, 0, 1, 0, 0} or {1, 1, 0, 0, 0, 1, 1, 0, 1, 0, 1, 1} |
| $\mu_7$ | {1, 0, 0, 0, 1, 0, 0, 0, 1, 1, 1, 0} or {0, 1, 1, 1, 0, 1, 1, 1, 0, 0, 0, 1} |
| $\mu_8$ | {0, 0, 1, 1, 1, 1, 1, 0, 0, 1, 0, 0} or {1, 1, 0, 0, 0, 0, 0, 1, 1, 0, 1, 1} |
| $\mu_9$ | {0, 0, 1, 0, 0, 0, 1, 0, 0, 0, 1, 0} or {1, 1, 0, 1, 1, 1, 0, 1, 1, 1, 0, 1} |
| $\mu_{10}$ | {1, 0, 1, 1, 0, 0, 0, 1, 1, 1, 1, 0} or {0, 1, 0, 0, 1, 1, 1, 0, 0, 0, 0, 1} |
| $\mu_{11}$ | {0, 1, 1, 1, 0, 0, 0, 0, 0, 1, 0, 0} or {1, 0, 0, 0, 1, 1, 1, 1, 1, 0, 1, 1} |
| $\mu_{12}$ | {0, 1, 1, 1, 1, 1, 0, 0, 0, 0, 1, 0} or {1, 0, 0, 0, 0, 0, 1, 1, 1, 1, 0, 1} |
| $\mu_{13}$ | {0, 1, 0, 0, 1, 0, 0, 1, 0, 1, 0, 0} or {1, 0, 1, 1, 0, 1, 1, 0, 1, 0, 1, 1} |
| $\mu_{14}$ | {0, 1, 0, 1, 1, 1, 0, 0, 0, 1, 0, 0} or {1, 0, 1, 0, 0, 0, 1, 1, 1, 0, 1, 1} |
| $\mu_{15}$ | {1, 1, 1, 0, 1, 1, 1, 0, 1, 1, 1, 0} or {0, 0, 0, 1, 0, 0, 0, 1, 0, 0, 0, 1} |
| $\mu_{16}$ | {1, 0, 0, 1, 0, 0, 0, 1, 0, 1, 0, 0} or {0, 1, 1, 0, 1, 1, 1, 0, 1, 0, 1, 1} |
| $\mu_{17}$ | {0, 1, 0, 0, 1, 0, 0, 0, 1, 0, 0, 0} or {1, 0, 1, 1, 0, 1, 1, 1, 0, 1, 1, 1} |
| $\mu_{18}$ | {1, 1, 1, 1, 0, 1, 0, 0, 0, 1, 1, 0} |

TABLE 2-continued

Length-12 CG sequences for π/2-BPSK

| Index | CG Sequence {b(0), ..., b(11)} |
|---|---|
| | or |
| | {0, 0, 0, 0, 1, 0, 1, 1, 1, 0, 0, 1} |
| $\mu_{19}$ | {0, 1, 0, 1, 0, 0, 1, 0, 1, 1, 1, 0} |
| | or |
| | {1, 0, 1, 0, 1, 1, 0, 1, 0, 0, 0, 1} |
| $\mu_{20}$ | {1, 1, 1, 0, 0, 0, 0, 0, 1, 0, 0, 0} |
| | or |
| | {0, 0, 0, 1, 1, 1, 1, 1, 0, 1, 1, 1} |
| $\mu_{21}$ | {1, 0, 1, 1, 1, 1, 0, 1, 1, 0, 0, 0} |
| | or |
| | {0, 1, 0, 0, 0, 0, 1, 0, 0, 1, 1, 1} |
| $\mu_{22}$ | {0, 0, 0, 0, 1, 0, 1, 1, 0, 1, 1, 0} |
| | or |
| | {1, 1, 1, 1, 0, 1, 0, 0, 1, 0, 0, 1} |
| $\mu_{23}$ | {0, 0, 1, 1, 1, 0, 0, 0, 1, 0, 0, 0} |
| | or |
| | {1, 1, 0, 0, 0, 1, 1, 1, 0, 1, 1, 1} |
| $\mu_{24}$ | {1, 1, 0, 1, 1, 1, 1, 1, 1, 0, 0, 0} |
| | or |
| | {0, 0, 1, 0, 0, 0, 0, 0, 0, 1, 1, 1} |
| $\mu_{25}$ | {1, 1, 1, 0, 1, 0, 0, 1, 0, 0, 1, 0} |
| | or |
| | {0, 0, 0, 1, 0, 1, 1, 0, 1, 1, 0, 1} |
| $\mu_{26}$ | {0, 1, 0, 0, 0, 1, 0, 1, 0, 0, 1, 0} |
| | or |
| | {1, 0, 1, 1, 1, 0, 1, 0, 1, 1, 0, 1} |
| $\mu_{27}$ | {0, 1, 0, 0, 0, 1, 1, 1, 1, 1, 0, 0} |
| | or |
| | {1, 0, 1, 1, 1, 0, 0, 0, 0, 0, 1, 1} |
| $\mu_{28}$ | {1, 0, 0, 0, 1, 1, 1, 0, 0, 0, 0, 0} |
| | or |
| | {0, 1, 1, 1, 0, 0, 0, 1, 1, 1, 1, 1} |
| $\mu_{29}$ | {0, 1, 1, 1, 1, 0, 1, 1, 1, 1, 0, 0} |
| | or |
| | {1, 0, 0, 0, 0, 1, 0, 0, 0, 0, 1, 1} |

Figure 4B:
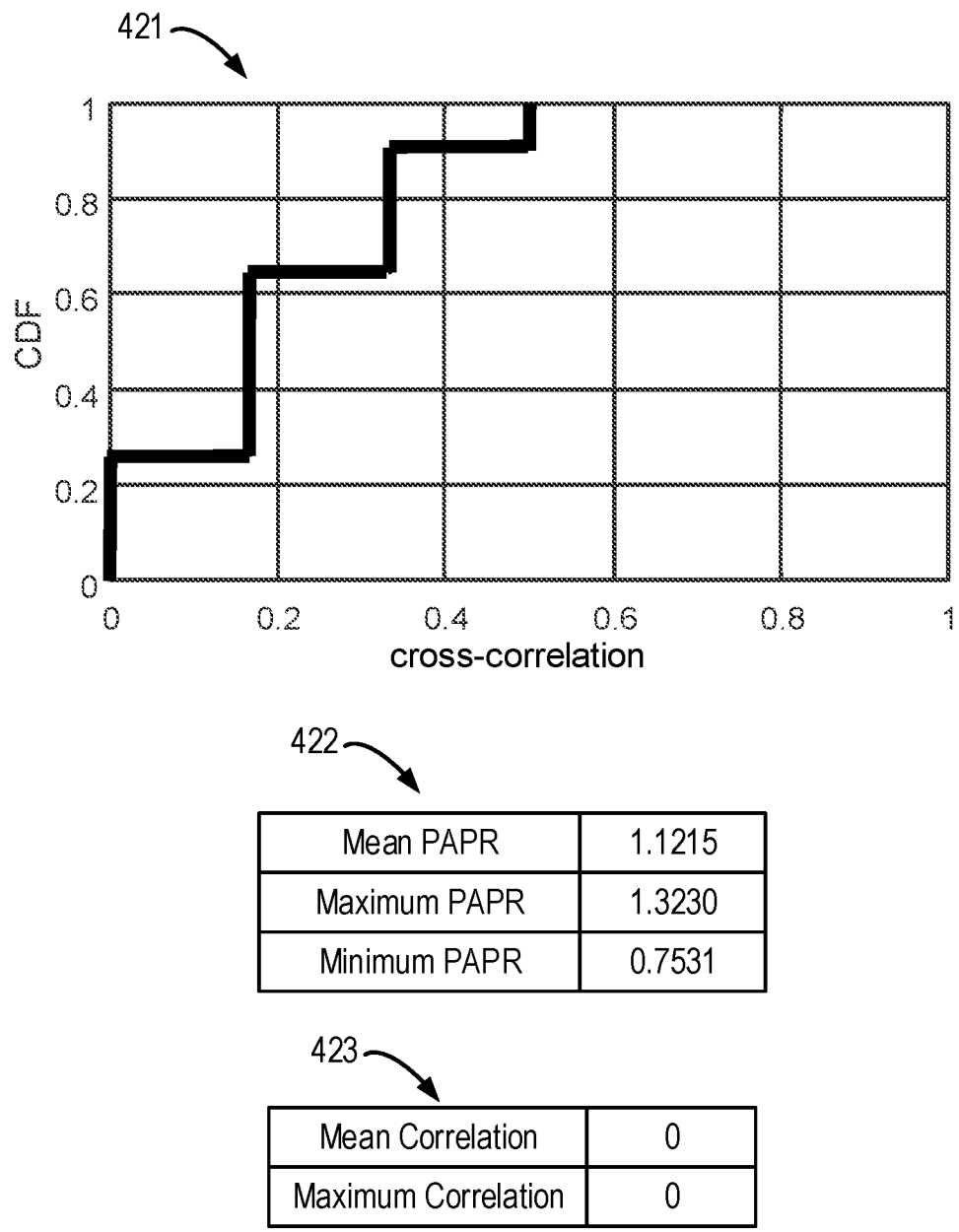
FIG. 4B shows the performance of Length-12 CG sequences for $\pi/2$-BPSK in accordance with some embodiments of the present disclosure.

FIG. 4B shows the performance of the CG sequences in Table 2. For example, the cross-correlation performance of the CG sequences in Table 2 is shown in a cumulative distribution function (CDF) curve 421 in FIG. 4B, in which the horizontal axis may represent autocorrelation values and the vertical axis may represent cumulative distribution probabilities. The PAPR performance (including the mean PAPR, the maximum PAPR and the minimum PAPR) of the CG sequences in Table 2 is shown in Table 422 in FIG. 4B. The cross-correlation performance (including the mean cross-correlation and the maximum cross-correlation) of the CG sequences in Table 2 is shown in Table 423 in FIG. 4B.

In some embodiments, any sequence from Table 2 may be mapped to complex-valued modulation symbols d(i) according the above equation (1-1).

In some embodiments, in the above Table 2, all of the 30 CG sequences may be included in the predetermined sequence table for DMRS with length 12, and $\mu_s$ may represent an index of a sequence within the predetermined sequence table, where s is an integer and $0 \le s \le 29$. For example, $\mu_s \in [0, 29]$. For each index $\mu_s$, either one of the two sequences can be included in the predetermined sequence table for DMRS with length 12. The indices $\mu_{s1}$ and $\mu_{s2}$ of any two of the sequences which are included in the predetermined sequence table may be different, where s1 is an integer and $0 \le s1 \le 29$, s2 is an integer and $0 \le s2 \le 29$, and $s1 \ne s2$. That is, all the values of $\mu_s$ may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

Alternatively, in some embodiments, if the predetermined sequence length is 12, the determined plurality of CG sequences may include one or more of CG sequences in Table 3-1:

TABLE 3-1

Length-12 CG sequences for π/2-BPSK

| Index | CG Sequence {b(0), ..., b(11)} |
|---|---|
| $\mu_0$ | {0, 1, 1, 1, 1, 1, 1, 0, 0, 0, 1, 1} |
| | or |
| | {1, 0, 0, 0, 0, 0, 0, 1, 1, 1, 0, 0} |
| $\mu_1$ | {0, 1, 1, 0, 1, 0, 1, 0, 0, 0, 1, 1} |
| | or |
| | {1, 0, 0, 1, 0, 1, 0, 1, 1, 1, 0, 0} |
| $\mu_2$ | {1, 1, 0, 1, 1, 0, 1, 0, 1, 0, 0, 0} |
| | or |
| | {0, 0, 1, 0, 0, 1, 0, 1, 0, 1, 1, 1} |
| $\mu_3$ | {1, 1, 1, 1, 0, 1, 1, 0, 1, 0, 0, 0} |
| | or |
| | {0, 0, 0, 0, 1, 0, 0, 1, 0, 1, 1, 1} |
| $\mu_4$ | {0, 1, 1, 0, 1, 0, 1, 1, 1, 0, 1, 1} |
| | or |
| | {1, 0, 0, 1, 0, 1, 0, 0, 0, 1, 0, 0} |
| $\mu_5$ | {0, 1, 1, 1, 0, 1, 1, 1, 0, 1, 1, 1} |
| | or |
| | {1, 0, 0, 0, 1, 0, 0, 0, 1, 0, 0, 0} |
| $\mu_6$ | {0, 0, 1, 0, 0, 1, 1, 1, 1, 1, 1, 1} |
| | or |
| | {1, 1, 0, 1, 1, 0, 0, 0, 0, 0, 0, 0} |
| $\mu_7$ | {0, 0, 0, 1, 1, 1, 1, 1, 0, 0, 0, 1} |
| | or |
| | {1, 1, 1, 0, 0, 0, 0, 0, 1, 1, 1, 0} |
| $\mu_8$ | {1, 0, 0, 0, 1, 0, 0, 0, 1, 1, 1, 1} |
| | or |
| | {0, 1, 1, 1, 0, 1, 1, 1, 0, 0, 0, 0} |
| $\mu_9$ | {1, 0, 0, 0, 1, 0, 0, 0, 0, 0, 1, 1} |
| | or |
| | {0, 1, 1, 1, 0, 1, 1, 1, 1, 1, 0, 0} |
| $\mu_{10}$ | {1, 0, 0, 0, 1, 0, 0, 1, 1, 1, 1, 1} |
| | or |
| | {0, 1, 1, 0, 1, 1, 0, 0, 0, 0, 0, 0} |
| $\mu_{11}$ | {0, 1, 1, 0, 0, 0, 0, 1, 1, 0, 0, 1} |
| | or |
| | {1, 0, 0, 1, 1, 1, 1, 1, 0, 0, 1, 0} |
| $\mu_{12}$ | {0, 0, 0, 0, 0, 1, 1, 0, 0, 0, 0, 1} |
| | or |
| | {1, 1, 1, 1, 1, 0, 0, 1, 1, 1, 1, 0} |
| $\mu_{13}$ | {0, 0, 0, 1, 0, 0, 1, 1, 1, 0, 0, 1} |
| | or |
| | {1, 1, 1, 0, 1, 1, 0, 0, 0, 1, 1, 0} |
| $\mu_{14}$ | {0, 0, 0, 1, 0, 0, 1, 0, 0, 1, 1, 1} |
| | or |
| | {1, 1, 1, 0, 1, 1, 0, 1, 1, 0, 0, 0} |
| $\mu_{15}$ | {1, 1, 0, 0, 0, 0, 0, 1, 1, 1, 1, 0} |
| | or |
| | {0, 0, 1, 1, 1, 1, 1, 0, 0, 0, 0, 1} |
| $\mu_{16}$ | {0, 1, 1, 1, 1, 1, 0, 0, 1, 0, 0, 0} |
| | or |
| | {1, 0, 0, 0, 0, 0, 1, 1, 0, 1, 1, 1} |
| $\mu_{17}$ | {1, 1, 0, 1, 0, 1, 1, 0, 0, 0, 1, 0} |
| | or |
| | {0, 0, 1, 0, 1, 0, 0, 1, 1, 1, 0, 1} |
| $\mu_{18}$ | {1, 0, 1, 0, 1, 1, 0, 1, 1, 0, 1, 0} |
| | or |
| | {0, 1, 0, 1, 0, 0, 1, 0, 0, 1, 0, 1} |
| $\mu_{19}$ | {1, 0, 1, 0, 0, 1, 0, 0, 1, 0, 1, 0} |
| | or |
| | {0, 1, 0, 1, 1, 0, 1, 1, 0, 0, 0, 1} |
| $\mu_{20}$ | {1, 0, 1, 1, 0, 0, 0, 1, 0, 0, 0, 1} |
| | or |
| | {0, 1, 0, 0, 1, 1, 1, 0, 1, 1, 1, 0} |
| $\mu_{21}$ | {1, 0, 1, 1, 1, 0, 0, 1, 0, 0, 0, 1} |
| | or |
| | {0, 1, 0, 1, 0, 0, 1, 1, 1, 0, 1, 0} |
| $\mu_{22}$ | {1, 0, 1, 0, 0, 1, 0, 0, 0, 0, 0, 0} |
| | or |
| | {0, 1, 0, 1, 1, 0, 1, 1, 1, 1, 1, 1} |
| $\mu_{23}$ | {1, 1, 1, 1, 0, 1, 1, 1, 0, 1, 0, 0} |
| | or |
| | {0, 0, 0, 0, 1, 0, 0, 0, 1, 0, 1, 0} |
| $\mu_{24}$ | {0, 0, 0, 1, 0, 0, 0, 0, 1, 0, 1, 1} |
| | or |
| | {1, 1, 1, 0, 1, 1, 1, 1, 0, 1, 0, 0} |

TABLE 3-1-continued

Length-12 CG sequences for π/2-BPSK

| Index | CG Sequence {b(0), . . . , b(11)} |
|---|---|
| $\mu_{25}$ | {0, 1, 1, 0, 0, 0, 1, 0, 0, 0, 0, 1} or {1, 0, 0, 1, 1, 1, 0, 1, 1, 1, 1, 0} |
| $\mu_{26}$ | {0, 0, 0, 0, 1, 0, 0, 0, 1, 1, 0, 1} or {1, 1, 1, 1, 0, 1, 1, 1, 0, 0, 1, 0} |
| $\mu_{27}$ | {1, 0, 1, 0, 0, 0, 0, 1, 0, 0, 0, 1} or {0, 1, 0, 1, 1, 1, 1, 0, 1, 1, 1, 0} |
| $\mu_{28}$ | {0, 0, 0, 1, 0, 0, 0, 1, 1, 1, 1, 0} or {1, 1, 1, 0, 1, 1, 1, 0, 0, 0, 0, 1} |
| $\mu_{29}$ | {1, 1, 0, 0, 0, 0, 1, 0, 0, 0, 1, 1} or {0, 0, 1, 1, 1, 1, 0, 1, 1, 1, 0, 0} |

Figure 4C:
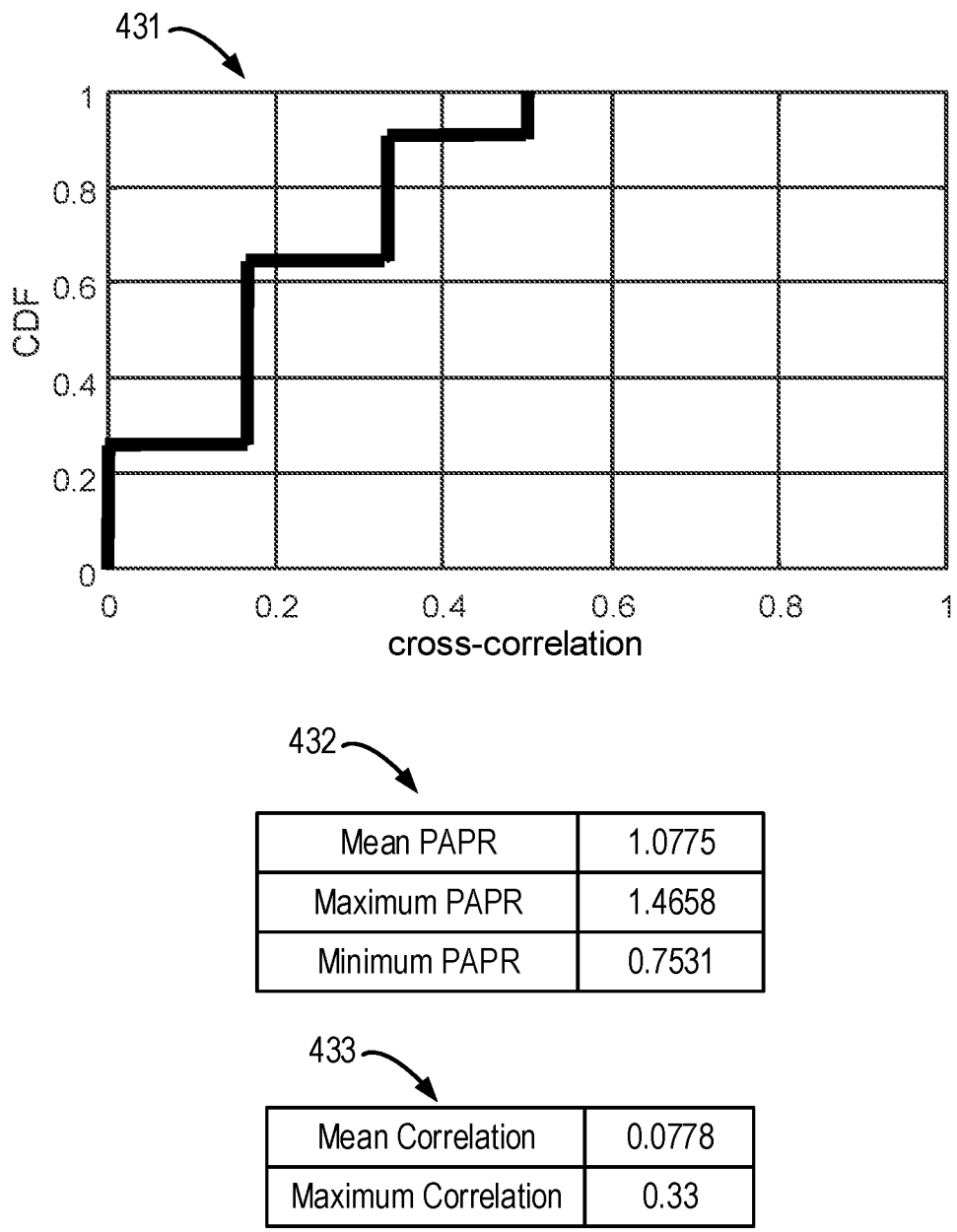
FIG. 4C shows the performance of Length-12 CG sequences for $\pi/2$-BPSK in accordance with some embodiments of the present disclosure.

FIG. 4C shows the performance of the CG sequences in Table 3-1. For example, the cross-correlation performance of the CG sequences in Table 3-1 is shown in a cumulative distribution function (CDF) curve 431 in FIG. 4C, in which the horizontal axis may represent autocorrelation values and the vertical axis may represent cumulative distribution probabilities. The PAPR performance (including the mean PAPR, the maximum PAPR and the minimum PAPR) of the CG sequences in Table 3-1 is shown in Table 432 in FIG. 4C. The cross-correlation performance (including the mean cross-correlation and the maximum cross-correlation) of the CG sequences in Table 3-1 is shown in Table 433 in FIG. 4C.

In some embodiments, any sequence from Table 3-1 may be mapped to complex-valued modulation symbols d(i) according the above equation (1-1).

In some embodiments, in either one of the above Table 2 or Table 3-1, L (where L is an integer and 1≤L<30) CG sequences may be included in the predetermined sequence table for DMRS with length 12, and $\mu_s$ may represent an index of a sequence within the predetermined sequence table, where s is an integer and 0≤s≤29. In either one of the above Table 2 or Table 3-1, $\mu_s \in [0, 29]$. In some embodiments, in either one of the above Table 2 or Table 3-1, for each index $\mu_s$, either one of the two sequences can be included in the predetermined sequence table for DMRS with length 12. In some embodiments, if there are more than one sequences from either one of the above Table 2 or Table 3-1 that are included in the predetermined sequence table for DMRS with length 12, the indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2.

In some embodiments, in the above Table 3-1, all of the 30 CG sequences may be included in the predetermined sequence table for DMRS with length 12, and/4 may represent an index of a sequence within the predetermined sequence table, where s is an integer and 0≤s≤29. For example, $\mu_s \in [0, 29]$. For each index $\mu_s$, either one of the two sequences can be included in the predetermined sequence table for DMRS with length 12. The indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2. That is, all the values of/4 may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

Alternatively, in some embodiments, if the predetermined sequence length is 12, the predetermined sequence table for DMRS with length 12 may include L (where L is an integer and 1≤L≤30) CG sequences in Table 3-2:

TABLE 3-2

Length-12 CG sequences for π/2-BPSK

| Index | CG Sequence {b(0), . . . , b(11)} |
|---|---|
| $\mu_0$ | {1, 0, 1, 1, 1, 0, 0, 0, 0, 0, 0, 0} or {0, 1, 0, 0, 0, 1, 1, 1, 1, 1, 1, 1} |
| $\mu_1$ | {1, 1, 1, 0, 0, 1, 0, 0, 0, 0, 0, 0} or {0, 0, 0, 1, 1, 0, 1, 1, 1, 1, 1, 1} |
| $\mu_2$ | {1, 0, 1, 1, 0, 1, 0, 0, 0, 0, 0, 0} or {0, 1, 0, 0, 1, 0, 1, 1, 1, 1, 1, 1} |
| $\mu_3$ | {0, 1, 1, 1, 0, 1, 0, 0, 0, 0, 0, 0} or {1, 0, 0, 0, 1, 0, 1, 1, 1, 1, 1, 1} |
| $\mu_4$ | {0, 1, 0, 0, 1, 1, 0, 0, 0, 0, 0, 0} or {1, 0, 1, 1, 0, 0, 1, 1, 1, 1, 1, 1} |
| $\mu_5$ | {1, 1, 1, 1, 1, 0, 0, 0, 0, 0, 0, 0} or {0, 0, 0, 0, 0, 1, 1, 1, 1, 1, 1, 1} |
| $\mu_6$ | {1, 0, 0, 0, 0, 0, 1, 0, 0, 0, 0, 0} or {0, 1, 1, 1, 1, 1, 0, 1, 1, 1, 1, 1} |
| $\mu_7$ | {0, 1, 1, 1, 1, 0, 1, 0, 0, 0, 0, 0} or {1, 0, 0, 0, 0, 1, 0, 1, 1, 1, 1, 1} |
| $\mu_8$ | {1, 1, 1, 1, 0, 1, 1, 0, 0, 0, 0, 0} or {0, 0, 0, 0, 1, 0, 0, 1, 1, 1, 1, 1} |
| $\mu_9$ | {1, 0, 0, 0, 1, 1, 1, 0, 0, 0, 0, 0} or {0, 1, 1, 1, 0, 0, 0, 1, 1, 1, 1, 1} |
| $\mu_{10}$ | {1, 1, 0, 1, 1, 1, 1, 0, 0, 0, 0, 0} or {0, 0, 1, 0, 0, 0, 0, 1, 1, 1, 1, 1} |
| $\mu_{11}$ | {1, 0, 0, 1, 1, 1, 0, 1, 0, 0, 0, 0} or {0, 1, 1, 0, 0, 0, 1, 0, 1, 1, 1, 1} |
| $\mu_{12}$ | {0, 0, 1, 0, 0, 0, 1, 1, 0, 0, 0, 0} or {1, 1, 0, 1, 1, 1, 0, 0, 1, 1, 1, 1} |
| $\mu_{13}$ | {0, 1, 1, 0, 1, 0, 1, 1, 0, 0, 0, 0} or {1, 0, 0, 1, 0, 1, 0, 0, 1, 1, 1, 1} |
| $\mu_{14}$ | {0, 1, 1, 1, 1, 0, 1, 1, 0, 0, 0, 0} or {1, 0, 0, 0, 0, 1, 0, 0, 1, 1, 1, 1} |
| $\mu_{15}$ | {0, 1, 1, 0, 1, 1, 1, 1, 0, 0, 0, 0} or {1, 0, 0, 1, 0, 0, 0, 0, 1, 1, 1, 1} |
| $\mu_{16}$ | {1, 1, 1, 0, 0, 0, 0, 1, 0, 0, 0, 0} or {0, 0, 0, 1, 1, 1, 1, 0, 1, 1, 1, 1} |
| $\mu_{17}$ | {0, 1, 0, 0, 1, 0, 0, 0, 1, 0, 0, 0} or {1, 0, 1, 1, 0, 1, 1, 1, 0, 1, 1, 1} |
| $\mu_{18}$ | {1, 0, 0, 1, 1, 0, 0, 0, 1, 0, 0, 0} or {0, 1, 1, 0, 0, 1, 1, 1, 0, 1, 1, 1} |
| $\mu_{19}$ | {0, 0, 1, 1, 1, 0, 0, 0, 1, 0, 0, 0} or {1, 1, 0, 0, 0, 1, 1, 1, 0, 1, 1, 1} |
| $\mu_{20}$ | {0, 1, 1, 1, 1, 1, 0, 0, 1, 0, 0, 0} or {1, 0, 0, 0, 0, 0, 1, 1, 0, 1, 1, 1} |
| $\mu_{21}$ | {1, 1, 0, 1, 1, 0, 1, 0, 1, 0, 0, 0} or {0, 0, 1, 0, 0, 1, 0, 1, 0, 1, 1, 1} |
| $\mu_{22}$ | {1, 1, 0, 1, 0, 1, 1, 0, 1, 0, 0, 0} or {0, 0, 1, 0, 1, 0, 0, 1, 0, 1, 1, 1} |

TABLE 3-2-continued

Length-12 CG sequences for π/2-BPSK

| Index | CG Sequence {b(0), . . . , b(11)} |
|---|---|
| $\mu_{23}$ | {1, 0, 1, 1, 0, 1, 1, 0, 1, 0, 0, 0} or {0, 1, 0, 0, 1, 0, 0, 1, 0, 1, 1, 1} |
| $\mu_{24}$ | {1, 1, 1, 1, 0, 1, 1, 0, 1, 0, 0, 0} or {0, 0, 0, 0, 1, 0, 0, 1, 0, 1, 1, 1} |
| $\mu_{25}$ | {1, 1, 0, 0, 0, 1, 0, 1, 1, 0, 0, 0} or {0, 0, 1, 1, 1, 0, 1, 0, 0, 1, 1, 1} |
| $\mu_{26}$ | {0, 0, 1, 1, 0, 1, 0, 1, 1, 0, 0, 0} or {1, 1, 0, 0, 1, 0, 1, 0, 0, 1, 1, 1} |
| $\mu_{27}$ | {1, 0, 1, 1, 1, 1, 0, 1, 1, 0, 0, 0} or {0, 1, 0, 0, 0, 0, 1, 0, 0, 1, 1, 1} |
| $\mu_{28}$ | {0, 0, 0, 1, 1, 1, 1, 1, 1, 0, 0, 0} or {1, 0, 1, 1, 0, 0, 0, 0, 0, 1, 1, 1} |
| $\mu_{29}$ | {0, 1, 1, 0, 1, 1, 1, 1, 1, 0, 0, 0} or {1, 0, 0, 1, 0, 0, 0, 0, 0, 1, 1, 1} |
| $\mu_{30}$ | {1, 1, 0, 1, 1, 1, 1, 1, 1, 0, 0, 0} or {0, 0, 1, 0, 0, 0, 0, 0, 0, 1, 1, 1} |
| $\mu_{31}$ | {0, 1, 1, 0, 0, 0, 0, 0, 0, 1, 0, 0} or {1, 0, 0, 0, 1, 1, 1, 1, 1, 0, 1, 1} |
| $\mu_{32}$ | {1, 0, 1, 1, 1, 1, 0, 0, 0, 1, 0, 0} or {0, 1, 0, 0, 0, 0, 1, 1, 1, 0, 1, 1} |
| $\mu_{33}$ | {1, 0, 1, 0, 0, 0, 1, 1, 1, 0, 1, 1} or {0, 1, 0, 0, 0, 1, 1, 0, 0, 1, 0, 0} |
| $\mu_{34}$ | {1, 0, 1, 1, 1, 0, 0, 1, 1, 0, 1, 1} or {1, 1, 0, 1, 1, 1, 1, 0, 0, 1, 0, 0} |
| $\mu_{35}$ | {0, 0, 1, 0, 0, 0, 0, 1, 1, 0, 1, 1} or {0, 0, 1, 1, 1, 1, 1, 0, 0, 1, 0, 0} |
| $\mu_{36}$ | {1, 1, 0, 0, 0, 0, 0, 1, 1, 0, 1, 1} or {1, 0, 1, 0, 0, 0, 0, 1, 0, 1, 0, 0} |
| $\mu_{37}$ | {0, 1, 0, 1, 1, 1, 1, 0, 1, 0, 1, 1} or {1, 0, 0, 1, 0, 0, 0, 1, 0, 1, 0, 0} |
| $\mu_{38}$ | {0, 1, 1, 0, 1, 1, 1, 0, 1, 0, 1, 1} or {0, 1, 0, 0, 1, 0, 0, 1, 0, 1, 0, 0} |
| $\mu_{39}$ | {1, 0, 1, 1, 0, 1, 1, 0, 1, 0, 1, 1} or {0, 0, 1, 1, 1, 0, 0, 1, 0, 1, 0, 0} |
| $\mu_{40}$ | {1, 1, 0, 0, 0, 1, 1, 0, 1, 0, 1, 1} or {1, 1, 1, 1, 1, 0, 0, 1, 0, 1, 0, 0} |
| $\mu_{41}$ | {0, 0, 0, 0, 0, 1, 1, 0, 1, 0, 1, 1} or {1, 0, 1, 0, 1, 1, 0, 1, 0, 1, 0, 0} |
| $\mu_{42}$ | {0, 1, 0, 1, 0, 0, 1, 0, 1, 0, 1, 1} or {0, 1, 1, 1, 0, 0, 1, 1, 0, 1, 0, 0} |
| $\mu_{43}$ | {1, 0, 0, 0, 1, 1, 0, 0, 1, 0, 1, 1} or {1, 0, 1, 0, 1, 0, 1, 1, 0, 1, 0, 0} |
| $\mu_{44}$ | {0, 1, 0, 1, 0, 1, 0, 0, 1, 0, 1, 1} or {1, 0, 1, 0, 0, 1, 1, 1, 0, 1, 0, 0} |
| $\mu_{45}$ | {0, 1, 0, 1, 1, 0, 0, 0, 1, 0, 1, 1} or {1, 1, 1, 0, 0, 1, 1, 1, 0, 1, 0, 0} |
| $\mu_{46}$ | {0, 0, 0, 1, 1, 0, 0, 0, 1, 0, 1, 1} or {1, 1, 1, 1, 1, 0, 0, 0, 1, 1, 0, 0} |
| $\mu_{47}$ | {0, 0, 0, 0, 0, 1, 1, 1, 0, 0, 1, 1} or {0, 1, 0, 1, 1, 1, 0, 0, 1, 1, 0, 0} or {1, 0, 1, 0, 0, 0, 0, 1, 1, 0, 1, 1} |
| $\mu_{48}$ | {0, 1, 1, 1, 0, 0, 1, 0, 1, 1, 0, 0} or {1, 0, 0, 0, 1, 1, 0, 1, 0, 0, 1, 1} |
| $\mu_{49}$ | {0, 1, 0, 0, 1, 0, 1, 0, 1, 1, 0, 0} or {1, 0, 1, 1, 0, 1, 0, 1, 0, 0, 1, 1} |
| $\mu_{50}$ | {0, 1, 0, 1, 1, 0, 1, 0, 1, 1, 0, 0} or {1, 0, 1, 0, 0, 1, 0, 1, 0, 0, 1, 1} |
| $\mu_{51}$ | {0, 0, 1, 0, 0, 1, 1, 0, 1, 1, 0, 0} or {1, 1, 0, 1, 1, 0, 0, 1, 0, 0, 1, 1} |
| $\mu_{52}$ | {0, 0, 0, 1, 1, 1, 1, 0, 1, 1, 0, 0} or {1, 1, 1, 0, 0, 0, 0, 1, 0, 0, 1, 1} |
| $\mu_{53}$ | {0, 0, 0, 0, 1, 0, 1, 1, 1, 1, 0, 0} or {1, 1, 1, 1, 0, 1, 0, 0, 0, 0, 1, 1} |
| $\mu_{54}$ | {0, 0, 0, 1, 1, 0, 1, 1, 1, 1, 0, 0} or {1, 1, 1, 0, 1, 0, 0, 0, 0, 0, 1, 1} |
| $\mu_{55}$ | {0, 1, 1, 1, 1, 0, 1, 1, 1, 1, 0, 0} or {1, 0, 0, 0, 0, 1, 0, 0, 0, 0, 1, 1} |
| $\mu_{56}$ | {1, 0, 0, 0, 0, 1, 1, 1, 1, 1, 0, 0} or {0, 1, 1, 1, 1, 0, 0, 0, 0, 0, 1, 1} |
| $\mu_{57}$ | {0, 1, 0, 0, 0, 1, 1, 1, 1, 1, 0, 0} or {1, 0, 1, 1, 1, 0, 0, 0, 0, 0, 1, 1} |
| $\mu_{58}$ | {0, 0, 1, 0, 0, 1, 1, 1, 1, 1, 0, 0} or {1, 1, 0, 1, 1, 0, 0, 0, 0, 0, 1, 1} |
| $\mu_{59}$ | {1, 0, 0, 1, 0, 1, 1, 1, 1, 1, 0, 0} or {0, 1, 1, 0, 1, 0, 0, 0, 0, 0, 1, 1} |
| $\mu_{60}$ | {0, 0, 1, 1, 1, 1, 1, 1, 1, 0, 0, 0} or {1, 1, 0, 0, 0, 0, 0, 0, 0, 1, 1, 1} |
| $\mu_{61}$ | {0, 1, 1, 1, 1, 0, 0, 0, 0, 1, 0, 1} or {0, 0, 1, 0, 0, 0, 1, 0, 0, 0, 1, 0} |
| $\mu_{62}$ | {0, 0, 1, 0, 0, 0, 1, 0, 0, 0, 1, 0} or {1, 1, 0, 1, 1, 1, 0, 1, 1, 1, 0, 1} |
| $\mu_{63}$ | {1, 0, 0, 1, 0, 0, 1, 0, 0, 0, 1, 0} or {0, 1, 1, 0, 1, 1, 0, 1, 1, 1, 0, 1} |
| $\mu_{64}$ | {0, 1, 0, 0, 0, 0, 0, 1, 0, 0, 1, 0} or {1, 0, 1, 1, 1, 1, 1, 0, 1, 1, 0, 1} |
| $\mu_{65}$ | {1, 1, 1, 0, 1, 0, 0, 1, 0, 0, 1, 0} or {0, 0, 0, 1, 0, 1, 1, 0, 1, 1, 0, 1} |
| $\mu_{66}$ | {0, 1, 0, 0, 0, 1, 0, 1, 0, 0, 1, 0} or {1, 0, 1, 1, 1, 0, 1, 0, 1, 1, 0, 1} |
| $\mu_{67}$ | {1, 1, 1, 0, 0, 1, 0, 1, 0, 0, 1, 0} or {0, 0, 0, 1, 1, 0, 1, 0, 1, 1, 0, 1} |
| $\mu_{68}$ | {0, 0, 1, 0, 1, 1, 0, 1, 0, 0, 1, 0} or {0, 0, 0, 1, 1, 0, 1, 0, 1, 1, 0, 1} |
| $\mu_{69}$ | {1, 0, 1, 0, 0, 1, 0, 1, 1, 0, 1} or {0, 0, 1, 0, 1, 1, 1, 0, 0, 1, 0} |
| $\mu_{70}$ | {1, 1, 0, 1, 0, 1, 0, 0, 1, 1, 0, 1} or {1, 1, 0, 1, 0, 1, 1, 0, 0, 1, 0} |
| $\mu_{71}$ | {0, 0, 0, 1, 0, 1, 0, 0, 1, 1, 0, 1} or {0, 0, 1, 1, 0, 1, 1, 0, 0, 1, 0} |
| $\mu_{72}$ | {1, 1, 1, 0, 1, 1, 1, 0, 0, 1, 0} or {0, 0, 0, 1, 1, 0, 0, 0, 1, 1, 0, 1} |

TABLE 3-2-continued

Length-12 CG sequences for π/2-BPSK

| Index | CG Sequence {b(0), . . . , b(11)} |
|---|---|
| $\mu_{73}$ | {1, 1, 0, 1, 0, 1, 1, 1, 0, 0, 1, 0} or {0, 0, 1, 0, 1, 0, 0, 0, 1, 1, 0, 1} |
| $\mu_{74}$ | {0, 0, 1, 0, 0, 1, 0, 0, 1, 0, 1, 0} or {1, 1, 0, 1, 1, 0, 1, 1, 0, 1, 0, 1} |
| $\mu_{75}$ | {0, 1, 1, 1, 0, 1, 0, 0, 1, 0, 1, 0} or {1, 0, 0, 0, 1, 0, 1, 1, 0, 1, 0, 1} |
| $\mu_{76}$ | {0, 1, 0, 1, 1, 1, 0, 0, 1, 0, 1, 0} or {1, 0, 1, 0, 0, 0, 1, 1, 0, 1, 0, 1} |
| $\mu_{77}$ | {0, 1, 0, 1, 0, 1, 1, 0, 1, 0, 1, 0} or {1, 0, 1, 0, 0, 0, 1, 0, 1, 0, 1} |
| $\mu_{78}$ | {1, 1, 0, 1, 0, 0, 0, 1, 1, 0, 1, 0} or {0, 0, 1, 0, 1, 1, 1, 0, 0, 1, 0, 1} |
| $\mu_{79}$ | {1, 1, 0, 1, 1, 0, 0, 1, 1, 0, 1, 0} or {0, 0, 1, 0, 0, 1, 1, 0, 0, 1, 0, 1} |
| $\mu_{80}$ | {1, 1, 0, 0, 0, 1, 0, 1, 1, 0, 1, 0} or {0, 0, 1, 1, 1, 0, 1, 0, 0, 1, 0, 1} |
| $\mu_{81}$ | {0, 0, 1, 1, 0, 0, 1, 1, 1, 0, 1, 0} or {1, 1, 0, 0, 1, 1, 0, 0, 0, 1, 0, 1} |
| $\mu_{82}$ | {0, 1, 0, 0, 1, 1, 1, 1, 1, 0, 1, 0} or {1, 0, 1, 1, 0, 0, 0, 0, 0, 1, 0, 1} |
| $\mu_{83}$ | {1, 0, 1, 1, 0, 0, 0, 0, 0, 1, 1, 0} or {0, 1, 0, 0, 1, 1, 1, 1, 1, 0, 0, 1} |
| $\mu_{84}$ | {1, 1, 1, 1, 0, 0, 0, 0, 0, 1, 1, 0} or {0, 0, 0, 0, 1, 1, 1, 1, 1, 0, 0, 1} |
| $\mu_{85}$ | {1, 1, 0, 0, 1, 0, 0, 0, 0, 1, 1, 0} or {0, 0, 1, 1, 0, 1, 1, 1, 1, 0, 0, 1} |
| $\mu_{86}$ | {1, 0, 1, 1, 0, 1, 0, 0, 0, 1, 1, 0} or {0, 1, 0, 0, 1, 0, 1, 1, 1, 0, 0, 1} |
| $\mu_{87}$ | {1, 1, 1, 1, 0, 1, 0, 0, 0, 1, 1, 0} or {0, 0, 0, 0, 1, 0, 1, 1, 1, 0, 0, 1} |
| $\mu_{88}$ | {1, 1, 1, 1, 0, 0, 1, 0, 0, 1, 1, 0} or {0, 0, 0, 0, 1, 1, 0, 1, 1, 0, 0, 1} |
| $\mu_{89}$ | {1, 0, 1, 1, 0, 1, 1, 0, 0, 1, 1, 0} or {0, 1, 0, 0, 1, 0, 0, 1, 1, 0, 0, 1} |
| $\mu_{90}$ | {1, 0, 1, 1, 0, 0, 0, 1, 0, 1, 1, 0} or {0, 1, 0, 0, 1, 1, 1, 0, 1, 0, 0, 1} |
| $\mu_{91}$ | {1, 0, 0, 0, 1, 1, 0, 1, 0, 1, 1, 0} or {0, 1, 1, 1, 0, 0, 1, 0, 1, 0, 0, 1} |
| $\mu_{92}$ | {0, 0, 1, 0, 1, 1, 0, 1, 0, 1, 1, 0} or {1, 1, 0, 1, 0, 0, 1, 0, 1, 0, 0, 1} |
| $\mu_{93}$ | {0, 0, 0, 0, 1, 0, 1, 1, 0, 1, 1, 0} or {1, 1, 1, 1, 0, 1, 0, 0, 1, 0, 0, 1} |
| $\mu_{94}$ | {0, 0, 1, 1, 0, 1, 1, 1, 0, 1, 1, 0} or {1, 1, 0, 0, 1, 0, 0, 0, 1, 0, 0, 1} |
| $\mu_{95}$ | {0, 1, 0, 0, 1, 1, 1, 1, 0, 1, 1, 0} or {1, 0, 1, 1, 0, 0, 0, 0, 1, 0, 0, 1} |
| $\mu_{96}$ | {1, 0, 1, 0, 0, 0, 0, 0, 1, 1, 1, 1} or {0, 1, 0, 1, 1, 1, 1, 1, 0, 0, 0, 0} |
| $\mu_{97}$ | {0, 1, 0, 1, 0, 0, 0, 1, 1, 1, 0, 1} or {1, 0, 1, 0, 1, 1, 1, 0, 0, 0, 1, 0} |
| $\mu_{98}$ | {1, 0, 0, 0, 1, 0, 0, 0, 1, 1, 1, 0} or {0, 1, 1, 1, 0, 1, 1, 1, 0, 0, 0, 1} |
| $\mu_{99}$ | {1, 1, 1, 1, 1, 0, 0, 0, 1, 1, 1, 0} or {0, 0, 0, 0, 0, 1, 1, 1, 0, 0, 0, 1} |
| $\mu_{100}$ | {0, 1, 0, 1, 0, 0, 1, 0, 1, 1, 1, 0} or {1, 0, 1, 0, 1, 1, 0, 1, 0, 0, 0, 1} |
| $\mu_{101}$ | {0, 0, 0, 0, 1, 1, 1, 0, 1, 1, 1, 0} or {1, 1, 1, 1, 0, 0, 0, 1, 0, 0, 0, 1} |
| $\mu_{102}$ | {1, 0, 0, 1, 1, 1, 0, 1, 1, 1, 0} or {0, 0, 1, 1, 0, 0, 0, 1, 0, 0, 0, 1} |
| $\mu_{103}$ | {1, 1, 1, 0, 1, 1, 1, 0, 1, 1, 1, 0} or {0, 0, 0, 1, 0, 0, 0, 1, 0, 0, 0, 1} |
| $\mu_{104}$ | {1, 0, 1, 1, 0, 0, 0, 1, 1, 1, 1, 0} or {0, 1, 0, 0, 1, 1, 1, 0, 0, 0, 0, 1} |
| $\mu_{105}$ | {0, 0, 0, 0, 1, 1, 0, 1, 1, 1, 1, 0} or {1, 1, 1, 1, 0, 0, 1, 0, 0, 0, 0, 1} |
| $\mu_{106}$ | {0, 1, 0, 1, 0, 0, 1, 1, 1, 1, 1, 0} or {1, 0, 1, 0, 1, 1, 0, 0, 0, 0, 0, 1} |
| $\mu_{107}$ | {0, 0, 0, 0, 0, 1, 1, 1, 1, 1, 1, 0} or {1, 1, 1, 1, 1, 0, 0, 0, 0, 0, 0, 1} |
| $\mu_{108}$ | {0, 1, 1, 1, 0, 0, 1, 1, 0, 0, 0, 1} or {1, 0, 0, 0, 1, 1, 0, 0, 1, 1, 1, 0} |
| $\mu_{109}$ | {0, 0, 1, 0, 1, 0, 0, 1, 1, 0, 0, 1} or {1, 1, 0, 1, 0, 1, 1, 0, 0, 1, 1, 0} |
| $\mu_{110}$ | {0, 1, 0, 1, 0, 0, 1, 1, 1, 0, 0, 1} or {1, 0, 1, 0, 1, 1, 0, 0, 0, 1, 1, 0} |
| $\mu_{111}$ | {0, 1, 0, 1, 1, 0, 0, 0, 1, 1, 0, 1} or {1, 0, 1, 1, 0, 1, 0, 0, 1, 1, 0, 1} |
| $\mu_{112}$ | {1, 0, 1, 1, 0, 1, 0, 0, 1, 1, 0, 1} or {0, 1, 0, 0, 1, 0, 1, 1, 0, 0, 1, 0} |
| $\mu_{113}$ | {1, 0, 0, 0, 1, 1, 0, 0, 0, 0, 1, 1} or {1, 0, 0, 0, 1, 0, 1, 1, 1, 1, 0, 0} |
| $\mu_{114}$ | {0, 1, 1, 1, 0, 0, 0, 1, 0, 0, 1, 1} or {0, 1, 0, 0, 0, 1, 1, 0, 1, 1, 0, 0} |
| $\mu_{115}$ | {1, 1, 1, 0, 0, 0, 1, 1, 0, 0, 1, 1} or {0, 0, 0, 1, 1, 1, 0, 0, 1, 1, 0, 0} |
| $\mu_{116}$ | {1, 1, 0, 1, 1, 0, 0, 1, 0, 1, 1} or {0, 0, 1, 0, 0, 1, 1, 0, 0, 1, 0, 0} |
| $\mu_{117}$ | {1, 0, 1, 1, 0, 0, 1, 0, 0, 1, 1, 1} or {0, 1, 0, 0, 1, 1, 0, 1, 1, 0, 0, 0} |
| $\mu_{118}$ | {1, 0, 1, 1, 1, 1, 0, 0, 1, 1, 1, 1} or {0, 1, 0, 0, 0, 1, 1, 0, 0, 0, 0} |
| $\mu_{119}$ | {1, 1, 0, 1, 1, 0, 1, 0, 0, 0, 0, 0} or {0, 0, 1, 0, 0, 1, 0, 1, 1, 1, 1, 1} |
| $\mu_{120}$ | {0, 0, 1, 1, 0, 1, 1, 0, 0, 0, 0, 0} or {1, 1, 0, 0, 1, 0, 0, 1, 1, 1, 1, 1} |
| $\mu_{121}$ | {1, 1, 0, 0, 1, 0, 0, 1, 1, 1, 1, 1} or {0, 0, 0, 1, 0, 1, 0, 0, 0, 0} |
| $\mu_{122}$ | {1, 1, 1, 1, 0, 1, 1, 0, 1, 1, 1, 1} or {0, 0, 0, 0, 0, 1, 1, 0, 1, 1, 1, 1} |

TABLE 3-2-continued

Length-12 CG sequences for π/2-BPSK

| Index | CG Sequence {b(0), . . . , b(11)} |
|---|---|
| μ$_{123}$ | {1, 0, 0, 1, 1, 1, 1, 1, 0, 0, 0, 0} or |
|  | {0, 1, 1, 0, 0, 0, 0, 0, 1, 1, 1, 1} |
| μ$_{124}$ | {0, 1, 1, 1, 0, 0, 1, 0, 1, 0, 0, 0} or |
|  | {1, 0, 0, 0, 1, 1, 0, 1, 0, 1, 1, 1} |
| μ$_{125}$ | {0, 0, 0, 1, 1, 0, 1, 0, 1, 0, 0, 0} or |
|  | {1, 1, 1, 0, 0, 1, 0, 1, 0, 1, 1, 1} |
| μ$_{126}$ | {0, 0, 0, 0, 0, 1, 1, 1, 1, 0, 0, 0} or |
|  | {1, 1, 1, 1, 1, 0, 0, 0, 0, 1, 1, 1} |
| μ$_{127}$ | {1, 1, 0, 1, 0, 1, 1, 1, 1, 0, 0, 0} or |
|  | {0, 0, 1, 0, 1, 0, 0, 0, 0, 1, 1, 1} |
| μ$_{128}$ | {1, 0, 0, 1, 0, 0, 0, 0, 0, 1, 0, 0} or |
|  | {0, 1, 1, 0, 1, 1, 1, 1, 1, 0, 1, 1} |
| μ$_{129}$ | {1, 0, 0, 1, 0, 0, 1, 0, 0, 1, 0, 0} or |
|  | {0, 1, 1, 0, 1, 1, 0, 1, 1, 0, 1, 1} |
| μ$_{130}$ | {0, 1, 0, 0, 1, 0, 1, 0, 0, 1, 0, 0} or |
|  | {1, 0, 1, 1, 0, 1, 0, 1, 1, 0, 1, 1} |
| μ$_{131}$ | {1, 0, 1, 1, 1, 0, 1, 0, 0, 1, 0, 0} or |
|  | {0, 1, 0, 0, 0, 1, 0, 1, 1, 0, 1, 1} |
| μ$_{132}$ | {1, 1, 0, 0, 0, 1, 0, 1, 0, 1, 0, 0} or |
|  | {0, 0, 1, 1, 1, 0, 1, 0, 1, 0, 1, 1} |
| μ$_{133}$ | {0, 0, 0, 1, 1, 1, 0, 0, 1, 1, 0, 0} or |
|  | {1, 1, 1, 0, 0, 0, 1, 1, 0, 0, 1, 1} |
| μ$_{134}$ | {1, 0, 0, 0, 0, 1, 1, 0, 1, 1, 0, 0} or |
|  | {0, 1, 1, 1, 1, 0, 0, 1, 0, 0, 1, 1} |
| μ$_{135}$ | {0, 1, 1, 1, 0, 0, 0, 1, 1, 1, 0, 0} or |
|  | {1, 0, 0, 0, 1, 1, 1, 0, 0, 0, 1, 1} |
| μ$_{136}$ | {1, 0, 1, 0, 0, 0, 1, 1, 1, 1, 0, 0} or |
|  | {0, 1, 0, 1, 1, 1, 0, 0, 0, 0, 1, 1} |
| μ$_{137}$ | {1, 1, 0, 0, 1, 0, 0, 0, 0, 0, 1, 0} or |
|  | {0, 0, 1, 1, 0, 1, 1, 1, 1, 1, 0, 1} |
| μ$_{138}$ | {1, 0, 1, 0, 0, 1, 0, 0, 0, 0, 1, 0} or |
|  | {0, 1, 0, 1, 1, 0, 1, 1, 1, 1, 0, 1} |
| μ$_{139}$ | {0, 1, 0, 0, 1, 1, 1, 0, 0, 0, 1, 0} or |
|  | {1, 0, 1, 1, 0, 0, 0, 1, 1, 1, 0, 1} |
| μ$_{140}$ | {0, 1, 0, 0, 1, 0, 0, 1, 0, 0, 1, 0} or |
|  | {1, 0, 1, 1, 0, 1, 1, 0, 1, 1, 0, 1} |
| μ$_{141}$ | {1, 0, 0, 1, 1, 1, 0, 1, 0, 0, 1, 0} or |
|  | {0, 1, 1, 0, 0, 0, 1, 0, 1, 1, 0, 1} |
| μ$_{142}$ | {1, 0, 0, 0, 0, 0, 1, 1, 0, 0, 1, 0} or |
|  | {0, 1, 1, 1, 1, 1, 0, 0, 1, 1, 0, 1} |
| μ$_{143}$ | {1, 0, 0, 0, 1, 1, 1, 1, 0, 0, 1, 0} or |
|  | {0, 1, 1, 1, 0, 0, 0, 0, 1, 1, 0, 1} |
| μ$_{144}$ | {0, 1, 0, 0, 0, 0, 1, 0, 1, 0, 1, 0} or |
|  | {1, 0, 1, 1, 1, 1, 0, 1, 0, 1, 0, 1} |
| μ$_{145}$ | {0, 0, 1, 1, 0, 0, 0, 1, 1, 0, 1, 0} or |
|  | {1, 1, 0, 0, 1, 1, 1, 0, 0, 1, 0, 1} |
| μ$_{146}$ | {0, 0, 0, 0, 1, 1, 0, 1, 1, 0, 1, 0} or |
|  | {1, 1, 1, 1, 0, 0, 1, 0, 0, 1, 0, 1} |
| μ$_{147}$ | {1, 1, 1, 0, 1, 1, 0, 1, 1, 0, 1, 0} or |
|  | {0, 0, 0, 1, 0, 0, 1, 0, 0, 1, 0, 1} |

TABLE 3-2-continued

Length-12 CG sequences for π/2-BPSK

| Index | CG Sequence {b(0), . . . , b(11)} |
|---|---|
| μ$_{148}$ | {1, 1, 0, 1, 1, 0, 1, 1, 1, 0, 1, 0} or |
|  | {0, 0, 1, 0, 0, 1, 0, 0, 0, 1, 0, 1} |
| μ$_{149}$ | {1, 1, 0, 0, 1, 1, 1, 1, 1, 0, 1, 0} or |
|  | {0, 0, 1, 1, 0, 0, 0, 0, 0, 1, 0, 1} |
| μ$_{150}$ | {0, 0, 0, 0, 1, 1, 0, 0, 0, 1, 1, 0} or |
|  | {1, 1, 1, 1, 0, 0, 1, 1, 1, 0, 0, 1} |
| μ$_{151}$ | {1, 1, 0, 0, 0, 0, 0, 1, 0, 1, 1, 0} or |
|  | {0, 0, 1, 1, 1, 1, 1, 0, 1, 0, 0, 1} |
| μ$_{152}$ | {0, 1, 1, 1, 0, 0, 0, 1, 0, 1, 1, 0} or |
|  | {1, 0, 0, 0, 1, 1, 1, 0, 1, 0, 0, 1} |
| μ$_{153}$ | {0, 1, 1, 0, 1, 0, 1, 1, 0, 1, 1, 0} or |
|  | {1, 0, 0, 1, 0, 1, 0, 0, 1, 0, 0, 1} |
| μ$_{154}$ | {1, 1, 0, 1, 1, 0, 1, 1, 0, 1, 1, 0} or |
|  | {0, 0, 1, 0, 0, 1, 0, 0, 1, 0, 0, 1} |
| μ$_{155}$ | {0, 1, 1, 0, 0, 0, 0, 0, 1, 1, 1, 0} or |
|  | {1, 0, 0, 1, 1, 1, 1, 1, 0, 0, 0, 1} |
| μ$_{156}$ | {0, 0, 1, 1, 1, 0, 0, 0, 1, 1, 1, 0} or |
|  | {1, 1, 0, 0, 0, 1, 1, 1, 0, 0, 0, 1} |
| μ$_{157}$ | {0, 0, 0, 1, 0, 1, 0, 0, 1, 1, 1, 0} or |
|  | {1, 1, 1, 0, 1, 0, 1, 1, 0, 0, 0, 1} |
| μ$_{158}$ | {0, 1, 0, 1, 0, 1, 0, 0, 1, 1, 1, 0} or |
|  | {1, 0, 1, 0, 1, 0, 1, 1, 0, 0, 0, 1} |
| μ$_{159}$ | {1, 0, 0, 1, 0, 0, 1, 0, 1, 1, 1, 0} or |
|  | {0, 1, 1, 0, 1, 1, 0, 1, 0, 0, 0, 1} |
| μ$_{160}$ | {0, 1, 0, 0, 0, 1, 1, 0, 1, 1, 1, 0} or |
|  | {1, 0, 1, 1, 1, 0, 0, 1, 0, 0, 0, 1} |
| μ$_{161}$ | {1, 1, 1, 0, 1, 0, 0, 1, 1, 1, 1, 0} or |
|  | {0, 0, 0, 1, 0, 1, 1, 0, 0, 0, 0, 1} |
| μ$_{162}$ | {1, 0, 0, 1, 0, 0, 1, 1, 1, 1, 1, 0} or |
|  | {0, 1, 1, 0, 1, 1, 0, 0, 0, 0, 0, 1} |

In some embodiments, any sequence from Table 3-2 may be mapped to complex-valued modulation symbols d(i) according the above equation (1-1).

In some embodiments, in the above Table 3-2, L (where L is an integer and $1 \leq L \leq 30$) CG sequences each with an index μ$_s$ (where s is an integer and $0 \leq s \leq 162$) may be included in the predetermined sequence table for DMRS with length 12. For each index μ$_s$, either one of the two sequences can be included in the predetermined sequence table for DMRS with length 12. For example, μ$_s \in [0, 29]$. In some embodiments, if there are more than one sequences from the above Table 3-2 that are included in the predetermined sequence table for DMRS with length 12, the indices μ$_{s1}$ and μs2 of any two of the sequences which are included in the predetermined sequence table may be different, where s1 is an integer and $0 \leq s1 \leq 162$, s2 is an integer and $0 \leq s2 \leq 162$, and $s1 \neq s2$.

In some embodiments, in the above Table 3-2, 30 CG sequences each with an index μ$_s$ (where s is an integer and $0 \leq s \leq 162$) may be included in the predetermined sequence table for DMRS with length 12. For example, μ$_s \in [0, 29]$. For each index μ$_s$, either one of the two sequences can be included in the predetermined sequence table for DMRS with length 12. In addition, the indices $\mu_{s1}$ and $\mu_{s2}$ of any two of the sequences which are included in the predetermined sequence table may be different, where s1 is an integer and $0 \leq s1 \leq 162$, s2 is an integer and $0 \leq s2 \leq 162$, and $s1 \neq s2$. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, in the above Table 3-2, L (where L is an integer and $1 \leq L \leq 4$) CG sequences each with an index $\mu_s$ (where $s \in \{20, 21, 24, 92\}$) may be included in the predetermined sequence table for DMRS with length 12. For example, $\mu_s \in [0, 29]$. In some embodiments, for two sequences with a same index $\mu_s$ in the above Table 3-2, either one of the two sequences can be included in the predetermined sequence table for DMRS with length 12. In some embodiments, if there are more than one sequences each with an index $\mu_s$ ($s \in \{20, 21, 24, 92\}$) from the above Table 3-2 that are included in the predetermined sequence table for DMRS with length 12, the indices $\mu_{s1}$ and $\mu_{s2}$ of any two of the sequences which are included in the predetermined sequence table may be different, where $s1 \in \{20, 21, 24, 92\}$ and $s2 \in \{20, 21, 24, 92\}$.

In some embodiments, in the above Table 3-2, L (where L is an integer and $1 \leq L \leq 4$) CG sequences each with an index $\mu_s$ (where $s \in \{40, 56, 123, 141\}$) may be included in the predetermined sequence table for DMRS with length 12. For example, $\mu_s \in [0, 29]$. In some embodiments, for two sequences with a same index $\mu_s$ in the above Table 3-2, either one of the two sequences can be included in the predetermined sequence table for DMRS with length 12. In some embodiments, if there are more than one sequences each with an index $\mu_s$ ($s \in \{40, 56, 123, 141\}$) from the above Table 3-2 that are included in the predetermined sequence table for DMRS with length 12, the indices $\mu_{s1}$ and $\mu_{s2}$ of any two of the sequences which are included in the predetermined sequence table may be different, where $s1 \in \{40, 56, 123, 141\}$ and $s2 \in \{40, 56, 123, 141\}$.

In some embodiments, if the predetermined sequence length is 18, the determined plurality of CG sequences may include one or more of CG sequences in Table 4:

TABLE 4

Length-18 CG sequences for $\pi/2$-BPSK

| Index | CG Sequence {b(0), ..., b(17)} |
|---|---|
| $\mu_0$ | {0, 0, 1, 0, 1, 0, 0, 1, 0, 0, 1, 0, 0, 0, 1, 0, 0, 0} or {1, 1, 0, 1, 0, 1, 1, 0, 1, 1, 0, 1, 1, 1, 0, 1, 1, 1} |
| $\mu_1$ | {0, 1, 1, 0, 1, 0, 0, 0, 1, 0, 0, 0, 1, 1, 1, 1, 0, 0} or {1, 0, 0, 1, 0, 1, 1, 1, 0, 1, 1, 1, 0, 0, 0, 0, 1, 1} |
| $\mu_2$ | {0, 1, 0, 0, 0, 1, 0, 0, 0, 0, 0, 1, 1, 1, 0, 0, 1, 0} or {1, 0, 1, 1, 1, 1, 0, 1, 1, 1, 1, 1, 0, 0, 0, 1, 1, 0, 0, 1} |
| $\mu_3$ | {1, 1, 1, 0, 0, 0, 1, 0, 1, 1, 0, 1, 1, 0, 0, 0, 0, 0} or {0, 0, 0, 1, 1, 0, 1, 0, 0, 0, 1, 0, 0, 1, 1, 1, 1, 1} |
| $\mu_4$ | {1, 1, 1, 1, 1, 1, 1, 0, 0, 0, 1, 0, 1, 0, 0, 1, 0, 0} or {0, 0, 0, 0, 0, 0, 0, 1, 1, 1, 0, 1, 0, 1, 1, 0, 1, 1} |
| $\mu_5$ | {1, 0, 1, 0, 0, 1, 1, 1, 0, 0, 0, 1, 1, 0, 1, 1, 0, 0} or |

TABLE 4-continued

Length-18 CG sequences for $\pi/2$-BPSK

| Index | CG Sequence {b(0), ..., b(17)} |
|---|---|
| | {0, 1, 0, 1, 1, 0, 0, 0, 1, 1, 1, 0, 0, 1, 0, 0, 1, 1} |
| $\mu_6$ | {1, 0, 1, 1, 0, 1, 0, 0, 0, 1, 0, 1, 1, 0, 1, 0, 1, 0} or {0, 1, 0, 0, 1, 0, 1, 1, 1, 0, 1, 0, 0, 1, 0, 1, 0, 1} |
| $\mu_7$ | {1, 1, 0, 0, 0, 1, 1, 0, 0, 1, 1, 1, 0, 0, 0, 1, 0, 0} or {0, 0, 1, 1, 1, 0, 0, 1, 1, 0, 0, 0, 1, 1, 1, 0, 1, 1} |
| $\mu_8$ | {0, 1, 0, 0, 1, 0, 0, 1, 1, 1, 1, 1, 0, 0, 1, 1, 1, 0} or {1, 0, 1, 1, 0, 1, 1, 0, 0, 0, 0, 0, 1, 1, 0, 0, 0, 1} |
| $\mu_9$ | {1, 1, 0, 1, 1, 0, 1, 1, 1, 0, 1, 1, 1, 1, 0, 1, 1, 0} or {0, 0, 1, 0, 0, 1, 0, 0, 0, 1, 0, 0, 0, 0, 1, 0, 0, 1} |
| $\mu_{10}$ | {1, 1, 0, 1, 1, 0, 0, 0, 0, 0, 0, 0, 1, 1, 0, 1, 1, 0} or {0, 0, 1, 0, 0, 1, 1, 1, 1, 1, 1, 1, 0, 0, 1, 0, 0, 1} |
| $\mu_{11}$ | {0, 0, 0, 1, 1, 0, 1, 1, 1, 0, 0, 1, 0, 0, 1, 1, 0, 0} or {1, 1, 1, 0, 0, 1, 0, 0, 0, 1, 1, 0, 1, 1, 0, 0, 1, 1} |
| $\mu_{12}$ | {0, 0, 1, 1, 1, 0, 0, 0, 1, 1, 0, 1, 0, 1, 0, 1, 1, 0} or {1, 1, 0, 0, 0, 1, 1, 1, 0, 0, 1, 0, 1, 0, 1, 0, 0, 1} |
| $\mu_{13}$ | {0, 0, 0, 1, 1, 0, 0, 1, 0, 1, 0, 0, 1, 1, 0, 0, 0, 0} or {1, 1, 1, 0, 0, 1, 1, 0, 1, 0, 1, 1, 0, 0, 1, 1, 1, 1} |
| $\mu_{14}$ | {1, 1, 0, 0, 0, 1, 1, 1, 1, 1, 0, 0, 0, 1, 0, 0, 0, 1, 1, 0} or {0, 0, 1, 1, 1, 0, 0, 0, 0, 0, 1, 1, 0, 1, 1, 1, 0, 0, 1} |
| $\mu_{15}$ | {0, 1, 0, 0, 1, 0, 1, 1, 0, 0, 0, 1, 0, 0, 1, 0, 1, 1, 0, 0} or {1, 0, 1, 1, 0, 1, 0, 0, 1, 1, 1, 0, 1, 1, 0, 0, 0, 1, 1} |
| $\mu_{16}$ | {0, 1, 0, 0, 0, 1, 1, 1, 1, 0, 0, 0, 0, 1, 0, 0, 0, 1, 1, 0} or {1, 0, 1, 1, 1, 0, 0, 0, 0, 1, 1, 1, 1, 0, 1, 1, 1, 0, 0, 1} |
| $\mu_{17}$ | {1, 1, 1, 1, 1, 0, 0, 1, 0, 1, 1, 1, 0, 1, 0, 1, 0, 0} or {0, 0, 0, 0, 0, 1, 1, 0, 1, 0, 0, 0, 1, 0, 1, 0, 1, 1} |
| $\mu_{18}$ | {1, 1, 0, 1, 0, 1, 0, 1, 1, 0, 0, 0, 0, 1, 0, 0, 1, 0} or {0, 0, 1, 0, 1, 0, 1, 0, 0, 1, 1, 1, 1, 0, 1, 1, 0, 1} |
| $\mu_{19}$ | {1, 1, 1, 0, 1, 0, 1, 0, 0, 1, 0, 0, 0, 0, 1, 0} or {0, 0, 0, 1, 0, 1, 0, 1, 1, 0, 1, 1, 1, 0, 1, 1} |
| $\mu_{20}$ | {0, 1, 1, 0, 0, 1, 1, 1, 1, 0, 0, 1, 1, 0, 0, 0, 0, 0} or {1, 0, 0, 1, 1, 0, 0, 0, 0, 0, 1, 1, 0, 0, 1, 1, 1, 1} |
| $\mu_{21}$ | {1, 1, 1, 0, 0, 0, 1, 1, 0, 1, 1, 0, 0, 0, 1, 1, 1, 0} or {0, 0, 0, 1, 1, 1, 0, 0, 1, 0, 0, 1, 1, 1, 0, 0, 0, 1} |
| $\mu_{22}$ | {1, 0, 0, 1, 0, 0, 0, 1, 0, 1, 1, 0, 0, 0, 1, 1, 1, 0} or {0, 1, 1, 0, 1, 1, 0, 1, 0, 0, 1, 1, 0, 0, 1, 0, 0, 1} |
| $\mu_{23}$ | {1, 1, 1, 0, 0, 0, 1, 0, 1, 1, 0, 1, 1, 0, 1, 0, 0, 0} or {0, 0, 0, 1, 1, 1, 0, 1, 0, 0, 1, 0, 0, 1, 0, 1, 1, 1} |
| $\mu_{24}$ | {0, 1, 0, 1, 0, 0, 0, 1, 0, 0, 1, 0, |

TABLE 4-continued

Length-18 CG sequences for π/2-BPSK

| Index | CG Sequence {b(0), ..., b(17)} |
|---|---|
| | 0, 1, 1, 1, 0, 0} or {1, 0, 1, 0, 1, 1, 1, 0, 1, 1, 0, 1, 1, 0, 0, 0, 1, 1} |
| $\mu_{25}$ | {0, 1, 1, 1, 1, 1, 0, 0, 1, 0, 0, 1, 0, 0, 1, 0, 1, 0} or {1, 0, 0, 0, 0, 0, 1, 1, 0, 1, 1, 0, 1, 1, 0, 1, 0, 1} |
| $\mu_{26}$ | {0, 0, 1, 1, 0, 1, 1, 0, 1, 0, 1, 0, 1, 1, 0, 1, 1, 0} or {1, 1, 0, 0, 1, 0, 0, 1, 0, 1, 0, 1, 0, 0, 1, 0, 0, 1} |
| $\mu_{27}$ | {1, 1, 1, 0, 0, 1, 0, 0, 1, 1, 1, 0, 0, 1, 1, 1, 0, 0} or {0, 0, 0, 1, 1, 0, 1, 1, 0, 0, 0, 1, 1, 0, 0, 0, 1, 1} |
| $\mu_{28}$ | {0, 0, 0, 0, 1, 1, 1, 1, 0, 1, 1, 0, 1, 1, 1, 0, 1, 0} or {1, 1, 1, 1, 0, 0, 0, 0, 1, 0, 0, 1, 0, 0, 0, 1, 0, 1} |
| $\mu_{29}$ | {1, 0, 0, 0, 1, 0, 1, 0, 0, 0, 1, 1, 0, 1, 1, 0, 0, 0} or {0, 1, 1, 1, 0, 1, 0, 1, 1, 1, 0, 0, 1, 0, 0, 1, 1, 1} |

Figure 4D:
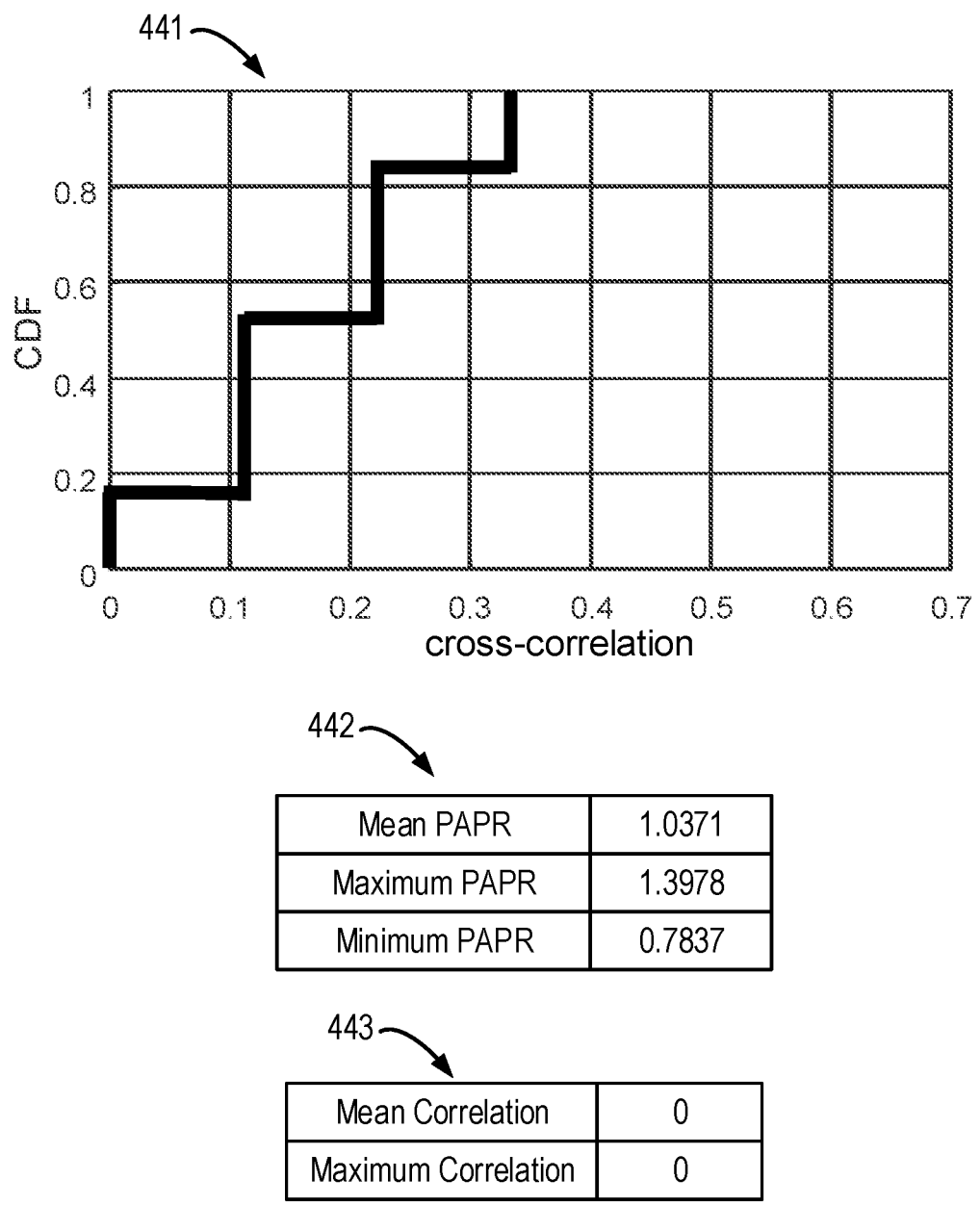
FIG. 4D shows the performance of Length-18 CG sequences for $\pi/2$-BPSK in accordance with some embodiments of the present disclosure.

FIG. 4D shows the performance of the CG sequences in Table 4. For example, the cross-correlation performance of the CG sequences in Table 4 is shown in a cumulative distribution function (CDF) curve 441 in FIG. 4D, in which the horizontal axis may represent autocorrelation values and the vertical axis may represent cumulative distribution probabilities. The PAPR performance (including the mean PAPR, the maximum PAPR and the minimum PAPR) of the CG sequences in Table 4 is shown in Table 442 in FIG. 4D. The cross-correlation performance (including the mean cross-correlation and the maximum cross-correlation) of the CG sequences in Table 4 is shown in Table 443 in FIG. 4D.

In some embodiments, any sequence from Table 4 may be mapped to complex-valued modulation symbols d(i) according the above equation (1-1).

In some embodiments, in the above Table 4, all of the 30 CG sequences may be included in the predetermined sequence table for DMRS with length 18, and $\mu_s$ may represent an index of a sequence within the predetermined sequence table, where s is an integer and $0 \leq s \leq 29$. For example, $\mu_s \in [0, 29]$. For each index $\mu_s$, either one of the two sequences can be included in the predetermined sequence table for DMRS with length 18. The indices $\mu_{s1}$ and $\mu_{s2}$ of any two of the sequences which are included in the predetermined sequence table may be different, where s1 is an integer and $0 \leq s1 \leq 29$, s2 is an integer and $0 \leq s2 \leq 29$, and $s1 \neq s2$. That is, all the values of $\mu_s$ may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

Alternatively, in some embodiments, if the predetermined sequence length is 18, the determined plurality of CG sequences may include one or more of CG sequences in Table 5-1:

TABLE 5-1

Length-18 CG sequences for π/2-BPSK

| Index | CG Sequence {b(0), ..., b(17)} |
|---|---|
| $\mu_0$ | {1, 1, 0, 1, 1, 0, 1, 0, 1, 1, 0, 0, 0, 0, 0, 1, 0, 0} or {0, 0, 1, 0, 0, 1, 0, 1, 0, 0, 1, 1, 1, 1, 1, 0, 1, 1} |
| $\mu_1$ | {0, 1, 0, 0, 1, 0, 0, 0, 0, 0, 1, 1, 0, 1, 0, 1, 0, 0} or {1, 0, 1, 1, 0, 1, 1, 1, 1, 1, 0, 0, 1, 0, 1, 0, 1, 1} |
| $\mu_2$ | {1, 1, 1, 0, 1, 1, 0, 0, 1, 1, 0, 0, 0, 1, 1, 1, 0, 0, 0, 0} or {0, 0, 0, 1, 0, 1, 1, 0, 0, 1, 1, 1, 0, 0, 0, 1, 1, 1} |
| $\mu_3$ | {1, 0, 0, 0, 1, 0, 1, 0, 0, 0, 1, 1, 1, 0, 1, 1, 1, 0} or {0, 1, 1, 1, 0, 1, 0, 1, 1, 1, 0, 0, 0, 1, 0, 0, 0, 1} |
| $\mu_4$ | {1, 1, 0, 0, 0, 1, 1, 1, 1, 0, 0, 1, 1, 1, 0, 0, 1, 0, 0, 0} or {0, 0, 1, 1, 0, 0, 0, 1, 1, 0, 0, 0, 1, 1, 0, 1, 1, 1} |
| $\mu_5$ | {0, 0, 0, 0, 1, 0, 0, 0, 1, 1, 1, 1, 1, 0, 1, 0, 1, 0, 0} or {1, 1, 1, 0, 1, 1, 0, 0, 0, 0, 0, 1, 1, 0, 1, 0, 1, 1} |
| $\mu_6$ | {0, 1, 1, 1, 0, 0, 0, 1, 1, 0, 1, 1, 1, 1, 0, 1, 0, 0} or {1, 0, 0, 0, 1, 1, 0, 0, 1, 0, 0, 0, 0, 1, 0, 1, 1, 0, 1} |
| $\mu_7$ | {0, 1, 1, 1, 1, 1, 1, 0, 0, 0, 1, 0, 1, 1, 0, 1, 1, 0, 0, 0} or {1, 0, 0, 0, 0, 0, 0, 1, 1, 0, 1, 0, 0, 1, 0, 0, 1} |
| $\mu_8$ | {0, 1, 1, 0, 1, 0, 0, 1, 1, 1, 1, 0, 0, 0, 1, 1, 0, 0} or {1, 0, 0, 1, 0, 1, 1, 0, 0, 0, 0, 1, 1, 0, 0, 0, 1, 1} |
| $\mu_9$ | {0, 1, 1, 0, 0, 1, 0, 0, 0, 1, 0, 0, 1, 1, 0, 0, 1, 0} or {1, 0, 0, 1, 1, 0, 1, 1, 1, 0, 1, 1, 0, 0, 1, 1, 0, 1} |
| $\mu_{10}$ | {1, 1, 1, 0, 1, 1, 1, 0, 1, 1, 0, 0, 0, 1, 1, 1, 1, 0} or {0, 0, 0, 1, 0, 0, 0, 1, 0, 0, 1, 1, 1, 0, 0, 0, 0, 1} |
| $\mu_{11}$ | {1, 0, 0, 0, 1, 0, 0, 0, 1, 1, 0, 0, 0, 0, 0, 1, 0} or {0, 1, 1, 1, 0, 1, 1, 1, 0, 0, 1, 1, 0, 1, 1, 1, 0, 1} |
| $\mu_{12}$ | {1, 1, 0, 0, 0, 1, 1, 0, 0, 1, 1, 0, 1, 1, 0, 1, 0, 0} or {0, 0, 1, 1, 1, 0, 0, 1, 1, 0, 0, 1, 0, 0, 1, 0, 1, 1} |
| $\mu_{13}$ | {0, 0, 1, 1, 1, 1, 0, 1, 1, 0, 1, 0, 0, 0, 0, 0, 0, 0} or {1, 1, 0, 0, 0, 0, 1, 0, 0, 1, 0, 1, 1, 1, 1, 1, 1} |
| $\mu_{14}$ | {0, 0, 0, 0, 0, 1, 1, 0, 1, 0, 0, 1, 0, 0, 1, 0, 1, 0} or {1, 1, 1, 1, 1, 0, 0, 1, 0, 1, 1, 0, 1, 1, 0, 1, 0, 1} |
| $\mu_{15}$ | {0, 1, 1, 1, 0, 0, 0, 1, 0, 0, 0, 1, 1, 0, 1, 1, 1, 0} or {1, 0, 0, 0, 1, 1, 1, 0, 1, 1, 1, 0, 0, 1, 0, 0, 0, 1} |
| $\mu_{16}$ | {1, 0, 1, 1, 0, 0, 0, 1, 1, 1, 0, 0, 1, 0, 0, 0, 1, 1, 0} or {0, 1, 0, 0, 1, 1, 0, 0, 0, 1, 1, 0, 0, 1, 1, 0, 0, 1} |
| $\mu_{17}$ | {0, 0, 1, 1, 0, 0, 1, 0, 0, 0, 0, 1, 0, 1, 1, 0, 0, 0} or {1, 1, 0, 0, 1, 1, 0, 1, 1, 1, 0, 1, 1, 1, 0, 1, 1, 1} |
| $\mu_{18}$ | {0, 0, 0, 1, 0, 1, 0, 1, 1, 0, 0, 1, 1, 1, 1, 0, 1, 1, 0} or {1, 1, 0, 1, 0, 1, 0, 0, 1, 1, 0, 0, 0, 0, 1, 0, 0, 0, 1} |

TABLE 5-1-continued

Length-18 CG sequences for π/2-BPSK

| Index | CG Sequence {b(0), . . . , b(17)} |
|---|---|
| $\mu_{19}$ | {0, 1, 1, 1, 0, 1, 0, 1, 1, 0, 0, 1, 1, 1, 0, 0, 0, 0} or {1, 0, 0, 0, 1, 0, 1, 0, 0, 1, 1, 0, 0, 0, 1, 1, 1, 1} |
| $\mu_{20}$ | {0, 0, 0, 0, 0, 1, 0, 1, 0, 1, 0, 0, 1, 0, 1, 1, 0, 0} or {1, 1, 1, 1, 1, 0, 1, 0, 1, 0, 1, 1, 0, 1, 0, 0, 1, 1} |
| $\mu_{21}$ | {1, 0, 1, 1, 0, 1, 1, 0, 0, 0, 1, 0, 1, 0, 0, 1, 1, 0} or {0, 1, 0, 0, 1, 0, 0, 1, 1, 1, 0, 1, 0, 1, 1, 0, 0, 1} |
| $\mu_{22}$ | {0, 0, 1, 0, 1, 1, 0, 0, 1, 1, 0, 1, 0, 0, 0, 1, 1, 0} or {1, 1, 0, 1, 0, 0, 1, 1, 0, 0, 1, 0, 1, 1, 1, 0, 0, 1} |
| $\mu_{23}$ | {0, 0, 0, 1, 1, 0, 0, 0, 1, 1, 0, 1, 1, 1, 1, 1, 1, 0} or {1, 1, 1, 0, 0, 1, 1, 1, 0, 0, 1, 0, 0, 0, 0, 0, 0, 1} |
| $\mu_{24}$ | {1, 0, 1, 0, 0, 1, 1, 1, 1, 1, 1, 1, 1, 1, 1, 1, 0, 0} or {0, 1, 0, 1, 1, 0, 0, 0, 0, 0, 0, 0, 0, 0, 0, 1, 1} |
| $\mu_{25}$ | {1, 0, 0, 0, 1, 1, 1, 1, 1, 0, 0, 0, 0, 0, 1, 0, 0, 0} or {0, 1, 1, 0, 0, 0, 0, 0, 0, 1, 1, 1, 1, 1, 0, 0, 1, 1, 1} |
| $\mu_{26}$ | {0, 1, 0, 0, 1, 1, 1, 1, 1, 1, 0, 1, 1, 1, 0, 0, 1, 0, 0, 0} or {1, 0, 1, 1, 0, 0, 0, 0, 0, 1, 0, 0, 0, 1, 1, 0, 1, 1} |
| $\mu_{27}$ | {1, 1, 0, 1, 1, 0, 1, 1, 0, 0, 0, 0, 1, 1, 0, 1, 1, 0} or {0, 0, 1, 0, 0, 1, 0, 0, 1, 1, 1, 1, 0, 0, 1, 0, 0, 1} |
| $\mu_{28}$ | {0, 1, 0, 1, 0, 1, 1, 0, 1, 0, 1, 0, 1, 1, 0, 0, 1, 0} or {1, 0, 1, 0, 1, 0, 0, 1, 0, 1, 0, 1, 0, 0, 1, 1, 0, 1} |
| $\mu_{29}$ | {1, 1, 0, 1, 1, 1, 1, 0, 0, 1, 0, 1, 0, 0, 0, 1, 1, 1, 1, 0} or {0, 0, 1, 0, 0, 0, 0, 1, 1, 0, 0, 1, 0, 1, 1, 0, 0, 0, 0, 1} |

Figure 4E:
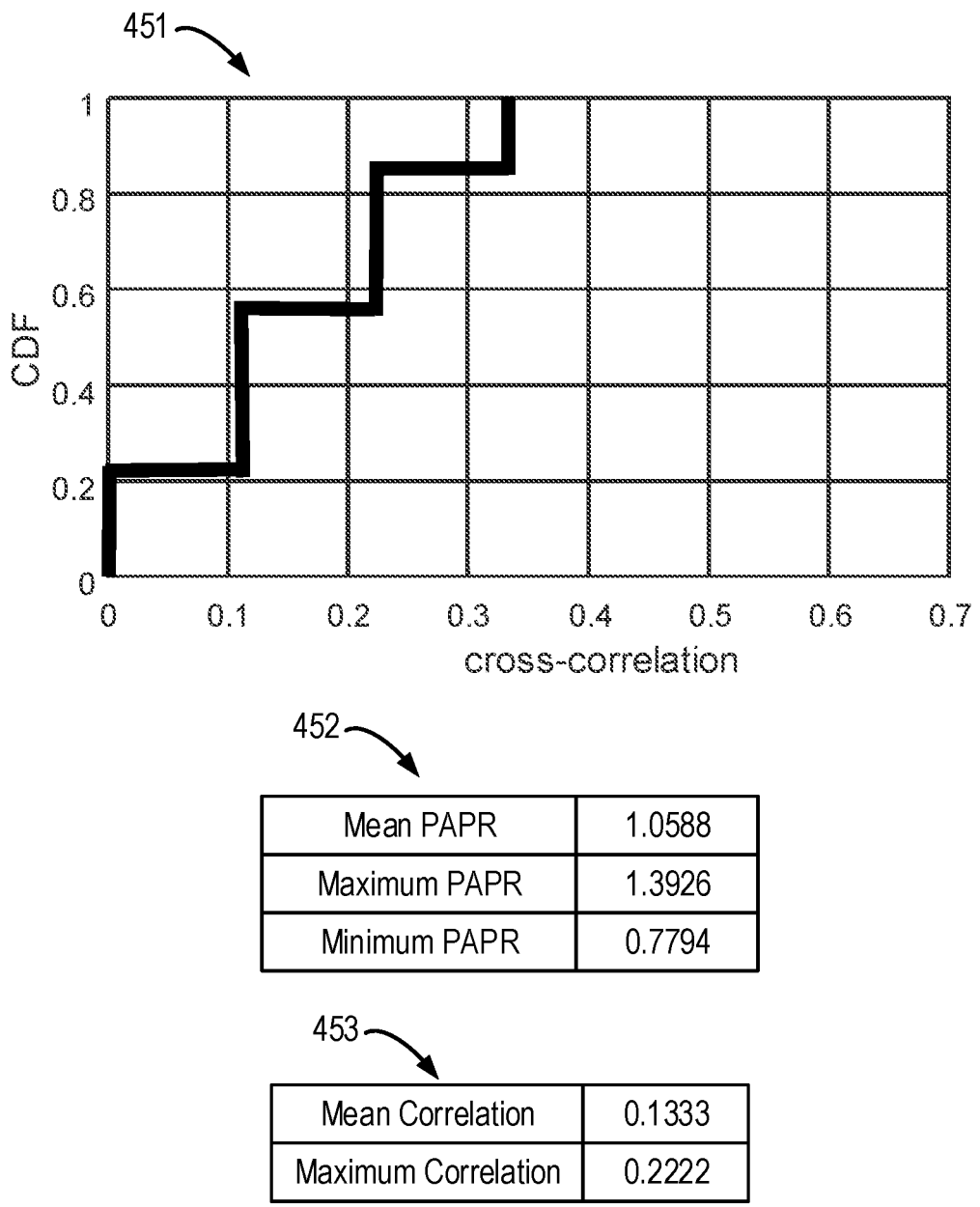
FIG. 4E shows the performance of Length-18 CG sequences for $\pi/2$-BPSK in accordance with some embodiments of the present disclosure.

FIG. 4E shows the performance of the CG sequences in Table 5-1. For example, the cross-correlation performance of the CG sequences in Table 5-1 is shown in a cumulative distribution function (CDF) curve 451 in FIG. 4E, in which the horizontal axis may represent autocorrelation values and the vertical axis may represent cumulative distribution probabilities. The PAPR performance (including the mean PAPR, the maximum PAPR and the minimum PAPR) of the CG sequences in Table 5-1 is shown in Table 452 in FIG. 4E. The cross-correlation performance (including the mean cross-correlation and the maximum cross-correlation) of the CG sequences in Table 5-1 is shown in Table 453 in FIG. 4E.

In some embodiments, any sequence from Table 5-1 may be mapped to complex-valued modulation symbols d(i) according the above equation (1-1).

In some embodiments, in either one of the above Table 4 and Table 5-1, L (where L is an integer and $1 \leq L < 30$) CG sequences each with an index $\mu_s$ (where s is an integer and $0 \leq s \leq 29$) may be included in the predetermined sequence table for DMRS with length 18. For example, $\mu_s \in [0, 29]$. In some embodiments, in either one of the above Table 4 and Table 5-1, for each index $\mu_s$, either one of the two sequences can be included in the predetermined sequence table for DMRS with length 18. In some embodiments, if there are more than one sequences from either one of the above Table 4 and Table 5-1 that are included in the predetermined sequence table for DMRS with length 18, the indices $\mu_{s1}$ and $\mu_{s2}$ of any two of the sequences which are included in the predetermined sequence table may be different, where s1 is an integer and $0 \leq s1 \leq 29$, s2 is an integer and $0 \leq s2 \leq 29$, and $s1 \neq s2$.

In some embodiments, in the above Table 5-1, all of the 30 CG sequences may be included in the predetermined sequence table for DMRS with length 18, and $\mu_s$ may represent an index of a sequence within the predetermined sequence table, where s is an integer and $0 \leq s \leq 29$. For example, $\mu_s \in [0, 29]$. For each index $\mu_s$, either one of the two sequences can be included in the predetermined sequence table for DMRS with length 18. The indices $\mu_{s1}$ and $\mu_{s2}$ of any two of the sequences which are included in the predetermined sequence table may be different, where s1 is an integer and $0 \leq s1 \leq 29$, s2 is an integer and $0 \leq s2 \leq 29$, and $s1 \neq s2$. That is, all the values of $\mu_s$ may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

Alternatively, in some embodiments, if the predetermined sequence length is 18, the predetermined sequence table for DMRS with length 18 may include L (where L is an integer and $1 \leq L \leq 30$) CG sequences in Table 5-2:

TABLE 5-2

Length-18 CG sequences for π/2-BPSK

| Index | CG Sequence {b(0), . . . , b(11)} |
|---|---|
| $\mu_0$ | {0, 0, 1, 1, 1, 1, 0, 1, 1, 0, 1, 0, 0, 0, 0, 0, 0, 0} or {1, 1, 0, 0, 0, 0, 1, 0, 0, 1, 0, 1, 1, 1, 1, 1, 1, 1} |
| $\mu_1$ | {1, 1, 0, 1, 0, 1, 1, 0, 1, 1, 1, 0, 0, 0, 0, 0, 0, 0} or {0, 0, 1, 0, 1, 0, 0, 1, 0, 0, 0, 1, 1, 1, 1, 1, 1, 1} |
| $\mu_2$ | {1, 1, 1, 0, 0, 1, 0, 1, 1, 0, 1, 1, 0, 0, 0, 0, 0, 0} or {0, 0, 0, 1, 1, 0, 1, 0, 0, 1, 0, 0, 1, 1, 1, 1, 1, 1} |
| $\mu_3$ | {0, 0, 0, 1, 1, 0, 0, 1, 0, 1, 0, 0, 1, 1, 0, 0, 0, 0} or {1, 1, 1, 0, 0, 1, 1, 0, 1, 0, 1, 1, 0, 0, 1, 1, 1, 1} |
| $\mu_4$ | {0, 1, 1, 0, 0, 1, 1, 1, 1, 0, 0, 1, 1, 0, 0, 0, 0, 0} or {1, 0, 0, 1, 1, 0, 0, 0, 0, 0, 0, 1, 1, 0, 0, 1, 1, 1} |
| $\mu_5$ | {0, 1, 1, 1, 1, 0, 1, 0, 1, 1, 0, 0, 1, 1, 0, 0, 0, 0} or {1, 0, 0, 0, 0, 1, 0, 1, 0, 0, 1, 1, 0, 0, 1, 1, 1, 1} |
| $\mu_6$ | {0, 0, 1, 0, 1, 0, 0, 1, 0, 0, 0, 1, 0, 0, 0, 0, 0, 0} or {1, 1, 0, 1, 0, 1, 1, 0, 1, 1, 0, 1, 1, 1, 0, 1, 1, 1} |
| $\mu_7$ | {1, 1, 0, 0, 0, 1, 1, 1, 0, 0, 1, 1, 1, 0, 0, 1, 0, 0} or {0, 0, 1, 1, 1, 0, 0, 0, 1, 1, 0, 0, 0, 1, 1, 0, 1, 1, 1} |
| $\mu_8$ | {1, 1, 1, 0, 0, 0, 0, 1, 0, 1, 1, 0, 1, 1, 0, 0, 0, 0} or {0, 0, 0, 1, 1, 1, 0, 1, 0, 0, 1, 0, 0, 1, 0, 1, 1, 1} |
| $\mu_9$ | {1, 0, 0, 1, 1, 1, 1, 1, 0, 0, 0, 0, 0, 1, 1, 0, 0, 0, 0} or {0, 1, 1, 0, 0, 0, 0, 0, 0, 1, 1, 1, 1, 0, 0, 1, 1, 1} |
| $\mu_{10}$ | {0, 0, 1, 1, 0, 0, 1, 0, 0, 0, 0, 1, 0, 1, 1, 0, 0, 0} or |

TABLE 5-2-continued

Length-18 CG sequences for π/2-BPSK

| Index | CG Sequence {b(0), . . . , b(11)} |
|---|---|
| $\mu_{11}$ | {1, 1, 0, 0, 1, 1, 0, 1, 1, 1, 0, 1, 1, 0, 0, 1, 1, 1} |
| $\mu_{12}$ | {1, 0, 0, 0, 1, 0, 1, 0, 0, 0, 1, 1, 0, 1, 1, 0, 0, 0} or {0, 1, 1, 1, 0, 1, 0, 1, 1, 1, 0, 0, 1, 0, 0, 1, 1, 1} |
| $\mu_{13}$ | {1, 1, 1, 0, 1, 0, 0, 1, 1, 0, 0, 0, 1, 1, 1, 0, 0, 0} or {0, 0, 0, 1, 0, 1, 1, 0, 0, 1, 1, 1, 0, 0, 0, 1, 1, 1} |
| $\mu_{14}$ | {1, 1, 0, 1, 1, 0, 1, 0, 1, 1, 0, 0, 0, 0, 0, 1, 0, 0} or {0, 0, 1, 0, 0, 1, 0, 1, 0, 0, 1, 1, 1, 1, 1, 0, 1, 1} |
| $\mu_{15}$ | {1, 1, 0, 0, 0, 1, 1, 0, 0, 1, 1, 1, 0, 0, 0, 1, 0, 0} or {0, 0, 1, 1, 1, 0, 0, 1, 1, 0, 0, 0, 1, 1, 1, 0, 1, 1} |
| $\mu_{16}$ | {1, 1, 1, 1, 1, 1, 1, 0, 0, 0, 1, 0, 1, 0, 0, 1, 0, 0} or {0, 0, 0, 0, 0, 0, 0, 1, 1, 1, 0, 1, 0, 1, 1, 0, 1, 1} |
| $\mu_{17}$ | {0, 1, 1, 1, 1, 1, 1, 1, 0, 0, 1, 0, 1, 0, 1, 0, 0, 0} or {1, 0, 0, 0, 0, 0, 0, 0, 1, 1, 0, 1, 0, 1, 0, 1, 1, 1} |
| $\mu_{18}$ | {0, 1, 0, 0, 1, 1, 1, 1, 1, 0, 1, 1, 1, 0, 0, 1, 0, 0} or {1, 0, 1, 1, 0, 0, 0, 0, 0, 1, 0, 0, 0, 1, 1, 0, 1, 1} |
| $\mu_{19}$ | {1, 1, 1, 1, 1, 1, 1, 0, 0, 0, 1, 0, 0, 1, 0, 1, 0, 0} or {0, 0, 0, 0, 0, 0, 0, 1, 1, 1, 0, 1, 1, 0, 1, 0, 1, 1} |
| $\mu_{20}$ | {0, 0, 0, 1, 0, 0, 1, 1, 1, 1, 1, 0, 0, 1, 0, 1, 0, 0} or {1, 1, 1, 0, 1, 1, 0, 0, 0, 0, 0, 1, 1, 0, 1, 0, 1, 1} |
| $\mu_{21}$ | {1, 1, 1, 1, 1, 0, 0, 0, 1, 0, 0, 1, 0, 1, 0, 1, 0, 0} or {0, 0, 0, 0, 0, 1, 1, 1, 0, 1, 1, 0, 1, 0, 1, 0, 1, 1} |
| $\mu_{22}$ | {0, 1, 0, 0, 1, 0, 0, 0, 0, 0, 1, 1, 0, 1, 0, 1, 0, 0} or {1, 0, 1, 1, 0, 1, 1, 1, 1, 1, 0, 0, 1, 0, 1, 0, 1, 1} |
| $\mu_{23}$ | {1, 1, 1, 1, 1, 0, 0, 1, 0, 0, 1, 1, 1, 0, 1, 0, 1, 0, 0} or {0, 0, 0, 0, 0, 1, 1, 0, 1, 0, 0, 0, 1, 0, 1, 0, 1, 1} |
| $\mu_{24}$ | {1, 1, 0, 0, 0, 1, 1, 0, 0, 0, 1, 1, 0, 1, 1, 0, 1, 0, 0} or {0, 0, 1, 1, 1, 0, 0, 1, 1, 0, 0, 1, 0, 1, 0, 1, 1} |
| $\mu_{25}$ | {0, 1, 1, 0, 1, 0, 0, 1, 1, 1, 1, 0, 0, 0, 1, 1, 0, 0} or {1, 0, 0, 1, 0, 1, 1, 0, 0, 0, 0, 1, 1, 1, 0, 0, 1, 1} |
| $\mu_{26}$ | {0, 0, 0, 1, 1, 0, 1, 1, 1, 0, 0, 1, 0, 0, 1, 1, 0, 0} or {1, 1, 1, 0, 0, 1, 0, 0, 0, 1, 1, 0, 1, 1, 0, 0, 1, 1} |
| $\mu_{27}$ | {0, 1, 0, 1, 0, 1, 1, 0, 0, 0, 1, 0, 0, 1, 1, 0, 0, 0} or {1, 0, 1, 0, 1, 0, 0, 1, 1, 0, 1, 1, 1, 0, 0, 0, 1, 1} |
| $\mu_{28}$ | {0, 0, 0, 0, 0, 1, 0, 1, 0, 1, 0, 0, 1, 0, 1, 1, 0, 0} or {1, 1, 1, 1, 1, 0, 1, 0, 1, 0, 1, 1, 0, 1, 0, 0, 1, 1} |
| $\mu_{29}$ | {1, 0, 1, 0, 0, 1, 1, 1, 0, 0, 0, 1, 1, 0, 1, 1, 0, 0} or {0, 1, 0, 1, 1, 0, 0, 0, 1, 1, 1, 0, 0, 1, 0, 0, 1, 1} |
| $\mu_{30}$ | {0, 1, 1, 1, 1, 1, 1, 0, 0, 1, 0, 1, 1, 0, 1, 1, 0, 0} or {1, 0, 0, 0, 0, 0, 0, 1, 1, 0, 1, 0, 0, 1, 0, 0, 1, 1} |
| $\mu_{31}$ | {0, 1, 0, 1, 0, 0, 1, 0, 0, 0, 1, 0, 0, 1, 1, 1, 0, 0} or {1, 0, 1, 0, 1, 1, 0, 1, 1, 1, 0, 1, 1, 0, 0, 0, 1, 1} |
| $\mu_{32}$ | {1, 1, 1, 1, 0, 0, 1, 0, 0, 1, 1, 1, 0, 0, 1, 1, 1, 0, 0} or {0, 0, 0, 0, 1, 1, 0, 1, 1, 0, 0, 0, 1, 1, 0, 0, 1, 1} |
| $\mu_{33}$ | {1, 0, 0, 0, 1, 0, 1, 0, 0, 0, 1, 1, 0, 1, 1, 1, 0, 0} or {0, 1, 1, 1, 0, 1, 0, 1, 1, 1, 0, 0, 1, 0, 0, 0, 1, 1} |
| $\mu_{34}$ | {0, 1, 1, 0, 1, 0, 0, 0, 1, 0, 0, 0, 1, 1, 1, 1, 0, 0} or {1, 0, 0, 1, 0, 1, 1, 1, 0, 1, 1, 1, 0, 0, 0, 0, 1, 1} |
| $\mu_{35}$ | {1, 0, 1, 0, 0, 0, 1, 1, 1, 1, 1, 1, 1, 1, 1, 0, 0} or {1, 0, 1, 0, 1, 1, 1, 0, 1, 1, 1, 1, 0, 0, 0, 0, 0, 0} or {0, 1, 0, 1, 1, 0, 0, 0, 0, 0, 0, 0, 0, 0, 0, 0, 1, 1} |
| $\mu_{36}$ | {1, 0, 0, 0, 1, 0, 0, 0, 1, 1, 0, 0, 1, 0, 0, 0, 0, 0} or {0, 1, 1, 1, 0, 1, 1, 1, 0, 0, 1, 1, 0, 1, 1, 1, 0, 1} |
| $\mu_{37}$ | {0, 1, 0, 1, 0, 1, 0, 0, 1, 1, 1, 1, 1, 0, 0, 0, 1, 0} or {1, 0, 1, 0, 1, 0, 1, 1, 0, 0, 0, 0, 0, 1, 1, 1, 0, 1} |
| $\mu_{38}$ | {1, 1, 0, 1, 0, 1, 0, 1, 1, 0, 0, 0, 0, 1, 0, 0, 1, 0} or {0, 0, 1, 0, 1, 0, 1, 0, 0, 1, 1, 1, 1, 0, 1, 1, 0, 1} |
| $\mu_{39}$ | {1, 1, 1, 0, 1, 0, 1, 0, 0, 1, 0, 0, 0, 1, 0, 0, 1, 0} or {0, 0, 0, 1, 0, 1, 0, 1, 1, 0, 1, 1, 1, 0, 1, 1, 0, 1} |
| $\mu_{40}$ | {0, 1, 1, 1, 0, 0, 1, 1, 0, 1, 1, 1, 0, 1, 0, 0, 1, 0} or {1, 0, 0, 0, 1, 1, 0, 1, 0, 0, 0, 0, 1, 0, 1, 1, 0, 1} |
| $\mu_{41}$ | {0, 1, 1, 0, 0, 1, 0, 0, 0, 1, 0, 0, 1, 1, 0, 0, 1, 0} or {1, 0, 0, 1, 1, 0, 1, 1, 1, 0, 1, 1, 0, 0, 1, 1, 0, 1} |
| $\mu_{42}$ | {0, 1, 0, 1, 0, 1, 1, 0, 1, 0, 1, 0, 1, 1, 0, 0, 1, 0} or {1, 0, 1, 0, 1, 0, 0, 1, 0, 1, 0, 1, 0, 0, 1, 1, 0, 1} |
| $\mu_{43}$ | {0, 1, 0, 0, 0, 1, 0, 0, 0, 0, 0, 1, 1, 1, 0, 0, 1, 0} or {1, 0, 1, 1, 1, 0, 1, 1, 1, 1, 1, 0, 0, 0, 1, 1, 0, 1} |
| $\mu_{44}$ | {0, 1, 1, 1, 1, 1, 0, 0, 1, 0, 0, 1, 0, 0, 1, 0, 1, 0} or {1, 0, 0, 0, 0, 0, 1, 1, 0, 1, 1, 0, 1, 1, 0, 1, 0, 1} |
| $\mu_{45}$ | {0, 0, 0, 0, 0, 1, 1, 0, 1, 0, 0, 1, 0, 0, 1, 0, 1, 0} or {1, 1, 1, 1, 1, 0, 0, 1, 0, 1, 1, 0, 1, 1, 0, 1, 0, 1} |
| $\mu_{46}$ | {1, 0, 1, 1, 0, 1, 0, 0, 0, 1, 0, 1, 1, 0, 1, 0, 1, 0} or {0, 1, 0, 0, 1, 0, 1, 1, 1, 0, 1, 0, 0, 1, 0, 1, 0, 1} |
| $\mu_{47}$ | {1, 0, 0, 1, 0, 0, 1, 0, 1, 1, 0, 0, 0, 1, 1, 0, 1, 0} or {0, 1, 1, 0, 1, 1, 0, 1, 0, 0, 1, 1, 1, 0, 0, 1, 0, 1} |

TABLE 5-2-continued

Length-18 CG sequences for π/2-BPSK

| Index | CG Sequence {b(0), . . . , b(11)} |
|---|---|
| $\mu_{48}$ | {0, 0, 0, 0, 1, 1, 1, 1, 0, 1, 1, 0, 1, 1, 1, 0, 1, 0} or {1, 1, 1, 1, 0, 0, 0, 0, 1, 0, 0, 1, 0, 0, 0, 1, 0, 1} |
| $\mu_{49}$ | {1, 1, 0, 1, 1, 0, 1, 1, 1, 0, 1, 1, 1, 1, 1, 0, 1, 0} or {0, 0, 1, 0, 0, 1, 0, 0, 0, 1, 0, 0, 0, 0, 0, 1, 0, 1} |
| $\mu_{50}$ | {1, 0, 1, 1, 0, 0, 1, 1, 1, 0, 0, 1, 0, 0, 0, 1, 1, 0} or {0, 1, 0, 0, 1, 1, 0, 0, 0, 1, 1, 0, 1, 1, 1, 0, 0, 1} |
| $\mu_{51}$ | {1, 1, 0, 0, 1, 1, 1, 1, 1, 0, 0, 1, 0, 0, 0, 1, 1, 0} or {0, 0, 1, 1, 0, 0, 0, 0, 0, 1, 1, 0, 1, 1, 0, 0, 1} |
| $\mu_{52}$ | {0, 0, 1, 0, 1, 1, 0, 0, 1, 1, 0, 1, 0, 0, 0, 1, 1, 0} or {1, 1, 0, 1, 0, 0, 1, 1, 0, 0, 1, 0, 1, 1, 1, 0, 0, 1} |
| $\mu_{53}$ | {1, 0, 1, 1, 0, 1, 1, 0, 0, 0, 1, 0, 1, 0, 0, 1, 1, 0} or {0, 1, 0, 0, 1, 0, 0, 1, 1, 1, 0, 1, 0, 1, 1, 0, 0, 1} |
| $\mu_{54}$ | {1, 1, 1, 0, 0, 0, 0, 0, 1, 1, 0, 1, 0, 1, 0, 1, 1, 0} or {0, 0, 0, 1, 1, 1, 1, 1, 0, 0, 1, 0, 1, 0, 1, 0, 0, 1} |
| $\mu_{55}$ | {0, 0, 1, 1, 1, 0, 0, 0, 1, 1, 0, 1, 0, 1, 0, 1, 1, 0} or {1, 1, 0, 0, 0, 1, 1, 1, 0, 0, 1, 0, 1, 0, 0, 0, 1} |
| $\mu_{56}$ | {1, 1, 0, 1, 1, 0, 0, 0, 0, 0, 0, 0, 0, 1, 1, 0, 1, 1, 0} or {0, 0, 1, 0, 0, 1, 1, 1, 1, 1, 1, 1, 0, 0, 1, 0, 0, 0, 1} |
| $\mu_{57}$ | {1, 1, 0, 0, 1, 1, 0, 1, 1, 0, 0, 0, 0, 1, 1, 0, 1, 1, 0} or {0, 0, 1, 0, 0, 1, 0, 0, 1, 1, 1, 1, 0, 0, 1, 0, 0, 0, 1} |
| $\mu_{58}$ | {0, 0, 1, 1, 0, 1, 1, 1, 0, 1, 0, 1, 0, 1, 0, 1, 1, 0} or {1, 1, 0, 0, 1, 0, 0, 1, 0, 1, 0, 0, 0, 1, 0, 0, 0, 1} |
| $\mu_{59}$ | {0, 0, 1, 0, 1, 0, 1, 1, 0, 0, 1, 1, 1, 1, 0, 1, 1, 0} or {1, 1, 0, 1, 0, 1, 0, 0, 1, 1, 0, 0, 0, 0, 0, 1, 0, 0, 0, 1} |
| $\mu_{60}$ | {0, 1, 0, 0, 0, 1, 1, 1, 0, 0, 0, 1, 0, 0, 0, 1, 1, 0} or {1, 0, 1, 1, 0, 0, 0, 0, 1, 1, 1, 0, 1, 1, 1, 0, 0, 0, 1} |
| $\mu_{61}$ | {1, 1, 0, 1, 1, 1, 0, 0, 0, 1, 0, 1, 0, 0, 0, 1, 1, 1, 0} or {0, 0, 1, 0, 0, 0, 0, 1, 1, 0, 1, 0, 1, 1, 1, 0, 0, 0, 1} |
| $\mu_{62}$ | {1, 1, 1, 0, 0, 0, 1, 1, 0, 1, 1, 0, 0, 0, 1, 1, 1, 0} or {0, 0, 0, 1, 1, 1, 0, 0, 1, 0, 0, 1, 1, 1, 1, 0, 0, 0, 1} |
| $\mu_{63}$ | {0, 1, 0, 0, 1, 0, 0, 1, 1, 1, 1, 1, 0, 0, 1, 1, 1, 0} or {1, 0, 1, 1, 0, 1, 1, 0, 0, 0, 0, 0, 1, 1, 0, 0, 0, 1} |
| $\mu_{64}$ | {0, 1, 1, 1, 0, 0, 0, 1, 0, 0, 0, 1, 1, 0, 1, 1, 1, 0} or {1, 0, 0, 0, 1, 1, 1, 0, 1, 1, 1, 0, 0, 1, 0, 0, 0, 1} |
| $\mu_{65}$ | {1, 1, 1, 0, 1, 1, 1, 0, 1, 1, 0, 0, 0, 0, 1, 1, 1, 0} or {0, 0, 0, 1, 0, 0, 0, 1, 0, 0, 1, 1, 1, 1, 0, 0, 0, 1} |
| $\mu_{66}$ | {0, 0, 0, 1, 1, 0, 0, 0, 1, 1, 0, 0, 1, 1, 1, 1, 1, 1, 0} or {1, 1, 1, 0, 0, 1, 1, 1, 0, 0, 1, 1, 0, 0, 0, 0, 0, 1} |
| $\mu_{67}$ | {1, 1, 1, 1, 1, 0, 0, 0, 1, 1, 0, 1, 1, 1, 0, 0, 0, 0, 0} or {0, 0, 0, 0, 0, 1, 1, 1, 0, 0, 1, 0, 0, 0, 1, 1, 1, 1} |
| $\mu_{68}$ | {0, 0, 0, 1, 1, 0, 0, 1, 1, 0, 1, 1, 1, 1, 0, 0, 0, 0} or {1, 1, 1, 0, 0, 1, 1, 0, 0, 1, 0, 0, 0, 0, 1, 1, 1, 1} |
| $\mu_{69}$ | {1, 0, 0, 0, 0, 1, 1, 1, 0, 1, 1, 0, 1, 0, 1, 0, 0, 0, 0} or {0, 1, 1, 1, 1, 0, 0, 0, 1, 0, 0, 1, 0, 1, 0, 1, 1, 1} |
| $\mu_{70}$ | {0, 1, 1, 0, 0, 0, 0, 1, 1, 0, 0, 1, 1, 0, 1, 0, 0, 0, 0} or {1, 0, 0, 1, 1, 1, 1, 0, 0, 1, 1, 0, 0, 1, 0, 1, 1, 1} |
| $\mu_{71}$ | {0, 0, 1, 1, 0, 1, 0, 1, 0, 1, 1, 0, 0, 1, 1, 0, 0, 0, 0} or {1, 1, 0, 0, 1, 0, 1, 0, 1, 0, 1, 0, 0, 1, 1, 0, 0, 1, 1, 1} |
| $\mu_{72}$ | {1, 0, 1, 1, 0, 0, 1, 1, 0, 1, 1, 1, 0, 0, 0, 0, 1, 0, 0} or {0, 1, 0, 0, 1, 1, 0, 0, 1, 0, 0, 0, 0, 1, 1, 1, 1} |
| $\mu_{73}$ | {0, 1, 1, 1, 1, 1, 1, 1, 0, 0, 1, 1, 0, 0, 1, 0, 0, 0} or {1, 0, 0, 0, 0, 0, 0, 0, 0, 1, 1, 0, 0, 1, 1, 0, 1, 1} |
| $\mu_{74}$ | {1, 1, 0, 1, 0, 0, 0, 0, 0, 1, 1, 0, 1, 0, 1, 0, 0} or {0, 0, 1, 0, 1, 1, 1, 1, 1, 0, 0, 1, 0, 1, 0, 1, 1} |
| $\mu_{75}$ | {1, 0, 0, 0, 0, 0, 0, 1, 1, 1, 0, 1, 0, 0, 1, 1, 0, 0} or {0, 1, 1, 1, 1, 1, 1, 0, 0, 0, 1, 0, 1, 0, 0, 1, 1} |
| $\mu_{76}$ | {0, 0, 1, 1, 1, 0, 1, 1, 0, 0, 0, 1, 0, 1, 1, 0, 0} or {1, 1, 0, 0, 0, 1, 0, 0, 1, 1, 1, 0, 1, 0, 0, 1, 1} |
| $\mu_{77}$ | {1, 1, 1, 0, 1, 1, 0, 0, 0, 0, 0, 1, 1, 0, 1, 1, 1, 0, 0} or {0, 0, 0, 1, 0, 0, 1, 1, 1, 1, 1, 0, 0, 1, 0, 0, 0, 1, 1} |
| $\mu_{78}$ | {0, 0, 0, 0, 1, 1, 0, 1, 1, 1, 0, 0, 1, 1, 1, 1, 0, 0} or {1, 1, 1, 1, 0, 0, 1, 0, 0, 0, 1, 1, 0, 0, 0, 0, 1, 1} |
| $\mu_{79}$ | {1, 1, 1, 1, 0, 1, 0, 1, 1, 1, 0, 0, 0, 0, 0, 0, 1, 0} or {0, 0, 0, 0, 1, 0, 1, 0, 0, 0, 1, 1, 1, 1, 1, 1, 0, 1} |
| $\mu_{80}$ | {0, 1, 0, 0, 1, 1, 1, 1, 1, 0, 0, 1, 0, 0, 1, 0} or {1, 0, 1, 1, 0, 0, 0, 0, 0, 1, 0, 1, 1, 0, 1, 1, 0, 1} |
| $\mu_{81}$ | {0, 1, 1, 0, 0, 0, 0, 0, 0, 1, 0, 0, 1, 1, 0, 0, 1, 0} or {1, 0, 0, 1, 1, 1, 1, 1, 1, 0, 1, 1, 0, 0, 1, 1, 0, 1} |
| $\mu_{82}$ | {1, 0, 0, 0, 0, 1, 1, 1, 0, 1, 0, 1, 1, 1, 0, 0, 1, 0} or {0, 1, 1, 0, 1, 0, 0, 0, 1, 0, 1, 0, 0, 0, 1, 1, 0, 1} |
| $\mu_{83}$ | {1, 0, 0, 0, 1, 0, 1, 1, 1, 0, 1, 0, 0, 0, 1, 0, 1, 0} or {0, 1, 1, 1, 0, 1, 0, 0, 0, 1, 0, 1, 1, 1, 0, 1, 0, 1} |
| $\mu_{84}$ | {0, 1, 0, 1, 1, 1, 0, 1, 0, 0, 0, 1, 1, 0, 0, 1, 0, 1, 0} or {1, 0, 1, 0, 0, 0, 1, 0, 1, 1, 0, 0, 1, 0, 1, 0, 1} |
| $\mu_{85}$ | {0, 0, 0, 1, 1, 0, 0, 0, 1, 1, 0, 0, 0, 0, 1, 1, 0, 1, 0} or |

TABLE 5-2-continued

Length-18 CG sequences for π/2-BPSK

| Index | CG Sequence {b(0), . . . , b(11)} |
|---|---|
| $\mu_{86}$ | {1, 1, 1, 0, 0, 0, 1, 1, 1, 0, 0, 1, 1, 1, 0, 0, 1, 0, 1} |
| | {0, 0, 1, 0, 1, 1, 0, 0, 0, 0, 1, 1, 0, 1, 1, 0, 1, 0} or |
| | {1, 1, 0, 1, 0, 0, 0, 1, 1, 1, 1, 0, 0, 0, 1, 0, 0, 1, 0, 1} |
| $\mu_{87}$ | {0, 1, 1, 0, 0, 1, 1, 0, 0, 0, 1, 1, 0, 0, 0, 0, 1, 1, 0} or |
| | {1, 0, 0, 1, 0, 0, 0, 1, 1, 1, 0, 0, 1, 1, 1, 0, 0, 1} |
| $\mu_{88}$ | {1, 1, 1, 0, 0, 0, 0, 1, 1, 0, 1, 1, 0, 0, 0, 1, 1, 0} or |
| | {0, 0, 0, 1, 1, 1, 1, 0, 0, 0, 1, 0, 0, 0, 1, 1, 1, 0, 0, 0, 1} |
| $\mu_{89}$ | {0, 1, 0, 1, 0, 0, 1, 1, 0, 0, 1, 0, 1, 0, 0, 1, 1, 0} or |
| | {1, 0, 1, 0, 1, 1, 0, 0, 1, 1, 0, 1, 0, 1, 1, 0, 0, 0, 1} |
| $\mu_{90}$ | {0, 0, 1, 0, 0, 0, 1, 0, 1, 1, 0, 1, 0, 1, 0, 1, 1, 0} or |
| | {1, 1, 0, 1, 1, 1, 0, 1, 0, 0, 1, 0, 1, 0, 1, 0, 0, 0, 1} |
| $\mu_{91}$ | {0, 0, 1, 0, 0, 1, 1, 1, 0, 0, 0, 0, 1, 1, 0, 1, 1, 0} or |
| | {1, 1, 0, 1, 1, 0, 0, 0, 1, 1, 1, 1, 0, 0, 1, 0, 0, 0, 1} |
| $\mu_{92}$ | {0, 0, 0, 1, 1, 1, 0, 0, 0, 0, 0, 1, 1, 1, 0, 1, 1, 0} or |
| | {1, 1, 1, 0, 0, 0, 0, 1, 1, 1, 1, 1, 0, 0, 0, 1, 0, 0, 0, 1} |
| $\mu_{93}$ | {0, 1, 0, 0, 0, 1, 0, 1, 1, 0, 1, 0, 1, 0, 1, 1, 1, 1, 0} or |
| | {1, 0, 1, 1, 0, 1, 0, 0, 0, 1, 0, 1, 0, 1, 0, 0, 0, 0, 1} |
| $\mu_{94}$ | {1, 1, 0, 0, 0, 1, 0, 0, 0, 1, 1, 1, 0, 1, 1, 1, 1, 1, 0} or |
| | {0, 0, 1, 1, 1, 0, 1, 1, 0, 0, 0, 1, 0, 0, 0, 0, 0, 1} |

In some embodiments, any sequence from Table 5-2 may be mapped to complex-valued modulation symbols d(i) according the above equation (1-1).

In some embodiments, in the above Table 5-2, L (where L is an integer and 1≤L≤30) CG sequences may be included in the predetermined sequence table for DMRS with length 18, and $\mu_s$ may represent an index of a sequence which is included in the predetermined sequence table, where s is an integer and 0≤s≤94. In some embodiments, in the above Table 5-2, for each index $\mu_s$, either one of the two sequences can be included in the predetermined sequence table for DMRS with length 18. For example, $\mu_s \in [0, 29]$. In some embodiments, if there are more than one sequences that are included in the predetermined sequence table for DMRS with length 18, the indices $\mu_{s1}$ and $\mu_{s2}$ of any two of the sequences which are included in the predetermined sequence table may be different, where s1 is an integer and 0≤s1≤94, s2 is an integer and 0≤s2≤94, and s1≠s2.

In some embodiments, in the above Table 5-2, 30 CG sequences each with an index $\mu_s$ (where s is an integer and 0≤s≤94) may be included in the predetermined sequence table for DMRS with length 18. For example, $\mu_s \in [0, 29]$. For each index $\mu_s$, either one of the two sequences can be included in the predetermined sequence table for DMRS with length 18. The indices $\mu_{s1}$ and $\mu_{s2}$ of any two of the sequences which are included in the predetermined sequence table may be different, where s1 is an integer and 0≤s1≤94, s2 is an integer and 0≤s2≤94, and s1≠s2. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, in the above Table 5-2, L (where L is an integer and 1≤L≤7) CG sequences each with an index $\mu_s$ (where s∈{1, 16, 18, 20, 34, 37, 54}) may be included in the predetermined sequence table for DMRS with length 18. For example, $\mu_s \in [0, 29]$. For two sequences with a same index $\mu_s$ in the above Table 5-2, either one of the two sequences can be included in the predetermined sequence table for DMRS with length 18. In some embodiments, if there are more than one sequences each with an index $\mu_s$ (where s∈{1, 16, 18, 20, 34, 37, 54}) from the above Table 5-2 that are included in the predetermined sequence table for DMRS with length 18, the indices $\mu_{s1}$ and $\mu_{s2}$ of any two of the sequences which are included in the predetermined sequence table may be different, where s1∈{1, 16, 18, 20, 34, 37, 54} and s2∈{1, 16, 18, 20, 34, 37, 54}.

In some embodiments, if the predetermined sequence length is 24, the determined plurality of CG sequences may include one or more of CG sequences in Table 6:

TABLE 6

Length-24 CG sequences for π/2-BPSK

| Index | CG Sequence {b(0), . . . , b(23)} |
|---|---|
| $\mu_0$ | {1, 1, 1, 0, 1, 0, 0, 0, 1, 1, 1, 1, 0, 1, 1, 0, 0, 0, 0, 0, 0, 1, 0, 0} |
| $\mu_1$ | {1, 0, 0, 0, 1, 1, 1, 1, 1, 1, 0, 0, 1, 0, 0, 1, 0, 0, 0, 1, 0, 0, 1, 0} |
| $\mu_2$ | {1, 0, 1, 1, 0, 0, 1, 1, 0, 1, 1, 0, 0, 0, 0, 0, 1, 1, 1, 1, 0, 1, 1, 0} |
| $\mu_3$ | {0, 1, 1, 0, 1, 0, 1, 1, 0, 1, 1, 0, 0, 0, 1, 1, 0, 1, 0, 1, 1, 1, 0, 0} |
| $\mu_4$ | {0, 0, 0, 0, 1, 1, 0, 1, 1, 0, 1, 0, 0, 1, 0, 1, 1, 1, 0, 1, 1, 0, 0, 0} |
| $\mu_5$ | {1, 1, 1, 0, 1, 1, 0, 0, 0, 0, 1, 0, 1, 0, 1, 1, 1, 0, 1, 0, 0, 1, 1, 0} |
| $\mu_6$ | {0, 1, 0, 0, 0, 1, 0, 0, 0, 1, 0, 1, 0, 0, 1, 1, 0, 1, 1, 0, 1, 1, 1, 0} |
| $\mu_7$ | {1, 1, 1, 0, 0, 1, 1, 1, 0, 0, 0, 0, 1, 1, 0, 1, 1, 1, 0, 1, 0, 1, 1, 0} |
| $\mu_8$ | {0, 1, 0, 1, 0, 0, 0, 1, 1, 1, 1, 1, 1, 0, 0, 1, 0, 1, 1, 0, 0, 1, 0, 0} |
| $\mu_9$ | {1, 1, 1, 1, 1, 0, 1, 1, 0, 0, 0, 1, 0, 1, 1, 1, 0, 0, 1, 0, 0, 0, 0, 0} |
| $\mu_{10}$ | {0, 0, 1, 1, 0, 1, 0, 0, 0, 1, 1, 1, 0, 1, 1, 0, 0, 0, 0, 1, 1, 0, 1, 0} |
| $\mu_{11}$ | {0, 0, 1, 0, 0, 0, 1, 0, 0, 1, 0, 0, 0, 0, 0, 1, 1, 0, 1, 1, 0, 1, 1, 0} |
| $\mu_{12}$ | {1, 1, 0, 1, 0, 1, 1, 0, 1, 0, 0, 1, 0, 0, 1, 0, 1, 0, 0, 0, 1, 0, 0, 0} |
| $\mu_{13}$ | {0, 0, 1, 0, 0, 1, 1, 1, 0, 0, 0, 1, 1, 0, 1, 0, 1, 0, 0, 0, 1, 1, 1, 0} |
| $\mu_{14}$ | {1, 0, 1, 1, 0, 0, 0, 1, 1, 0, 1, 0, 1, 1, 0, 1, 0, 1, 1, 0, 1, 1, 0, 1, 0} |
| $\mu_{15}$ | {1, 1, 0, 0, 0, 1, 1, 1, 1, 1, 1, 0, 1, 1, 1, 1, 0, 0, 1, 1, 1, 0, 0, 0} |
| $\mu_{16}$ | {0, 0, 0, 1, 1, 1, 1, 1, 0, 1, 1, 1, 0, 0, 0, 1, 1, 0, 0, 0, 1, 1, 0, 0} |
| $\mu_{17}$ | {1, 0, 0, 0, 1, 1, 1, 0, 1, 1, 1, 1, 1, 1, 0, 0, 0, 1, 0, 1, 1, 0, 1, 0, 0} |
| $\mu_{18}$ | {1, 1, 1, 1, 1, 1, 0, 0, 0, 1, 0, 0, 0, 0, 1, 1, 1, 1, 1, 0, 0, 0, 1, 0, 0, 0} |
| $\mu_{19}$ | {0, 1, 0, 1, 1, 0, 1, 0, 1, 0, 1, 1, 0, 1, 0, 1, 0, 1, 0, 0, 1, 1, 1, 0} |
| $\mu_{20}$ | {0, 1, 0, 0, 0, 1, 1, 0, 1, 0, 1, 1, 1, 0, 0, 0, 0, 1, 1, 0, 1, 0, 1, 1, 0} |
| $\mu_{21}$ | {0, 0, 1, 1, 1, 1, 1, 1, 0, 1, 0, 0, 0, 1, 1, 0, 0, 1, 0, 1, 1, 1, 1, 0, 0} |
| $\mu_{22}$ | {0, 0, 1, 1, 0, 1, 1, 0, 1, 1, 1, 1, 0, 0, 0, 1, 0, 1, 1, 0, 0, 0, 0, 0} |
| $\mu_{23}$ | {0, 1, 1, 1, 1, 1, 0, 1, 0, 1, 0, 1, 1, |

TABLE 6-continued

Length-24 CG sequences for π/2-BPSK

| Index | CG Sequence {b(0), ..., b(23)} |
|---|---|
| $\mu_{24}$ | {0, 0, 1, 1, 1, 0, 0, 1, 0, 1, 0, 1, 1, 0, 0, 0, 1, 1, 1, 0, 0, 0, 0, 0} |
| $\mu_{25}$ | {0, 1, 1, 0, 0, 1, 0, 0, 1, 0, 0, 1, 1, 1, 0, 1, 1, 0, 0, 0, 0, 0, 0} |
| $\mu_{26}$ | {1, 1, 1, 0, 0, 1, 0, 0, 0, 1, 1, 0, 1, 1, 0, 0, 1, 0, 1, 0, 1, 0, 0, 0} |
| $\mu_{27}$ | {1, 0, 0, 1, 0, 0, 0, 1, 0, 0, 1, 1, 0, 1, 0, 1, 0, 0, 0, 0, 1, 1, 1, 0} |
| $\mu_{28}$ | {1, 0, 0, 0, 1, 1, 0, 0, 0, 0, 1, 1, 0, 1, 1, 1, 1, 0, 0, 0, 1, 1, 0} |
| $\mu_{29}$ | {1, 1, 0, 0, 0, 0, 0, 1, 1, 0, 1, 1, 0, 1, 0, 1, 1, 0, 1, 0, 1, 1, 0, 0} |

Figure 4F:
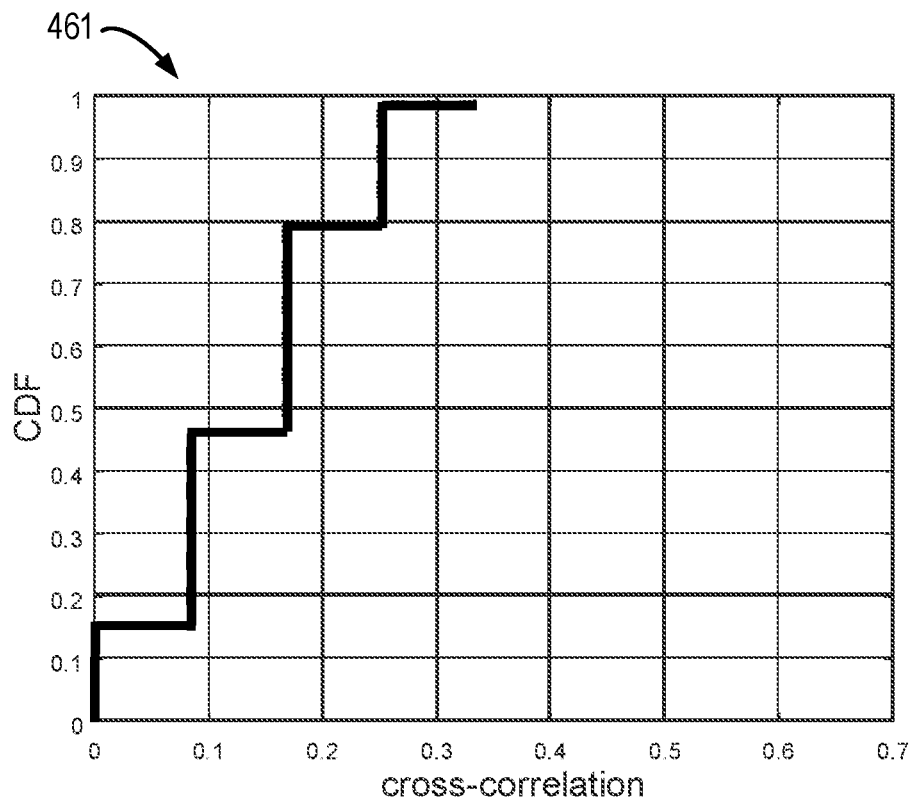
FIG. 4F shows the performance of Length-24 CG sequences for $\pi/2$-BPSK in accordance with some embodiments of the present disclosure.

FIG. 4F shows the performance of the CG sequences in Table 6. For example, the cross-correlation performance of the CG sequences in Table 6 is shown in a cumulative distribution function (CDF) curve 461 in FIG. 4F, in which the horizontal axis may represent autocorrelation values and the vertical axis may represent cumulative distribution probabilities. The PAPR performance (including the mean PAPR, the maximum PAPR and the minimum PAPR) of the CG sequences in Table 6 is shown in Table 462 in FIG. 4F. The cross-correlation performance (including the mean cross-correlation and the maximum cross-correlation) of the CG sequences in Table 6 is shown in Table 463 in FIG. 4F.

In some embodiments, in the above Table 6, all of the 30 CG sequences may be included in the predetermined sequence table for DMRS with length 24, and $\mu_s$ may represent an index of a sequence within the predetermined sequence table, where s is an integer and 0≤s≤29. In the above Table 6, for example, $\mu_s \in [0, 29]$. For each index $\mu_s$, either one of the two sequences can be included in the predetermined sequence table for DMRS with length 24. In addition, the indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2. That is, all the values of $\mu_s$ may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

Alternatively, in some embodiments, if the predetermined sequence length is 24, the determined plurality of CG sequences may include one or more of CG sequences in Table 7-1:

TABLE 7-1

Length-24 CG sequences for π/2-BPSK

| Index | CG Sequence {b(0), ..., b(23)} |
|---|---|
| $\mu_0$ | {0, 0, 1, 1, 1, 0, 0, 1, 0, 0, 0, 1, 1, 0, 1, 0, 1, 0, 1, 0, 1, 0, 0, 0} |
| $\mu_1$ | {0, 0, 1, 1, 1, 1, 1, 1, 0, 0, 0, 0, 1, 1, 0, 1, 1, 0, 0, 1, 0, 0, 1, 0} |
| $\mu_2$ | {1, 1, 0, 1, 1, 1, 1, 0, 1, 1, 0, 0, 0, 1, 1, 1, 1, 0, 0, 1, 0, 0, 0, 0} |
| $\mu_3$ | {1, 0, 0, 1, 0, 0, 1, 0, 0, 1, 1, 0, 1, 1, 1, 1, 0, 0, 0, 1, 0, 0, 1, 0} |
| $\mu_4$ | {1, 1, 1, 1, 1, 1, 0, 0, 0, 1, 0, 0, 0, 0, 1, 1, 0, 1, 0, 1, 1, 0, 0, 0} |
| $\mu_5$ | {0, 1, 0, 1, 0, 0, 1, 1, 0, 0, 1, 0, 0, 0, 0, 0, 0, 1, 1, 1, 0, 1, 0, 0} |
| $\mu_6$ | {0, 1, 0, 0, 0, 1, 1, 0, 1, 0, 1, 1, 1, 0, 1, 0, 1, 0, 1, 1, 0, 1, 1, 0} |
| $\mu_7$ | {1, 0, 0, 1, 0, 1, 0, 0, 1, 1, 0, 0, 1, 0, 0, 0, 1, 1, 1, 0, 0, 0, 0, 0} |
| $\mu_8$ | {0, 1, 0, 1, 0, 1, 0, 0, 1, 0, 0, 1, 0, 0, 0, 1, 1, 0, 0, 0, 1, 1, 1, 0} |
| $\mu_9$ | {1, 0, 0, 1, 1, 0, 1, 0, 1, 1, 0, 1, 0, 1, 1, 0, 0, 0, 0, 0, 1, 1, 0, 0} |
| $\mu_{10}$ | {0, 1, 0, 0, 0, 1, 1, 1, 1, 0, 1, 1, 1, 0, 0, 0, 0, 0, 0, 0, 0, 0, 1, 1, 0, 0, 0} |
| $\mu_{11}$ | {0, 1, 0, 0, 0, 0, 0, 0, 1, 1, 0, 1, 1, 0, 1, 1, 0, 1, 1, 1, 1, 0, 0, 1, 0} |
| $\mu_{12}$ | {1, 0, 0, 0, 0, 0, 0, 1, 1, 0, 1, 0, 1, 1, 0, 1, 1, 1, 0, 1, 0, 1, 0, 0, 1, 1, 1, 0, 0} |
| $\mu_{13}$ | {0, 0, 1, 1, 0, 0, 1, 0, 1, 1, 1, 0, 0, 1, 0, 1, 0, 0, 1, 0, 0, 1, 0, 0} |
| $\mu_{14}$ | {0, 1, 1, 0, 0, 0, 0, 1, 0, 1, 0, 1, 1, 1, 0, 0, 1, 0, 0, 0, 1, 0, 0, 0} |
| $\mu_{15}$ | {1, 1, 1, 0, 0, 1, 0, 1, 1, 1, 0, 0, 0, 0, 1, 1, 1, 1, 0, 1, 1, 1, 1, 0} |
| $\mu_{16}$ | {1, 1, 0, 0, 1, 0, 1, 0, 0, 0, 1, 1, 0, 1, 0, 0, 1, 1, 1, 1, 1, 1, 0, 0, 0} |
| $\mu_{17}$ | {1, 1, 1, 0, 0, 0, 1, 0, 0, 0, 1, 1, 0, 1, 1, 0, 1, 0, 0, 0, 1, 0, 0, 0} |
| $\mu_{18}$ | {1, 0, 1, 0, 0, 1, 1, 1, 0, 1, 1, 0, 1, 1, 0, 0, 0, 0, 1, 1, 1, 1, 1, 0} |
| $\mu_{19}$ | {0, 0, 1, 1, 1, 1, 0, 1, 1, 1, 1, 0, 0, 1, 1, 1, 0, 0, 0, 1, 1, 0, 0, 0} |
| $\mu_{20}$ | {0, 0, 1, 0, 0, 1, 1, 1, 0, 1, 1, 0, 0, 0, 0, 1, 1, 0, 0, 1, 0, 0, 0} |
| $\mu_{21}$ | {1, 0, 1, 1, 1, 0, 0, 0, 1, 1, 1, 1, 1, 0, 1, 1, 1, 0, 1, 1, 0, 1, 0, 0} |
| $\mu_{22}$ | {1, 0, 0, 0, 1, 0, 0, 1, 1, 0, 1, 0, 1, 1, 0, 0, 0, 1, 1, 0, 1, 0} |
| $\mu_{23}$ | {1, 0, 1, 0, 1, 1, 0, 0, 1, 0, 1, 1, 0, 0, 0, 1, 1, 1, 0, 0, 0, 1, 1, 0} |
| $\mu_{24}$ | {0, 1, 1, 1, 1, 1, 1, 0, 1, 0, 1, 1, 1, 1, 1, 0, 1, 1, 0, 0, 0, 0, 0} |
| $\mu_{25}$ | {0, 1, 0, 0, 1, 0, 1, 0, 0, 0, 1, 1, 0, 1, 1, 0, 0, 1, 0, 0, 0, 0, 1, 0} |
| $\mu_{26}$ | {0, 0, 1, 0, 0, 0, 1, 1, 1, 0, 0, 0, 1, 1, 0, 1, 1, 1, 1, 1, 1, 1, 1, 0} |
| $\mu_{27}$ | {0, 1, 1, 1, 0, 0, 0, 1, 1, 1, 0, 1, 1, 1, 0, 0, 0, 1, 0, 0, 0, 0, 0, 0} |
| $\mu_{28}$ | {0, 1, 0, 0, 1, 1, 0, 0, 1, 0, 1, 0, 1, 0, 1, 1, 1, 0, 0, 0, 1, 0, 1, 0} |
| $\mu_{29}$ | {1, 0, 0, 0, 0, 0, 1, 0, 0, 0, 0, 1, 0, 0, 1, 1, 1, 0, 0, 1, 1, 1, 1, 0, 0} |

In some embodiments, in either one of the above Table 6 and Table 7-1, L (where L is an integer and 1≤L<30) CG sequences may be included in the predetermined sequence table for DMRS with length 24, and $\mu_s$ may represent an index of a sequence within the predetermined sequence table, where s is an integer and 0≤s≤29. In either one of the above Table 6 and Table 7-1, $\mu_s \in [0, 29]$. In some embodiments, in either one of the above Table 6 and Table 7-1, for each index $\mu_s$, either one of the two sequences can be included in the predetermined sequence table for DMRS with length 24. In some embodiments, if there are more than one sequences from either one of the above Table 6 and Table 7-1 that are included in the predetermined sequence table for DMRS with length 24, the indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2.

In some embodiments, in the above Table 7-1, all of the 30 CG sequences may be included in the predetermined sequence table for DMRS with length 24, and $\mu_s$ may represent an index of a sequence within the predetermined sequence table, where s is an integer and 0≤s≤29. In the above Table 7-1, for example, $\mu_s \in [0, 29]$. For each index $\mu_s$, either one of the two sequences can be included in the predetermined sequence table for DMRS with length 24. The indices $\mu_{s1}$ and $\mu_{s2}$ of any two of the sequences which are included in the predetermined sequence table may be different, where s1 is an integer and 0≤s1≤29, s2 is an integer and 0≤s2≤29, and s1≠s2. That is, all the values of $\mu_s$ may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

Alternatively, in some embodiments, if the predetermined sequence length is 24, the determined plurality of CG sequences may include L (where L is an integer and 1≤L≤30) CG sequences in Table 7-2:

TABLE 7-2

Length-24 CG sequences for π/2-BPSK

| Index | CG Sequence {b(0), . . . , b(11)} |
|---|---|
| $\mu_0$ | {0, 1, 1, 0, 0, 0, 1, 0, 0, 1, 0, 0, 1, 1, 1, 0, 1, 1, 0, 0, 0, 0, 0} or {1, 0, 0, 1, 1, 1, 0, 1, 1, 0, 1, 1, 0, 0, 0, 1, 0, 0, 1, 1, 1, 1, 1} |
| $\mu_1$ | {1, 1, 0, 1, 1, 1, 0, 1, 1, 0, 0, 0, 1, 1, 1, 1, 0, 0, 1, 0, 0, 0, 0, 0} or {0, 0, 1, 0, 0, 0, 1, 0, 0, 1, 1, 1, 0, 0, 0, 0, 1, 1, 0, 1, 1, 1, 1, 1} |
| $\mu_2$ | {0, 0, 1, 1, 0, 1, 1, 0, 1, 1, 1, 1, 0, 0, 1, 0, 1, 1, 0, 0, 0, 0, 0} or {1, 1, 0, 0, 1, 0, 0, 1, 0, 0, 0, 0, 1, 1, 1, 0, 1, 0, 0, 1, 1, 1, 1, 1} |
| $\mu_3$ | {1, 0, 0, 1, 0, 1, 0, 0, 1, 1, 0, 0, 1, 0, 0, 0, 1, 1, 1, 0, 0, 0, 0, 0} or {0, 1, 1, 0, 1, 0, 1, 1, 0, 0, 1, 1, 0, 1, 1, 1, 0, 0, 0, 1, 1, 1, 1, 1} |
| $\mu_4$ | {0, 0, 1, 1, 1, 0, 0, 1, 0, 1, 0, 1, 1, 0, 0, 0, 1, 1, 0, 0, 0, 0, 0} or {1, 1, 0, 0, 0, 1, 1, 0, 1, 0, 1, 0, 0, 1, 1, 1, 0, 0, 0, 1, 1, 1, 1, 1} |
| $\mu_5$ | {1, 1, 1, 1, 1, 0, 1, 1, 0, 0, 0, 1, 0, 1, 1, 1, 1, 0, 1, 0, 0, 0, 0, 0} or {0, 0, 0, 0, 0, 1, 0, 0, 1, 1, 1, 0, 1, 0, 0, 0, 0, 1, 1, 0, 1, 1, 1, 1} |
| $\mu_6$ | {1, 1, 0, 0, 0, 1, 1, 1, 1, 1, 0, 1, 1, 1, 1, 0, 0, 1, 1, 0, 0, 0, 0} or {0, 0, 1, 1, 1, 0, 0, 0, 0, 0, 1, 0, 0, 0, 0, 1, 1, 0, 0, 0, 1, 1, 1, 1} |
| $\mu_7$ | {0, 1, 1, 1, 0, 0, 1, 1, 1, 0, 1, 1, 1, 0, 0, 1, 0, 0, 0, 0, 1, 0, 0, 0} or {1, 0, 0, 0, 1, 1, 0, 0, 0, 1, 0, 0, 0, 1, 1, 0, 1, 1, 1, 1, 0, 1, 1, 1} |
| $\mu_8$ | {1, 1, 0, 1, 0, 1, 1, 0, 1, 0, 0, 1, 0, 0, 1, 0, 1, 0, 0, 0, 1, 0, 0, 0} or {0, 0, 1, 0, 1, 0, 0, 1, 0, 1, 1, 0, 1, 1, 0, 1, 0, 1, 1, 1, 0, 1, 1, 1} |
| $\mu_9$ | {1, 1, 1, 0, 0, 0, 1, 0, 0, 0, 1, 1, 0, 1, 1, 0, 1, 0, 0, 0, 1, 0, 0, 0} or {0, 0, 0, 1, 1, 1, 0, 1, 1, 1, 0, 0, 1, 0, 0, 1, 0, 1, 1, 1, 0, 1, 1, 1} |
| $\mu_{10}$ | {0, 0, 1, 0, 0, 0, 1, 1, 1, 0, 1, 1, 0, 0, 0, 0, 1, 1, 0, 0, 1, 0, 0, 0} or {1, 1, 0, 1, 1, 1, 0, 0, 0, 1, 0, 0, 1, 1, 1, 1, 0, 0, 1, 1, 0, 1, 1, 1} |
| $\mu_{11}$ | {1, 1, 1, 0, 0, 0, 1, 0, 0, 0, 1, 1, 0, 1, 1, 0, 0, 1, 0, 1, 0, 0, 0, 0} or {0, 0, 0, 1, 1, 0, 1, 1, 0, 1, 1, 1, 0, 0, 1, 0, 0, 0, 1, 0, 1, 1, 1, 1} |
| $\mu_{12}$ | {0, 0, 1, 1, 1, 0, 0, 1, 0, 0, 0, 1, 1, 0, 1, 0, 1, 0, 1, 0, 0, 0, 0, 0} or {1, 1, 0, 0, 0, 1, 1, 0, 1, 1, 1, 0, 0, 1, 0, 1, 0, 1, 0, 1, 1, 1, 1, 1} |
| $\mu_{13}$ | {0, 1, 0, 0, 1, 1, 1, 0, 1, 1, 0, 0, 0, 0, 0, 0, 0, 0, 1, 1, 0, 0, 0, 0} or {1, 0, 1, 1, 0, 0, 0, 1, 0, 0, 1, 1, 1, 1, 1, 1, 1, 1, 0, 0, 1, 1, 1, 1} |

TABLE 7-2-continued

Length-24 CG sequences for π/2-BPSK

| Index | CG Sequence {b(0), . . . , b(11)} |
|---|---|
| $\mu_{14}$ | {0, 0, 1, 1, 1, 1, 0, 1, 1, 1, 1, 0, 0, 1, 1, 1, 0, 0, 0, 1, 1, 0, 0, 0} or {1, 1, 0, 0, 0, 0, 1, 0, 0, 0, 0, 1, 1, 0, 0, 0, 1, 1, 1, 0, 0, 1, 1, 1} |
| $\mu_{15}$ | {1, 1, 1, 1, 1, 0, 0, 0, 1, 0, 0, 1, 0, 0, 1, 1, 0, 1, 0, 1, 1, 0, 0, 0} or {0, 0, 0, 0, 0, 1, 1, 1, 0, 1, 1, 0, 1, 1, 0, 0, 1, 0, 1, 0, 0, 1, 1, 1} |
| $\mu_{16}$ | {0, 0, 0, 0, 1, 1, 1, 0, 1, 1, 0, 1, 0, 0, 1, 1, 1, 0, 1, 1, 0, 0, 0, 0} or {1, 1, 1, 1, 0, 0, 0, 1, 0, 0, 1, 0, 1, 1, 0, 0, 0, 1, 0, 0, 1, 1, 1, 1} |
| $\mu_{17}$ | {1, 0, 0, 0, 1, 1, 0, 1, 0, 1, 0, 0, 1, 0, 0, 1, 1, 1, 1, 1, 0, 0, 0, 0} or {0, 1, 1, 1, 0, 0, 1, 0, 1, 0, 1, 1, 0, 1, 1, 0, 0, 0, 0, 0, 1, 1, 1, 1} |
| $\mu_{18}$ | {1, 1, 0, 0, 1, 0, 1, 0, 0, 1, 1, 0, 1, 0, 0, 1, 1, 1, 1, 1, 0, 0, 0, 0} or {0, 0, 1, 1, 0, 1, 0, 1, 1, 0, 0, 1, 0, 1, 1, 0, 0, 0, 0, 0, 1, 1, 1, 1} |
| $\mu_{19}$ | {1, 1, 1, 0, 1, 0, 0, 0, 1, 1, 1, 1, 0, 1, 1, 0, 0, 0, 0, 0, 1, 0, 0, 0} or {0, 0, 0, 1, 0, 1, 1, 1, 0, 0, 0, 0, 1, 0, 0, 1, 1, 1, 1, 1, 0, 1, 1, 1} |
| $\mu_{20}$ | {0, 1, 1, 1, 1, 1, 1, 0, 1, 1, 1, 1, 1, 1, 0, 1, 1, 0, 0, 0, 0, 1, 0, 0} or {1, 0, 0, 0, 0, 0, 0, 1, 0, 0, 0, 0, 0, 0, 1, 0, 0, 1, 1, 1, 1, 0, 1, 1} |
| $\mu_{21}$ | {0, 0, 1, 1, 0, 0, 1, 0, 1, 1, 1, 0, 0, 1, 0, 1, 0, 0, 1, 0, 0, 1, 0, 0} or {1, 1, 0, 0, 1, 1, 0, 1, 0, 0, 0, 1, 1, 0, 1, 0, 1, 1, 0, 1, 1, 0, 1, 1} |
| $\mu_{22}$ | {1, 1, 1, 1, 1, 1, 0, 0, 0, 1, 0, 0, 0, 0, 1, 1, 1, 1, 1, 0, 0, 1, 0, 0} or {0, 0, 0, 0, 0, 0, 1, 1, 1, 0, 1, 1, 1, 1, 0, 0, 0, 0, 0, 1, 1, 0, 1, 1} |
| $\mu_{23}$ | {1, 0, 1, 0, 1, 1, 0, 0, 0, 1, 0, 0, 0, 1, 1, 1, 1, 1, 0, 0, 1, 0, 0, 0} or {0, 1, 0, 1, 0, 0, 1, 1, 1, 0, 1, 1, 1, 0, 0, 0, 0, 0, 1, 1, 0, 1, 1, 1} |
| $\mu_{24}$ | {0, 1, 0, 0, 1, 1, 0, 1, 1, 0, 0, 0, 0, 1, 1, 1, 1, 1, 0, 0, 1, 0, 0, 0} or {1, 0, 1, 1, 0, 0, 1, 0, 0, 1, 1, 1, 1, 0, 0, 0, 0, 0, 1, 1, 0, 1, 1, 1} |
| $\mu_{25}$ | {0, 1, 1, 0, 0, 0, 0, 0, 1, 1, 0, 1, 1, 1, 0, 1, 0, 0, 1, 0, 1, 0, 0, 0} or {1, 0, 0, 1, 1, 1, 1, 1, 0, 0, 1, 0, 0, 0, 1, 0, 1, 1, 0, 1, 0, 1, 1, 1} |
| $\mu_{26}$ | {1, 0, 0, 1, 1, 1, 0, 1, 1, 1, 1, 1, 0, 1, 0, 0, 1, 1, 0, 1, 1, 0, 0, 0} or {0, 1, 1, 0, 0, 0, 1, 0, 0, 0, 0, 0, 1, 0, 1, 1, 0, 1, 0, 1, 0, 1, 1, 1} |
| $\mu_{27}$ | {1, 0, 1, 1, 1, 0, 0, 0, 1, 1, 1, 1, 1, 0, 1, 1, 0, 1, 1, 1, 0, 0, 0, 0} or {0, 1, 0, 0, 0, 1, 1, 1, 0, 0, 0, 0, 0, 1, 0, 0, 0, 1, 0, 0, 1, 1, 1, 1} |
| $\mu_{28}$ | {0, 1, 0, 1, 0, 0, 1, 1, 0, 0, 1, 0, 0, 0, 0, 0, 1, 1, 1, 0, 1, 0, 0, 0} or {1, 0, 1, 0, 1, 1, 0, 0, 1, 1, 0, 1, 1, 1, 1, 1, 0, 0, 0, 1, 0, 1, 1, 1} |
| $\mu_{29}$ | {1, 0, 0, 1, 1, 0, 1, 0, 1, 1, 0, 1, 0, 1, 1, 0, 0, 0, 0, 0, 1, 1, 0, 0} or {0, 1, 1, 0, 0, 1, 0, 1, 0, 0, 1, 0, 1, 0, 0, 1, 1, 1, 1, 1, 0, 0, 1, 1} |
| $\mu_{30}$ | {0, 0, 0, 1, 1, 1, 1, 1, 0, 1, 1, 1, 0, 0, 1, 1, 0, 0, 0, 1, 1, 0, 0, 0} or {1, 1, 1, 0, 0, 0, 0, 0, 1, 0, 0, 0, 1, 1, 0, 0, 1, 1, 1, 0, 0, 1, 1, 1} |
| $\mu_{31}$ | {1, 1, 0, 0, 0, 0, 0, 1, 1, 0, 1, 1, 0, 1, 0, 0, 1, 0, 1, 1, 1, 0, 0, 0} or {0, 0, 1, 1, 1, 1, 1, 0, 0, 1, 0, 0, 1, 0, 1, 1, 0, 1, 0, 0, 0, 1, 1, 1} |
| $\mu_{32}$ | {1, 0, 0, 1, 0, 0, 1, 0, 0, 1, 1, 0, 1, 0, 0, 0, 0, 1, 1, 1, 0, 0} or {0, 1, 1, 0, 1, 1, 0, 1, 1, 0, 0, 1, 0, |

TABLE 7-2-continued

Length-24 CG sequences for $\pi/2$-BPSK

| Index | CG Sequence $\{b(0), \ldots, b(11)\}$ |
|---|---|
| $\mu_{33}$ | {0, 1, 1, 0, 1, 0, 1, 1, 0, 1, 1, 0, 0, 1, 1, 0, 1, 0, 1, 1, 1, 0, 0} or {1, 0, 0, 1, 0, 1, 0, 0, 1, 0, 0, 1, 1, 1, 0, 0, 1, 0, 1, 0, 0, 0, 1, 1} |
| $\mu_{34}$ | {1, 0, 0, 0, 0, 0, 1, 1, 0, 1, 0, 1, 1, 0, 1, 1, 0, 1, 0, 1, 1, 1, 0, 0} or {0, 1, 1, 1, 1, 1, 0, 0, 1, 0, 1, 0, 0, 1, 0, 0, 1, 0, 1, 0, 0, 0, 1, 1} |
| $\mu_{35}$ | {1, 0, 0, 0, 0, 1, 0, 0, 0, 0, 1, 0, 0, 1, 1, 1, 0, 0, 1, 1, 1, 1, 1, 0, 0} or {0, 1, 1, 1, 1, 0, 1, 1, 1, 1, 1, 0, 1, 1, 0, 0, 0, 1, 1, 0, 0, 0, 0, 1, 1} |
| $\mu_{36}$ | {0, 1, 1, 1, 1, 1, 0, 0, 1, 0, 0, 1, 1, 0, 0, 1, 0, 1, 1, 1, 1, 1, 0, 0} or {1, 0, 0, 0, 0, 0, 1, 1, 0, 1, 1, 0, 0, 1, 1, 0, 1, 0, 0, 0, 0, 0, 1, 1} |
| $\mu_{37}$ | {0, 0, 1, 0, 0, 0, 1, 1, 1, 0, 0, 0, 1, 1, 0, 1, 1, 1, 1, 1, 1, 1, 0, 0} or {1, 1, 0, 1, 1, 1, 0, 0, 0, 1, 1, 1, 0, 0, 1, 0, 0, 0, 0, 0, 0, 0, 1, 1} |
| $\mu_{38}$ | {0, 1, 0, 0, 1, 0, 1, 0, 0, 1, 0, 1, 1, 0, 1, 1, 0, 0, 1, 0, 0, 0, 1, 0} or {1, 0, 1, 1, 0, 1, 0, 1, 1, 0, 1, 0, 0, 1, 0, 0, 1, 1, 0, 1, 1, 1, 0, 1} |
| $\mu_{39}$ | {1, 0, 0, 0, 0, 1, 1, 1, 1, 1, 1, 0, 0, 0, 1, 0, 0, 1, 0, 0, 0, 1, 0, 0, 0, 1, 0} or {0, 1, 1, 1, 1, 0, 0, 0, 0, 0, 0, 0, 1, 1, 1, 0, 1, 1, 0, 1, 1, 1, 1, 0, 1} |
| $\mu_{40}$ | {1, 0, 0, 1, 0, 0, 1, 0, 0, 1, 1, 0, 1, 1, 1, 1, 0, 0, 0, 1, 0, 0, 0, 1, 0} or {0, 1, 1, 0, 1, 1, 0, 1, 1, 0, 0, 1, 0, 0, 0, 0, 0, 1, 1, 1, 1, 0, 1, 1, 0, 1} |
| $\mu_{41}$ | {0, 0, 1, 1, 1, 1, 1, 1, 0, 0, 0, 0, 1, 1, 0, 1, 1, 0, 0, 1, 0, 0, 0, 1, 0} or {1, 1, 0, 0, 0, 0, 0, 0, 1, 1, 1, 1, 0, 0, 1, 0, 0, 1, 1, 0, 1, 1, 1, 0, 1} |
| $\mu_{42}$ | {0, 1, 1, 1, 1, 0, 1, 0, 1, 0, 1, 0, 1, 0, 0, 0, 0, 1, 1, 0, 0, 1, 0} or {1, 0, 0, 0, 0, 1, 0, 1, 0, 1, 0, 0, 1, 0, 1, 1, 1, 1, 1, 0, 0, 1, 1, 0, 1} |
| $\mu_{43}$ | {0, 1, 0, 1, 0, 0, 0, 1, 1, 1, 1, 1, 1, 0, 0, 1, 1, 0, 1, 1, 0, 0, 1, 0} or {1, 0, 1, 0, 1, 1, 1, 0, 0, 0, 0, 0, 0, 1, 1, 0, 1, 0, 0, 1, 0, 0, 1, 0, 1} |
| $\mu_{44}$ | {0, 1, 0, 0, 0, 0, 0, 1, 1, 0, 1, 1, 0, 1, 1, 0, 1, 1, 1, 1, 1, 0, 0, 1, 0} or {1, 0, 1, 1, 1, 1, 1, 0, 0, 1, 0, 0, 1, 0, 0, 0, 0, 0, 0, 1, 1, 0, 1} |
| $\mu_{45}$ | {1, 1, 0, 0, 0, 1, 0, 0, 1, 0, 1, 0, 0, 1, 0, 0, 0, 1, 1, 0, 0, 1, 0, 1, 0} or {0, 0, 1, 1, 0, 1, 1, 0, 1, 0, 1, 0, 1, 1, 0, 1, 1, 0, 0, 1, 0, 1, 0, 1} |
| $\mu_{46}$ | {1, 0, 1, 1, 0, 0, 0, 1, 1, 0, 1, 0, 1, 1, 0, 1, 1, 1, 0, 0, 1, 0, 1, 0} or {0, 1, 0, 0, 1, 1, 1, 0, 0, 1, 0, 1, 0, 0, 0, 1, 0, 0, 1, 0, 1, 0, 1} |
| $\mu_{47}$ | {1, 0, 0, 0, 0, 1, 0, 0, 1, 1, 1, 0, 1, 0, 1, 0, 0, 0, 0, 0, 1, 1, 0, 1, 0} or {0, 1, 1, 1, 1, 0, 1, 1, 1, 0, 0, 0, 1, 0, 1, 0, 0, 1, 1, 1, 1, 1, 0, 0, 1, 0, 1} |
| $\mu_{48}$ | {0, 0, 1, 1, 0, 1, 0, 0, 0, 0, 1, 1, 1, 1, 0, 1, 0, 0, 0, 0, 1, 1, 0, 1, 0} or {1, 1, 0, 0, 1, 0, 1, 1, 1, 1, 0, 0, 0, 0, 1, 1, 1, 1, 0, 0, 1, 0, 1} |
| $\mu_{49}$ | {1, 1, 0, 1, 1, 0, 1, 0, 0, 1, 1, 1, 0, 1, 0, 0, 0, 1, 1, 1, 0, 0, 0, 1, 1, 0} or {0, 1, 0, 1, 0, 0, 1, 1, 0, 1, 0, 0, 0, 1, 1, 1, 0, 0, 0, 1, 1} |
| $\mu_{50}$ | {1, 1, 0, 0, 1, 1, 0, 0, 0, 0, 0, 1, 1, 0, 1, 1, 1, 1, 0, 0, 0, 0, 1, 1, 0} or {0, 1, 1, 1, 0, 0, 1, 1, 1, 1, 1, 0, 0, 0, 1, 1, 1, 1, 0, 0, 0, 1, 1, 0, 0, 1} |
| $\mu_{51}$ | {1, 1, 0, 1, 0, 1, 1, 1, 0, 0, 1, 0, 1, 0, 1, 1, 1, 1, 0, 1, 0, 0, 1, 1, 0} or {0, 0, 1, 0, 1, 0, 0, 0, 1, 1, 0, 1, 0, 1, 0, 0, 0, 1, 1, 0, 0, 1} |
| $\mu_{52}$ | {0, 1, 0, 0, 0, 1, 1, 0, 0, 1, 0, 1, 0, 1, 1, 0, 0, 1, 0, 1, 1, 0, 0, 1} or {1, 0, 1, 1, 0, 0, 1, 1, 0, 1, 0, 1, 0, 1, 0, 0, 1, 1, 1, 0, 1, 0, 0, 1} |
| $\mu_{53}$ | {0, 1, 0, 0, 0, 1, 1, 0, 1, 0, 1, 1, 1, 0, 0, 0, 1, 1, 0, 1, 0, 1, 1, 0} or {1, 0, 1, 1, 1, 0, 0, 1, 0, 1, 0, 0, 0, 0, 1, 1, 1, 0, 0, 1, 0, 1, 0, 0, 1} |
| $\mu_{54}$ | {1, 1, 1, 0, 0, 1, 1, 1, 0, 0, 0, 0, 1, 1, 0, 1, 1, 1, 1, 0, 1, 1, 1, 0} or {0, 0, 0, 1, 1, 0, 0, 0, 1, 1, 1, 1, 0, 1, 0, 0, 0, 0, 1, 0, 1, 0, 0, 1} |
| $\mu_{55}$ | {0, 0, 1, 0, 0, 1, 0, 0, 1, 0, 0, 0, 0, 0, 1, 1, 0, 1, 1, 0, 1, 1, 1, 0} or {1, 1, 0, 1, 1, 0, 1, 1, 0, 1, 1, 1, 1, 1, 0, 0, 1, 0, 0, 0, 1, 0, 0, 1} |
| $\mu_{56}$ | {1, 0, 1, 1, 0, 0, 1, 1, 0, 1, 1, 0, 0, 0, 0, 0, 1, 1, 1, 0, 1, 1, 1, 0} or {0, 1, 0, 0, 1, 1, 0, 0, 1, 0, 1, 0, 1, 1, 1, 0, 0, 0, 0, 0, 1, 0, 0, 1} |
| $\mu_{57}$ | {0, 0, 1, 0, 0, 1, 1, 1, 0, 0, 0, 1, 1, 0, 1, 0, 1, 0, 0, 0, 1, 1, 1, 0} or {1, 1, 0, 1, 1, 0, 0, 0, 1, 1, 1, 0, 0, 1, 0, 1, 0, 1, 1, 1, 1, 0, 0, 0, 1} |
| $\mu_{58}$ | {0, 1, 0, 1, 0, 1, 0, 0, 1, 0, 0, 1, 0, 0, 1, 1, 0, 0, 0, 1, 1, 1, 1, 0} or {1, 0, 1, 0, 1, 0, 1, 1, 0, 1, 1, 0, 1, 1, 0, 0, 1, 1, 1, 0, 0, 0, 0, 1} |
| $\mu_{59}$ | {0, 1, 0, 1, 1, 0, 1, 0, 1, 1, 0, 0, 1, 1, 0, 1, 0, 1, 0, 0, 0, 1, 1, 1, 0} or {1, 0, 1, 0, 0, 1, 0, 1, 0, 0, 1, 1, 0, 1, 0, 1, 1, 0, 0, 0, 1} |
| $\mu_{60}$ | {0, 1, 0, 0, 0, 1, 0, 0, 0, 1, 0, 1, 0, 0, 1, 1, 0, 0, 1, 0, 1, 1, 1, 0} or {1, 0, 1, 1, 1, 0, 1, 1, 1, 0, 1, 0, 1, 1, 0, 0, 1, 1, 0, 1, 0, 0, 0, 1} |
| $\mu_{61}$ | {0, 1, 0, 0, 0, 1, 1, 0, 1, 0, 1, 1, 1, 1, 0, 1, 0, 1, 1, 1, 0, 1, 1, 1, 0} or {1, 0, 1, 1, 0, 0, 1, 1, 0, 1, 0, 0, 0, 0, 1, 1, 0, 1, 0, 0, 0, 0, 1} |
| $\mu_{62}$ | {1, 1, 1, 0, 0, 1, 0, 1, 1, 1, 0, 0, 0, 0, 1, 1, 1, 1, 0, 1, 1, 1, 1, 0} or {0, 0, 0, 1, 1, 0, 1, 0, 0, 0, 1, 1, 1, 1, 0, 0, 0, 0, 0, 0, 1} |
| $\mu_{63}$ | {1, 0, 1, 0, 0, 1, 1, 1, 0, 1, 1, 1, 0, 1, 1, 0, 0, 0, 0, 1, 1, 1, 1, 1, 0} or {0, 1, 0, 1, 1, 0, 0, 1, 0, 0, 0, 1, 0, 0, 0, 1, 1, 1, 0, 0, 0, 0, 0, 1} |

In some embodiments, any sequence from Table 7-2 may be mapped to complex-valued modulation symbols d(i) according the above equation (1-1).

In some embodiments, in the above Table 7-2, L (where L is an integer and $1 \leq L \leq 30$) CG sequences may be included in the predetermined sequence table for DMRS with length 24, and $\mu_s$ may represent an index of a sequence which is included in the predetermined sequence table, where s is an integer and $0 \leq s \leq 63$. In some embodiments, in the above Table 7-2, for each index $\mu_s$, either one of the two sequences can be included in the predetermined sequence table for DMRS with length 24. For example, $\mu_s \in [0, 29]$. In some embodiments, if there are more than one sequences included in the predetermined sequence table for DMRS with length 24, the indices $\mu_{s1}$ and $\mu_{s2}$ of any two of the sequences which are included in the predetermined sequence table may be different, where s1 is an integer and $0 \leq s1 \leq 63$, s2 is an integer and $0 \leq s2 \leq 63$, and $s1 \neq s2$.

In some embodiments, in the above Table 7-2, 30 CG sequences each with an index $\mu_s$ (where s is an integer and $0 \le s \le 63$) may be included in the predetermined sequence table for DMRS with length 24. For example, $\mu_s \in [0, 29]$. For each index $\mu_s$, either one of the two sequences can be included in the predetermined sequence table for DMRS with length 24. The indices $\mu_{s1}$ and $\mu_{s2}$ of any two of the sequences which are included in the predetermined sequence table may be different, where s1 is an integer and $0 \le s1 \le 63$, s2 is an integer and $0 \le s2 \le 63$, and s1≠s2. That is, all the values of $\mu_s$ for the 30 sequences that are included in the predetermined sequence table may be included in a set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29}.

In some embodiments, in the above Table 7-2, L (where L is an integer and $1 \le L \le 4$) CG sequences each with an index $\mu_s$ (where $s \in \{17, 23, 24, 45\}$) may be included in the predetermined sequence table for DMRS with length 24. For example, $\mu_s \in [0, 29]$. For two sequences with a same index $\mu_s$ in the above Table 7-2, either one of the two sequences can be included in the predetermined sequence table for DMRS with length 24. In some embodiments, if there are more than one sequences each with an index $\mu_s$ (where $s \in \{17, 23, 24, 45\}$) from the above Table 7-2 that are included in the predetermined sequence table for DMRS with length 24, the indices $\mu_{s1}$ and $\mu_{s2}$ of any two of the sequences which are included in the predetermined sequence table may be different, where s1∈{17, 23, 24, 45} and s2 ∈{17, 23, 24, 45}.

Figure 5:
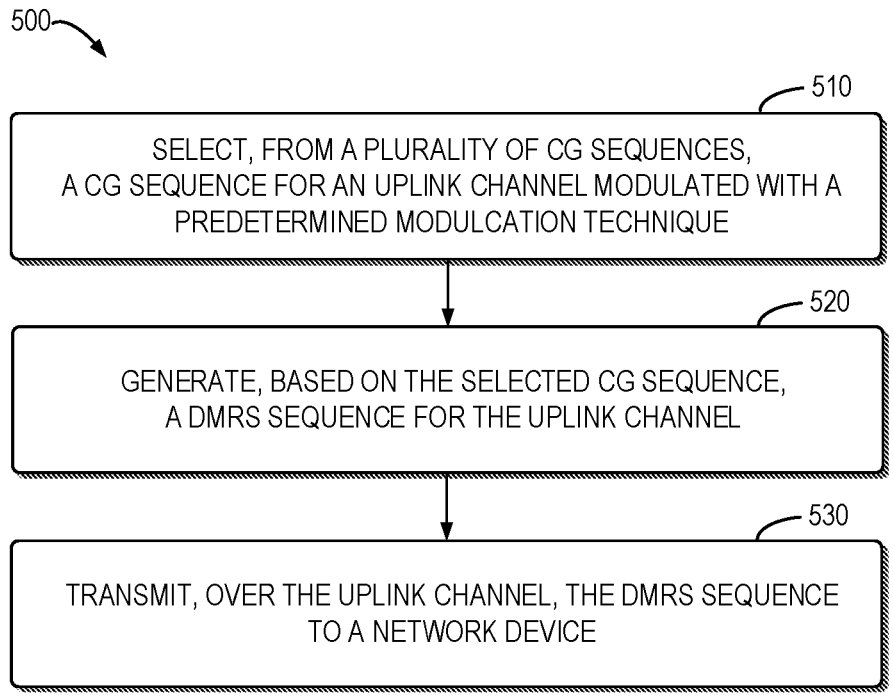
FIG. 5 illustrates a flowchart of an example method for DMRS transmission according to some embodiments of the present disclosure.

FIG. 5 illustrates a flowchart of an example method 500 for DMRS transmission according to some embodiments of the present disclosure. The method 500 can be implemented at the terminal device 120 as shown in FIG. 1. It is to be understood that the method 500 may include additional blocks not shown and/or may omit some blocks as shown, and the scope of the present disclosure is not limited in this regard.

At block 510, the terminal device 120 selects, from a plurality of CG sequences, a CG sequence for an uplink channel modulated with a predetermined modulation technique.

At block 520, the terminal device 120 generates, based on the selected CG sequence, a DMRS sequence for the uplink channel.

At block 530, the terminal device 120 transmits, over the uplink channel, the DMRS sequence to a network device.

In some embodiments, the uplink channel may be one of PUSCH and PUCCH. The predetermined modulation technique is π/2-BPSK.

In some embodiments, the terminal device 120 may determine the plurality of CG sequences based on at least one of the following: a predetermined length of a CG sequence, a PAPR of a CG sequence, autocorrelation of a CG sequence, and cross-correlation of two CG sequences.

In some embodiments, the terminal device 120 may determine the plurality of CG sequences by: determining, based on the predetermined length, a first set of CG sequences; selecting a second set of CG sequences from the first set of CG sequences, such that the PAPR of each of the second set of CG sequences is below a first threshold and the autocorrelation of each of the second set of CG sequences is below a second threshold; and selecting the plurality of CG sequences from the second set of CG sequences.

In some embodiments, the terminal device 120 may select the plurality of CG sequences from the second set of CG sequences by: dividing the second set of CG sequences into a first subset and a second subset; iteratively performing at least once the following: determining, from the first subset, a first pair of CG sequences associated with the highest cross-correlation among the first subset, determining whether a second pair of CG sequences associated with lower cross-correlation than the highest cross-correlation are present in the second subset, and in response to determining that the second pair of CG sequences are present in the second subset, replacing the first pair of CG sequences in the first subset with the second pair of CG sequences; and determining the plurality of CG sequences based on the first subset.

In some embodiments, the predetermined length is 6, and the plurality of CG sequences may include one or more of the CG sequences as shown in Table 1-1, Table 1-2 and/or Table 1-3.

In some embodiments, the predetermined length is 12, and the plurality of CG sequences may include one or more of the CG sequences as shown in Table 2.

In some embodiments, the predetermined length is 12, and the plurality of CG sequences may include one or more of the CG sequences as shown in Table 3-1 and/or Table 3-2.

In some embodiments, the predetermined length is 18, and the plurality of CG sequences may include one or more of the CG sequences as shown in Table 4.

In some embodiments, the predetermined length is 18, and the plurality of CG sequences may include one or more of the CG sequences as shown in Table 5-1 and/or Table 5-2.

In some embodiments, the predetermined length is 24, and the plurality of CG sequences may include one or more of the CG sequences as shown in Table 6.

In some embodiments, the predetermined length is 24, and the plurality of CG sequences may include one or more of the CG sequences as shown in Table 7-1 and/or Table 7-2.

Figure 6:
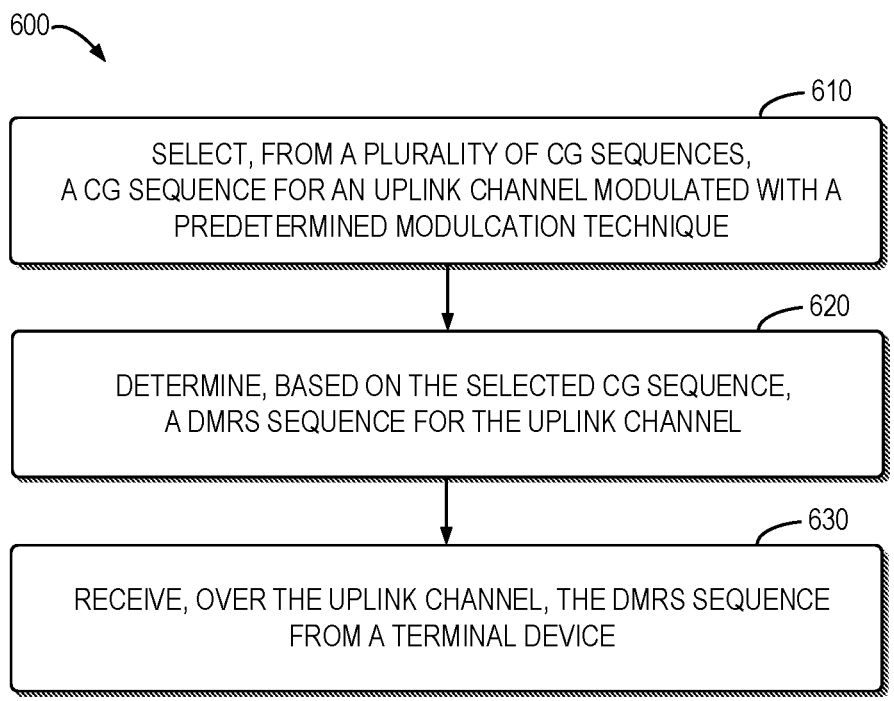
FIG. 6 illustrates a flowchart of an example method for DMRS transmission according to some embodiments of the present disclosure.

FIG. 6 illustrates a flowchart of an example method 600 for DMRS transmission according to some embodiments of the present disclosure. The method 600 can be implemented at the network device 110 as shown in FIG. 1. It is to be understood that the method 600 may include additional blocks not shown and/or may omit some blocks as shown, and the scope of the present disclosure is not limited in this regard.

At block 610, the network device 110 selects, from a plurality of CG sequences, a CG sequence for an uplink channel modulated with a predetermined modulation technique.

At block 620, the network device 110 determines, based on the selected CG sequence, a DMRS sequence for the uplink channel.

At block 630, the network device 110 receives, over the uplink channel, the DMRS sequence from a terminal device.

In some embodiments, the uplink channel may be one of PUSCH and PUCCH. The predetermined modulation technique is π/2-BPSK.

In some embodiments, the network device 110 may determine the plurality of CG sequences based on at least one of the following: a predetermined length of a CG sequence, a PAPR of a CG sequence, autocorrelation of a CG sequence, and cross-correlation of two CG sequences.

In some embodiments, the network device 110 may determine the plurality of CG sequences by: determining, based on the predetermined length, a first set of CG sequences; selecting a second set of CG sequences from the first set of CG sequences, such that the PAPR of each of the second set of CG sequences is below a first threshold and the autocorrelation of each of the second set of CG sequences is below a second threshold; and selecting the plurality of CG sequences from the second set of CG sequences.

In some embodiments, the network device 110 may select the plurality of CG sequences from the second set of CG sequences by: dividing the second set of CG sequences into a first subset and a second subset; iteratively performing at least once the following: determining, from the first subset, a first pair of CG sequences associated with the highest cross-correlation among the first subset, determining whether a second pair of CG sequences associated with lower cross-correlation than the highest cross-correlation are present in the second subset, and in response to determining that the second pair of CG sequences are present in the second subset, replacing the first pair of CG sequences in the first subset with the second pair of CG sequences; and determining the plurality of CG sequences based on the first subset.

In some embodiments, the predetermined length is 6, and the plurality of CG sequences may include one or more of the CG sequences as shown in Table 1-1, Table 1-2 and/or Table 1-3.

In some embodiments, the predetermined length is 12, and the plurality of CG sequences may include one or more of the CG sequences as shown in Table 2.

In some embodiments, the predetermined length is 12, and the plurality of CG sequences may include one or more of the CG sequences as shown in Table 3-1 and/or Table 3-2.

In some embodiments, the predetermined length is 18, and the plurality of CG sequences may include one or more of the CG sequences as shown in Table 4.

In some embodiments, the predetermined length is 18, and the plurality of CG sequences may include one or more of the CG sequences as shown in Table 5-1 and/or Table 5-2.

In some embodiments, the predetermined length is 24, and the plurality of CG sequences may include one or more of the CG sequences as shown in Table 6.

In some embodiments, the predetermined length is 24, and the plurality of CG sequences may include one or more of the CG sequences as shown in Table 7-1 and/or Table 7-2.

Figure 7:
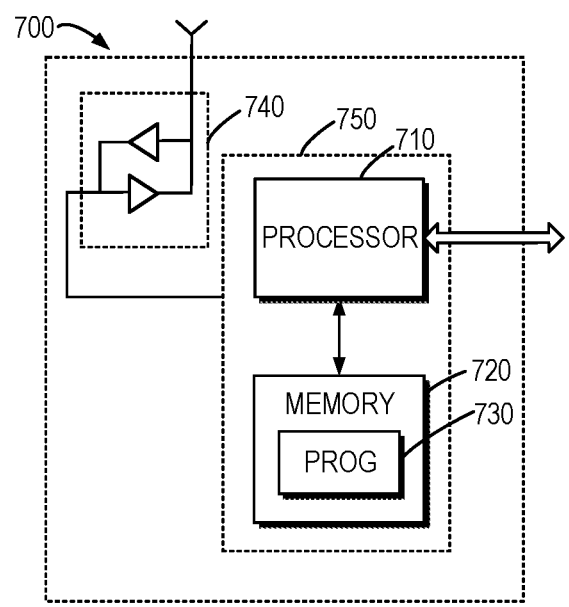
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the network device 110 or the terminal device 120 as shown in FIG. 1. Accordingly, the device 700 can be implemented at or as at least a part of the network device 110 or the terminal device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1 to 6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, the method comprising:
   generating, based on a first sequence, a Demodulation Reference Signal (DMRS) sequence for an uplink channel, wherein the first sequence is obtained as complex-valued modulation symbols resulting from a π/2-Binary Phase Shift Keying (BPSK) modulation applied to a binary sequence given by a table comprising a plurality of sequences; and
   transmitting, over the uplink channel, the DMRS sequence to a base station, wherein,
   in a case where a length of the first sequence is 12, the plurality of sequences include the following:
   {0, 1, 1, 1, 0, 0, 1, 1, 0, 1, 0, 0} and
   {0, 0, 1, 1, 1, 1, 1, 1, 1, 1, 0, 0},
   in a case where a length of the first sequence is 18, the plurality of first sequences include the following:
   {1, 1, 0, 1, 1, 0, 0, 0, 0, 0, 0, 0, 1, 1, 0, 1, 1, 0} and
   {1, 1, 0, 1, 0, 1, 0, 1, 1, 0, 0, 0, 0, 1, 0, 0, 1, 0}, and
   in a case where a length of the first sequence is 24, the plurality of first sequences include the following:
   {1, 0, 0, 0, 1, 1, 0, 1, 0, 1, 0, 0, 1, 0, 0, 1, 1, 1, 1, 1, 1, 0, 0, 0},
   {1, 0, 1, 0, 1, 1, 0, 0, 0, 1, 0, 0, 0, 0, 1, 1, 1, 1, 1, 1, 0, 0, 1, 0, 0}, and
   {0, 1, 0, 0, 1, 0, 1, 0, 1, 1, 0, 0, 0, 1, 1, 1, 1, 1, 1, 0, 0, 1, 0, 0}.

2. The method of claim 1, wherein, in the case where the length of the first sequence is 12, the plurality of first sequences further include at least one of the following:
   {0, 1, 1, 1, 0, 0, 0, 0, 0, 1, 0, 0}, and
   {0, 1, 1, 1, 1, 1, 0, 0, 1, 0, 0, 0}.

3. The method of claim 1, wherein in the case where the length of the first sequence is 18, the plurality of first sequences further include {0, 1, 1, 1, 1, 1, 1, 1, 0, 0, 1, 0, 1, 0, 0, 1, 0, 0}.

4. The method of claim 1, wherein each binary number of the binary sequence is expressed as b(i), and each of the complex-valued modulation symbols is defined as:

$$d(i) = \frac{e^{j\frac{\pi}{2}(i\bmod 2)}}{\sqrt{2}}[(i - 2b(i)) + j(1 - 2b(i))].$$

5. A method implemented at a base station, the method comprising:
   generating, based on a first sequence, a Demodulation Reference Signal (DMRS) sequence for an uplink channel, wherein the first sequence is obtained as complex-valued modulation symbols resulting from a π/2-Binary Phase Shift Keying (BPSK) modulation applied to a binary sequence given by a table comprising a plurality of sequences; and
   receiving, over the uplink channel, the DMRS sequence from a terminal device, wherein,
   in a case where a length of the first sequence is 12, the plurality of sequences include the following:
   {0, 1, 1, 1, 0, 0, 1, 1, 0, 1, 0, 0} and
   {0, 0, 1, 1, 1, 1, 1, 1, 1, 1, 0, 0},
   in a case where a length of the first sequence is 18, the plurality of sequences include the following:
   {1, 1, 0, 1, 1, 0, 0, 0, 0, 0, 0, 0, 1, 1, 0, 1, 1, 0} and
   {1, 1, 0, 1, 0, 1, 0, 1, 1, 0, 0, 0, 0, 1, 0, 0, 1, 0}, and
   in a case where a length of the first sequence is 24, the plurality of first sequences include the following:
   {1, 0, 0, 0, 1, 1, 0, 1, 0, 1, 0, 0, 1, 0, 0, 1, 1, 1, 1, 1, 1, 0, 0, 0},
   {1, 0, 1, 0, 1, 1, 0, 0, 0, 1, 0, 0, 0, 0, 1, 1, 1, 1, 1, 1, 0, 0, 1, 0, 0}, and
   {0, 1, 0, 0, 1, 0, 1, 0, 1, 1, 0, 0, 0, 1, 1, 1, 1, 1, 1, 0, 0, 1, 0, 0}.

6. The method of claim 5, wherein, in the case where the length of the first sequence is 12, the plurality of first sequences further include at least one of the following:
   {0, 1, 1, 1, 0, 0, 0, 0, 0, 1, 0, 0}, and
   {0, 1, 1, 1, 1, 1, 0, 0, 1, 0, 0, 0}.

7. The method of claim 5, wherein, in the case where the length of the first sequence is 18, the plurality of first sequences further include {0, 1, 1, 1, 1, 1, 1, 1, 0, 0, 1, 0, 1, 0, 0, 1, 0, 0}.

8. The method of claim 5, wherein each binary number of the binary sequence is expressed as b(i), and each of the complex-valued modulation symbols is defined as:

$$d(i) = \frac{e^{j\frac{\pi}{2}(i\bmod 2)}}{\sqrt{2}}[(i - 2b(i)) + j(1 - 2b(i))].$$

9. A terminal device comprising:
a controller configured to generate, based on a first sequence, a Demodulation Reference Signal (DMRS) sequence for an uplink channel, wherein the first sequence is obtained as complex-valued modulation symbols resulting from a π/2-Binary Phase Shift Keying (BPSK) modulation applied to a binary sequence given by a table comprising a plurality of sequences; and
a transmitter configured to transmit, over the uplink channel, the DMRS sequence to a base station, wherein,
in a case where a length of the first sequence is 12, the plurality of first sequences include the following:
{0, 1, 1, 1, 0, 0, 1, 1, 0, 1, 0, 0} and
{0, 0, 1, 1, 1, 1, 1, 1, 1, 1, 0, 0},
in a case where a length of the first sequence is 18, the plurality of first sequences include the following:
{1, 1, 0, 1, 1, 0, 0, 0, 0, 0, 0, 1, 1, 0, 1, 1, 0} and
{1, 1, 0, 1, 0, 1, 0, 1, 1, 0, 0, 0, 0, 1, 0, 0, 1, 0}, and
in a case where a length of the first sequence is 24, the plurality of first sequences include the following:
{1, 0, 0, 0, 1, 1, 0, 1, 0, 1, 0, 0, 1, 0, 0, 1, 1, 1, 1, 1, 1, 0, 0, 0},
{1, 0, 1, 0, 1, 1, 0, 0, 0, 1, 0, 0, 0, 1, 1, 1, 1, 1, 1, 0, 0, 1, 0, 0}, and
{0, 1, 0, 0, 1, 0, 1, 0, 1, 1, 0, 0, 0, 1, 1, 1, 1, 1, 1, 0, 0, 1, 0, 0}.

10. The method of claim 9, wherein,
in the case where the length of the first sequence is 12, the plurality of first sequences further include at least one of the following:
{0, 1, 1, 1, 0, 0, 0, 0, 0, 1, 0, 0}, and
{0, 1, 1, 1, 1, 1, 0, 0, 1, 0, 0, 0}.

11. The method of claim 9, wherein,
in the case where the length of the first sequence is 18, the plurality of first sequences further include {0, 1, 1, 1, 1, 1, 1, 1, 0, 0, 1, 0, 1, 0, 0, 1, 0, 0}.

12. The method of claim 9, wherein each binary number of the binary sequence is expressed as b(i), and each of the complex-valued modulation symbols is defined as:

$$d(i) = \frac{e^{j\frac{\pi}{2}(i\,\mathrm{mod}\,2)}}{\sqrt{2}}[(i-2b(i)) + j(1-2b(i))].$$

* * * * *

UNITED STATES PATENT AND TRADEMARK OFFICE
CERTIFICATE OF CORRECTION

| | |
|---|---|
| PATENT NO. | : 12,010,054 B2 |
| APPLICATION NO. | : 17/419988 |
| DATED | : June 11, 2024 |
| INVENTOR(S) | : Yukai Gao, Lin Liang and Gang Wang |

It is certified that error appears in the above-identified patent and that said Letters Patent is hereby corrected as shown below:

In the Claims

In Claim 1, Column 69, Line 63, delete "first"

In Claim 1, Column 69, Line 67, delete "first"

In Claim 2, Column 70, Line 8, delete the second instance of "first"

In Claim 3, Column 70, Line 12, delete the second instance of "first"

In Claim 5, Column 70, Line 43, delete "first"

In Claim 6, Column 70, Line 51, delete the second instance of "first"

In Claim 7, Column 70, Line 56, delete the second instance of "first"

In Claim 9, Column 71, Line 14, delete "first"

In Claim 9, Column 71, Line 18, delete "first"

In Claim 9, Column 71, Line 22, delete "first"

In Claim 10, Column 72, Line 7, delete "first"

In Claim 11, Column 72, Line 13, delete "first"

Signed and Sealed this
First Day of October, 2024

Katherine Kelly Vidal
*Director of the United States Patent and Trademark Office*